United States Patent
Varatharaajan et al.

(10) Patent No.: US 11,108,444 B2
(45) Date of Patent: *Aug. 31, 2021

(54) TRANSMITTER, RECEIVER, WIRELESS COMMUNICATION NETWORK AND METHODS FOR OPERATING THE SAME

(71) Applicant: Fraunhofer-Gesellschaft zur Foerderung der angewandten Forschung e.V., Munich (DE)

(72) Inventors: Sutharshun Varatharaajan, Ilmenau (DE); Marcus Grossmann, Friedrichroda (DE); Markus Landmann, Zeitz (DE); Lars Thiele, Berlin (DE); Martin Kurras, Berlin (DE); Thomas Haustein, Potsdam (DE); Thomas Wirth, Berlin (DE); Leszek Raschkowski, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/712,840

(22) Filed: Dec. 12, 2019

(65) Prior Publication Data
US 2020/0119785 A1 Apr. 16, 2020

Related U.S. Application Data

(63) Continuation of application No. PCT/EP2017/064828, filed on Jun. 16, 2017.

(51) Int. Cl.
*H04B 7/0456* (2017.01)
*H04B 7/06* (2006.01)

(52) U.S. Cl.
CPC ......... *H04B 7/0469* (2013.01); *H04B 7/0617* (2013.01); *H04B 7/0634* (2013.01); *H04B 7/0639* (2013.01)

(58) Field of Classification Search
CPC .. H04B 7/0417; H04B 7/0456; H04B 7/0469; H04B 7/0478; H04B 7/0482;
(Continued)

(56) References Cited

U.S. PATENT DOCUMENTS 10,547,362 B2 * 1/2020 Varatharaajan ...... H04B 7/0482
10,812,158 B2 * 10/2020 Ramireddy .......... H04B 7/0617
(Continued)

FOREIGN PATENT DOCUMENTS

WO  2014052806 A1  4/2014

OTHER PUBLICATIONS

"3.3GPP TR 36.897 V13.0.0", 3rd Generation Partnership Project; Technical Specification Group Radio Access Network; Study on elevation beamforming / Full-Dimension (FD) Multiple Input Multiple Output (MIMO) for LTE (Release 13), Jun. 2015.
(Continued)

*Primary Examiner* — David S Huang
(74) *Attorney, Agent, or Firm* — Perkins Coie LLP; Michael A. Glenn

(57) ABSTRACT

A transmitter includes a 3-dimensional antenna array including a plurality of antenna elements, each antenna element having a radiation pattern, wherein the radiation patterns mutually overlap. The plurality of antenna elements is adapted for coherent wireless communication in a wireless communication system. The 3D-antenna array includes first and second and third antenna elements spanning a 2-dimensional antenna plane, and includes a fourth antenna element arranged outside the 2-dimensional antenna plane; or the 3D-antenna array includes a first antenna element configured
(Continued)

to direct a transmitted signal into a first direction, and a second antenna element configured to direct a transmitted signal into a second direction and not into the first direction. The transmitter further includes a precoder connected through the 3D-antenna array, to form one or more transmit beams and/or receive beams with the 3D-antenna array.

10 Claims, 17 Drawing Sheets

(58) Field of Classification Search
CPC .... H04B 7/0617; H04B 17/12; H04B 17/391; H04B 7/0452; H04B 7/0473; H04B 7/0619; H04B 7/063
See application file for complete search history.

(56) References Cited

U.S. PATENT DOCUMENTS

| | | |
|---|---|---|
| 2015/0207547 A1 | 7/2015 | Ko et al. |
| 2019/0036573 A1* | 1/2019 | Park ..................... H04B 7/0456 |

OTHER PUBLICATIONS

Ji, Hyoungju et al., "Overview of Full-Dimension MIMO in LTE-Advanced Pro", https://arxiv.org/abs/1601.00019, Aug. 2016.

Landmann, Markus et al., "Efficient Antenna Description for MIMO Channel Modelling and Estimation", 7th European Conference on Wireless Technology, 2004.

R1-155018, "WF on precoder and PMI construction for R13 FD-MIMO", Samsung, LGE, CATT, Qualcomm, NTT Docomo, ZTE, Ericsson, ALU, ASB, AT&T, CMCC, KT, 3GPP TSG-RAN WG1#82 Beijing, China, Aug. 24-28, 2015, Aug. 2015.

Dahlman, Erik, et al., "4G: LTE/LTE-Advanced for Mobile Broadband, Second Edition", Academic Press, Oct. 2013. ISBN: 9780124199972.

Grossmann, Marcus, et al., "Antenna Array Optimization Strategies for Robust Direction Finding", 10th European Conference on Antennas and Propagation (EuCAP).

Liu, C, et al., "A Low Complexity 2D Pattern Synthesis Algorithm for Cylindrical Array", Hindawi Publishing Corporation, International Journal of Antennas and Propagation, vol. 2013, Article ID 352843, 6 pages, http://downloads.hindawi.com/journals/ijap/2013/352843.pdf.

* cited by examiner

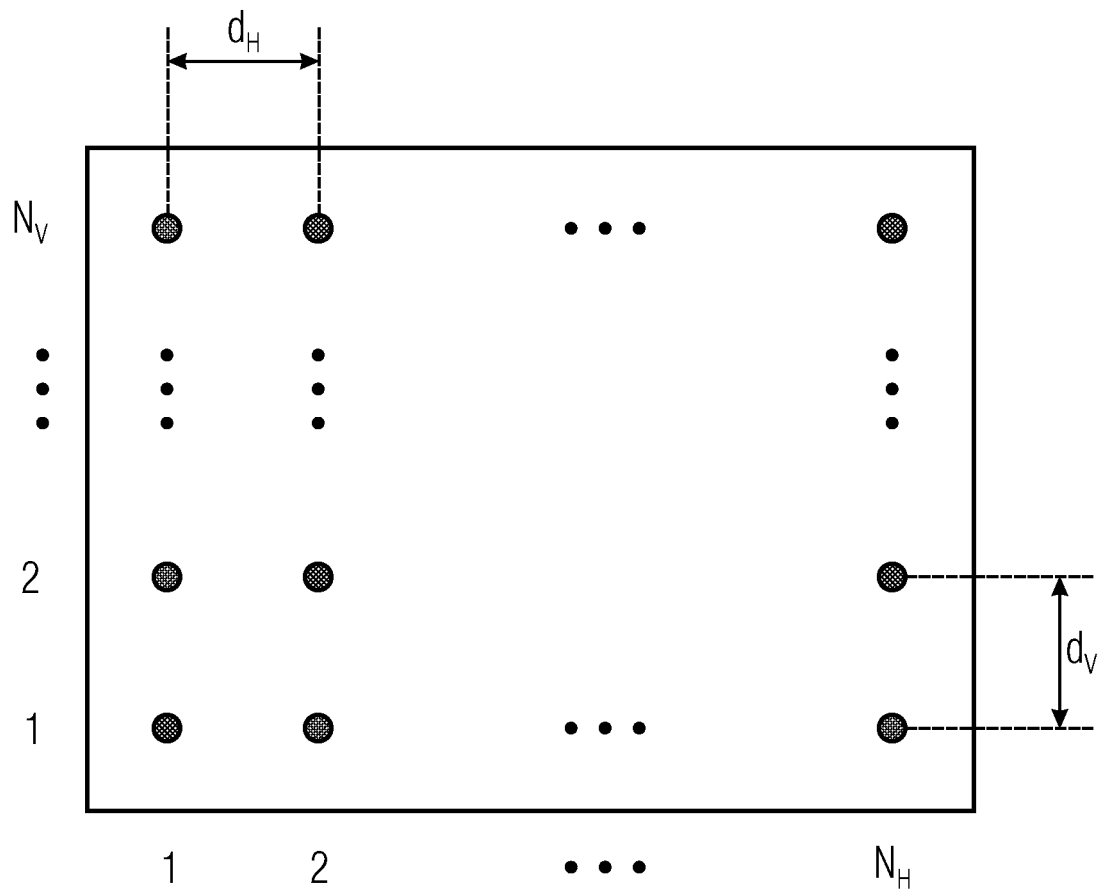
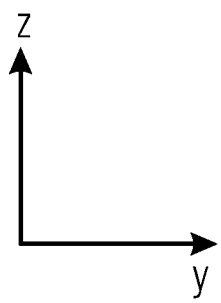
Fig. 1

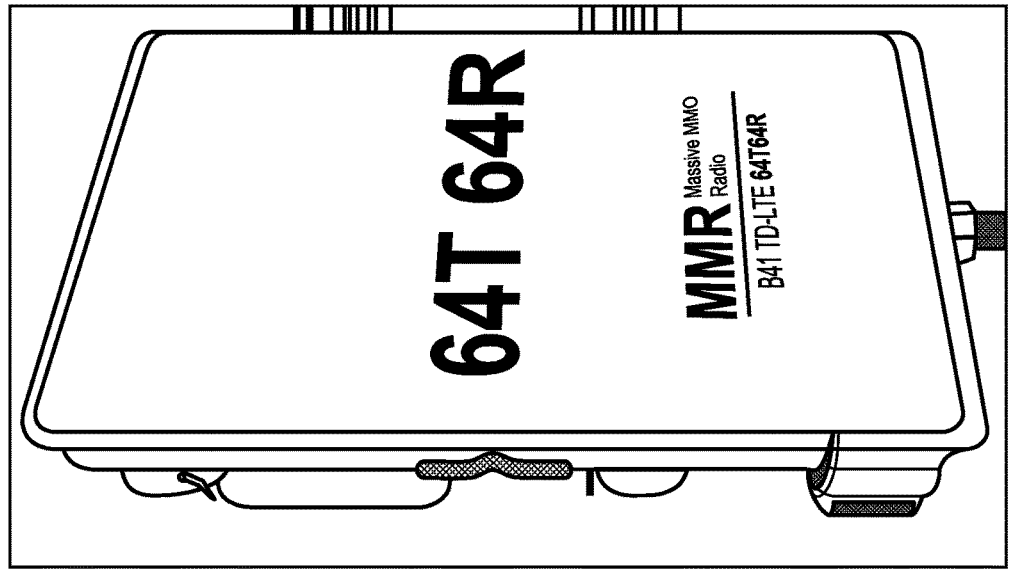
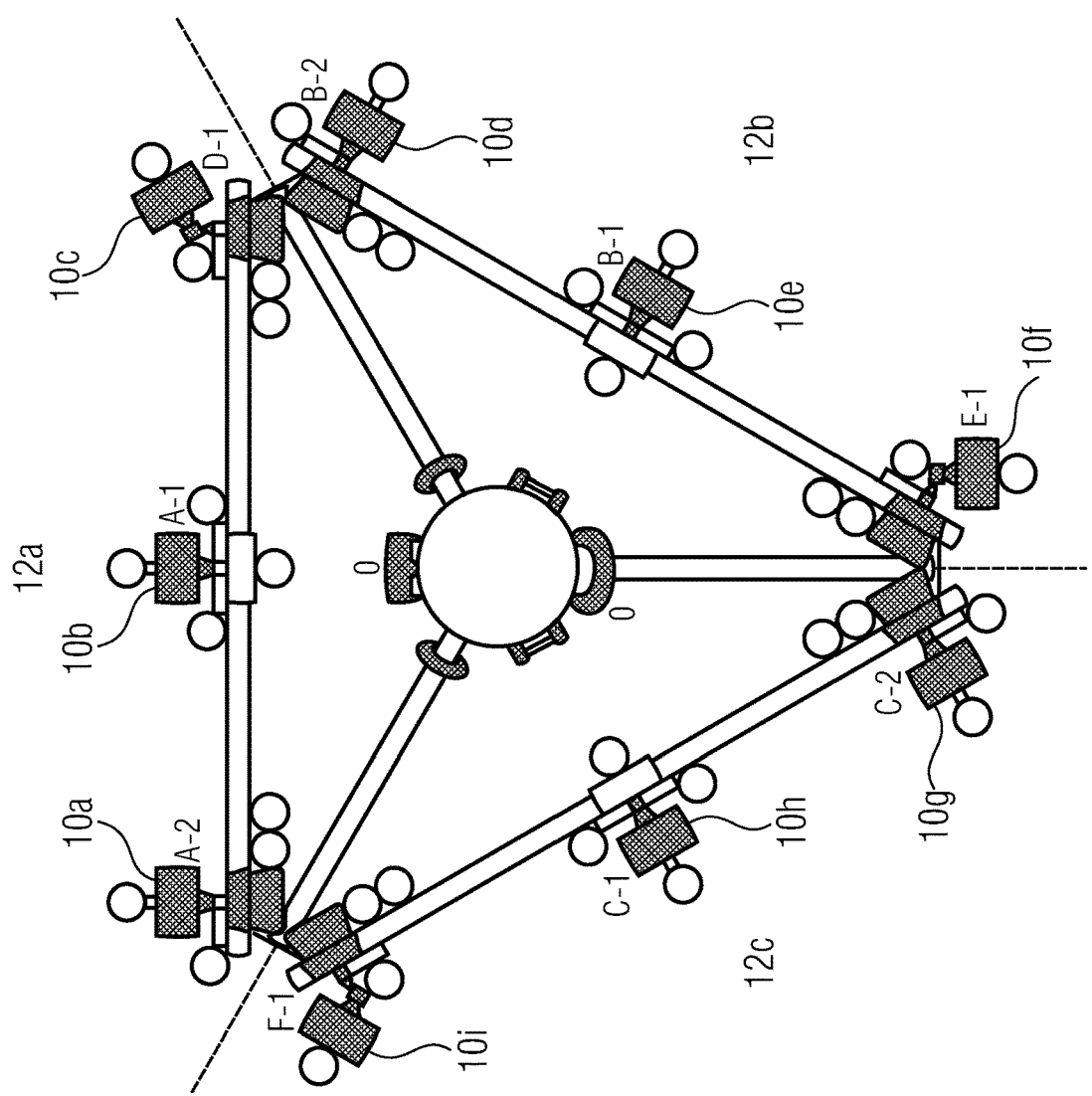
Fig. 2

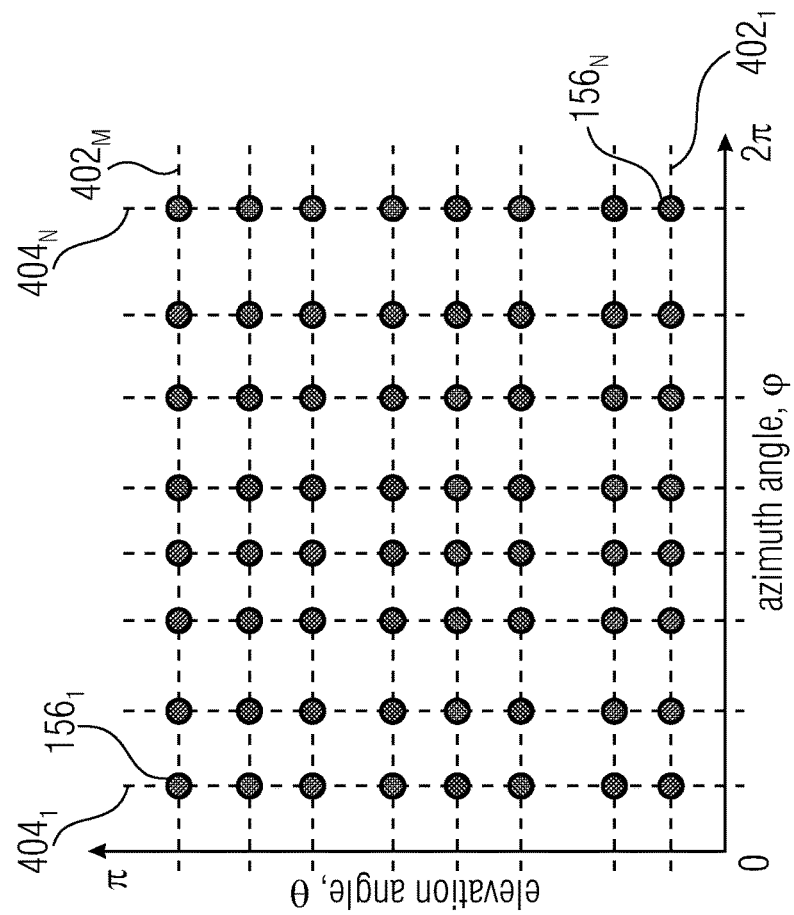
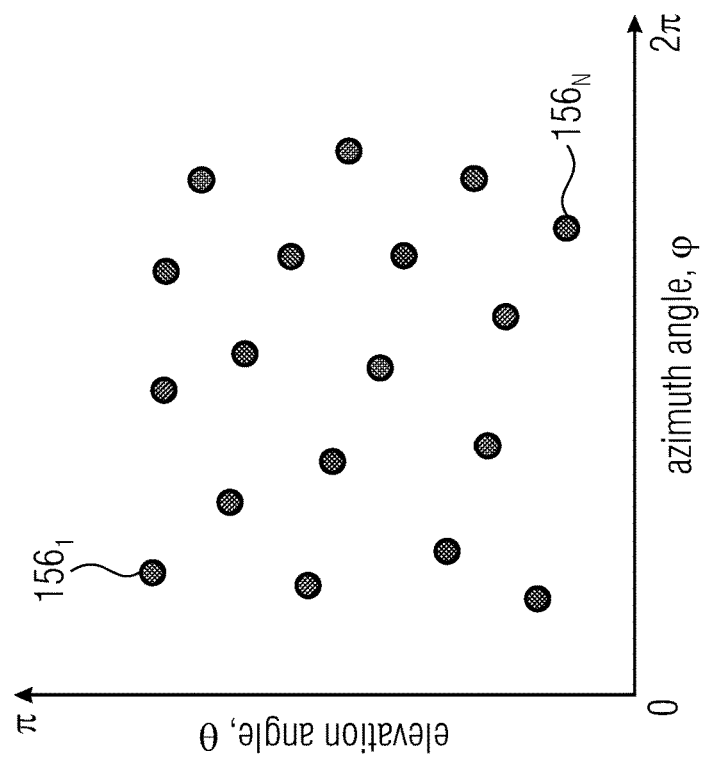
Fig. 7b
Fig. 7a

| rank index (RI) | rank of transmission | set of beam-set matrices $F_1$ <br> index used: <br> precoding matrix index 1 (PMI1) | | | set of selection/combining matrices $F_2$ <br> index used: <br> precoding matrix index 2 (PMI2) | | |
|---|---|---|---|---|---|---|---|
| 1 | $D'_1$ | $\{F_1^{(1,1)}, F_1^{(1,2)}, \ldots, F_1^{(1,K_1)}\}$ | | | $\{F_2^{(1,1)}, F_2^{(1,2)}, \ldots, F_2^{(1,L_1)}\}$ | | |
| $\ldots$ | $\ldots$ | $\ldots$ | | | $\ldots$ | | |
| R | $D'_R$ | $\{F_1^{(R,1)}, F_1^{(R,2)}, \ldots, F_1^{(R,K_R)}\}$ | | | $\{F_2^{(R,1)}, F_2^{(R,2)}, \ldots, F_2^{(R,L_R)}\}$ | | |

Fig. 8

| rank index (RI) | rank of transmission | set of power-loading matrices $F_P$ index used: precoding matrix index PMIP | set of ULA steering matrices $F_1$ index used: precoding matrix index PMI1 | set of selection/combining matrices $F_2$ index used: precoding matrix index PMI2 |
|---|---|---|---|---|
| 1 | $D'_1$ | $\{F_P^{(1,1)}, F_P^{(1,2)}, \ldots, F_P^{(1,U_1)}\}$ | $\{F_1^{(1,1)}, F_1^{(1,2)}, \ldots, F_1^{(1,K_1)}\}$ | $\{F_2^{(1,1)}, F_2^{(1,2)}, \ldots, F_2^{(1,L_1)}\}$ |
| ... | ... | ... | ... | ... |
| R | $D'_R$ | $\{F_P^{(R,1)}, F_P^{(R,2)}, \ldots, F_P^{(R,U_R)}\}$ | $\{F_1^{(R,1)}, F_1^{(R,2)}, \ldots, F_1^{(R,K_R)}\}$ | $\{F_2^{(R,1)}, F_2^{(R,2)}, \ldots, F_2^{(R,L_R)}\}$ |

$\underbrace{\qquad\qquad\qquad\qquad\qquad\qquad\qquad\qquad}_{F}$

Fig. 9

| rank index (RI) | rank of transmission | set of UCA beam-set matrices $X_H$ index used: precoding matrix index 1,1 (PMI11) | set of ULA beam-set matrices $X_V$ index used: precoding matrix index 1,2 (PMI12) | set of selection/combining matrices $F_2$ index used: precoding matrix index 2 (PMI2) |
|---|---|---|---|---|
| 1 | $D'_1$ | $\{X_H^{(1,1)}, X_H^{(1,2)}, \ldots, X_H^{(1,K_{H,1})}\}$ | $\{X_V^{(1,1)}, X_V^{(1,2)}, \ldots, X_V^{(1,K_{V,1})}\}$ | $\{F_2^{(1,1)}, F_2^{(1,2)}, \ldots, F_2^{(1,L_1)}\}$ |
| ... | ... | ... | ... | ... |
| R | $D'_R$ | $\{X_H^{(R,1)}, X_H^{(R,2)}, \ldots, X_H^{(R,K_{H,R})}\}$ | $\{X_V^{(R,1)}, X_V^{(R,2)}, \ldots, X_V^{(R,K_{V,R})}\}$ | $\{F_2^{(R,1)}, F_2^{(R,2)}, \ldots, F_2^{(R,L_R)}\}$ |

The $X_H$ and $X_V$ columns together form $F_1$. The $F_1$ and $F_2$ columns together form $F$.

Fig. 10

TRANSMITTER, RECEIVER, WIRELESS COMMUNICATION NETWORK AND METHODS FOR OPERATING THE SAME

CROSS-REFERENCES TO RELATED APPLICATIONS

This application is a continuation of copending International Application No. PCT/EP2017/064828, filed Jun. 16, 2017, which is incorporated herein by reference in its entirety.

The present invention relates to transmitter devices, to a receiver, to a wireless communication network comprising a said transmitter and a said receiver and to methods for operating the same. The present invention further relates to a codebook for three-dimensional antenna arrays.

BACKGROUND OF THE INVENTION

In Full Dimension multiple input multiple output (FD-MIMO) as described in [1] and [2], digital Fourier transformation (DFT)-based codebooks are used at the transmitter for signal precoding/beamforming using one-dimensional (1D) uniform linear arrays (ULAs) or two-dimensional (2D) uniform planar arrays (UPAs). The response of such arrays resemble DFT vectors. The ideal responses of a UPA or a ULA having omni-directional and identical antenna elements which are ideally placed as dictated by the geometry, have a linear variation of the signal phases over the antenna elements, a feature observed in DFT vectors as well. Such linear phase variations may not be observed in other array geometries, such as three-dimensional (3D) array antennas. Therefore, DFT-based codebooks are mainly used for two-dimensional array geometries.

The array antennas discussed in FD-MIMO (e.g., LTE-release 13/14, see [1] or [2]) are based on 2D array configurations. Such arrays are not able to provide a full azimuthal (360°) coverage due to the directional view patterns of their antenna elements and the forward-backward ambiguity. Therefore, multiple UPA panels are usually installed for coverage extensions up to 360°. In practical multi-panel UPAs that cover the whole azimuth range, the beam-width and gain depend on the beam-steering direction, where the largest gain is obtained at antenna bore side direction. In contrast, 3D arrays such as, for example, cylindrical arrays or conical arrays, provide an appropriate solution to scenarios where full azimuth coverage may be used, i.e., it is possible to maintain uniform beam widths and gain values while having peak gain in the desired beam direction over the whole azimuth range.

The planar-based array antennas used in FD-MIMO (see LTE release-13/14 [1]) apply beamforming weights that are based on DFT-vectors, see [1], [2]. The geometry of such arrays result in DFT-like spatial signatures and, hence, DFT-vectors are typically used as beamforming weights.

For an UPA having $N_V$ rows and $N_H$ columns, the narrowband array response $a(\theta, \varphi)$ with respect to elevation angle $\theta$ and azimuth angle $\varphi$ can be expressed as a Kronecker product:

$$a(\theta,\varphi)=a_V(\theta,\varphi)\otimes a_H(\theta,\varphi)\in \mathbb{C}^{N_V N_H \times 1}, \qquad (1)$$

where $a_V(\theta,\varphi)\in \mathbb{C}^{N_V\times 1}$ and $a_H(\theta,\varphi)\in \mathbb{C}^{N_H\times 1}$ are the responses of the elements across a row and a column of the UPA, respectively.

FIG. 1 shows a typical uniform planar array in LTE FD-MIMO consisting of $N_V$ rows and $N_H$ columns. For a UPA having the configuration shown in FIG. 1, the narrowband response of the array, considering isotropic antenna elements, across the rows and columns are respectively given by $$a_V(\theta,\varphi) = [1 \quad e^{j2\pi\mu} \quad \ldots \quad e^{j2\pi(N_V-1)\mu}]^T \in \mathbb{C}^{N_V\times 1},\; \mu = \frac{1}{\lambda}d_V\cdot\cos\theta, \qquad (2)$$

$$a_H(\theta,\varphi) = [1 \quad e^{j2\pi v} \quad \ldots \quad e^{j2\pi(N_H-1)v}]^T \in \mathbb{C}^{N_H\times 1}, \qquad (3)$$

$$v = \frac{1}{\lambda}d_H\cdot\sin\varphi\cdot\sin\theta,$$

where $\lambda$ is the carrier wavelength of the incident radiation.

The codebook matrix containing the candidate steering vectors $\Omega$ in FD-MIMO is typically an oversampled spatial DFT matrix parametrized by the number of rows and columns $N_V$ and $N_H$ of the array, respectively, and the oversampling factors across the particular dimensions ($O_V$, $O_H$), [6]

$$\Omega = [\,b_{1,1}\quad b_{1,2}\quad \ldots \quad b_{k,l}\quad \ldots \quad b_{N_V O_V, N_H O_H}\,] \in \mathbb{C}^{N_V N_H \times N_V O_V \cdot N_H O_H}, \qquad (4)$$

where $$b_{k,l} = b_{V,k}\otimes b_{H,l} \qquad (5)$$

and $$b_{V,k} = \frac{1}{\sqrt{N_V}}\Big[1 \quad \ldots \quad e^{\frac{j2\pi k}{N_V O_V}} \quad \ldots \quad e^{\frac{j2\pi k(N_V-1)}{N_V O_V}}\Big]^T \in \mathbb{C}^{N_V\times 1}, \qquad (6)$$

$$b_{H,l} = \frac{1}{\sqrt{N_H}}\Big[1 \quad \ldots \quad e^{\frac{j2\pi l}{N_H O_H}} \quad \ldots \quad e^{\frac{j2\pi l(N_H-1)}{N_H O_H}}\Big]^T \in \mathbb{C}^{N_H\times 1}. \qquad (7)$$

Precoding Matrices

The precoding matrix for a UPA with the configuration as shown in FIG. 1, having two orthogonal antenna polarizations/orientations at each position, has the following two stage structure [1]:

$$F = F_1 F_2 = \begin{bmatrix} s_1^{(1)} & s_2^{(1)} & \ldots & s_D^{(1)} & 0 \\ 0 & & & & s_1^{(2)} & s_2^{(2)} & \ldots & s_D^{(2)} \end{bmatrix}[c_1 \quad \ldots \quad c_{D'}], \qquad (8)$$

where the matrix $F_1 \in \mathbb{C}^{2N_V N_H \times 2D}$ is a block-diagonal matrix containing the array steering vectors for a specific antenna orientation in each block. Each of the array steering vectors $s_d^{(e)} \in \mathbb{C}^{N_V N_H \times 1}$, $d=1,2,\ldots,D$; $e=1,2$ in $F_1$ represents a beam along a certain direction using the antenna ports of the e-th polarization dimension (see, e.g., FIG. 1). The candidates for the array steering vectors $s_d^{(e)} \in \mathbb{C}^{N_V N_H \times 1}$ are the columns of the codebook matrix $\Omega \in \mathbb{C}^{N_V N_H \times N_V O_V \cdot N_H O_H}$.

The vectors $c_d$, $d=1,2,\ldots,D'$ in $F_2 \in \mathbb{C}^{2D\times D'}$ are used to perform beam-selection or to perform a linear combination of beams. The combination/co-phasing of the beams can be performed within and across different antenna polarizations. The variable $D'$ denotes the rank of the transmission.

The LTE FD-MIMO standardization [1] discusses the different precoding schemes based on the precoding of the channel state information reference signals (CSI-RS)—precoded CSI-RS and non-precoded CSI-RS—and the various indices—precoder matrix indices (PMI), rank indices (RI) and/or beam indices (BI)—involved in the feedback from the receiver in determining the precoding matrix $F \in \mathbb{C}^{2N_V N_H \times D'}$ at the transmitter from a 'Codebook'.

In addition, antenna configurations that combine various 2D and/or 3D geometries are also included in the report to address certain limitations of 2D arrays that are used in Rel. 13 FD-MIMO [1] and other releases of LTE. A typical multi-antenna, multi-sector deployment, in LTE for example, allowing six basestation sectors is depicted in FIG. 2. FIG. 2 shows on the left a typical multi-sector antenna deployment, and a commercial 64 TRx M-MIMO radio heads on the right. The antennas typically used are sectorized cross-polarized antenna panels. With the particular antenna mount, this deployment can be attached to existing antenna poles. The massive MIMO (M-MIMO) array antenna depicted on the right side shows one of the first commercially available 64-TRx remote radio heads with integrated UPA operating at 2.6 GHz. This particular M-MIMO UPA weights approx. 20-25 kg. Due to limits of mechanical antenna mounts, a straight-forward mount of such M-MIMO UPAs (e.g. to existing multi-sector antenna sites) does not scale. UPAs mounted on the corners of a triangle mount can cause cross-talk and thus interference to a neighboring UPA. This reduces overall system performance.

FIG. 3 is a schematic representation of an example of the wireless network 100 or wireless network infrastructure of a wireless communication system. The wireless network 100 may include a plurality of base stations $eNB_1$ to $eNB_5$, each serving a specific area surrounding the base station schematically represented by the respective cells $102_1$ to $102_5$. The base stations are provided to serve users within a cell. A user may be a stationary device or a mobile device. Further, the wireless communication system may be accessed by IoT devices $105_1$ and/or $105_2$ which connect to a base station or to a user by wireless communication channels $107_1$, $107_2$ respectively. IoT devices may include physical devices, vehicles, buildings and other items having embedded therein electronics, software, sensors, actuators, or the like as well as network connectivity that enable these devices to collect and exchange data across an existing network infrastructure. FIG. 3 shows an exemplary view of only five cells, however, the wireless communication system may include more such cells. FIG. 3 shows two users UE1 and UE2, also referred to as user equipment (UE), that are in cell $102_2$ and that are served by base station $eNB_2$. Another user $UE_3$ is shown in cell $102_4$ which is served by base station $eNB_4$. The arrows $104_1$, $104_2$ and $104_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 3 shows two IoT devices $106_1$ and $106_2$ in cell $102_4$, which may be stationary or mobile devices. The IoT device $106_1$ accesses the wireless communication system via the base station $eNB_4$ to receive and transmit data as schematically represented by arrow $108_1$. The IoT device $106_2$ accesses the wireless communication system via the user $UE_3$ as is schematically represented by arrow $108_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink control channel (PDCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, e.g. a frame length of 10 milliseconds, in the time domain and having a given bandwidth in the frequency domain. The frame may have a certain number subframes of predefined length, e.g., 2 subframes with a length of 1 millisecond. Each subframe may include two slots of 6 or 7 OFDM symbols depending on the cyclic prefix (CP) length. The PDCCH may be defined by a pre-defined number of OFDM symbols per slot. For example, the resource elements of the first three symbols may be mapped to the PDCCH.

In a wireless communication system like the one depicted schematically in FIG. 3, multi-antenna techniques may be used, e.g., in accordance with LTE, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver.

In the following the downlink (DL) transmission in a mobile multiple input multiple output communication system will be considered, i.e., the communication link carrying data traffic from a base station (eNodeB) to a mobile user equipment (UE). Considering a base station (eNodeB) with $N_{Tx}$ antennas and a mobile user equipment (UE), with $N_{Rx}$, antennas, the symbols received at a particular instant of time in a DL transmission at the UE $y \in \mathbb{C}^{N_{Rx} \times 1}$, can be written as $$y = HFs + n \quad \text{(R1)}$$

where $H \in \mathbb{C}^{N_{Rx} \times N_{Tx}}$ denotes the channel matrix, $F \in \mathbb{C}^{N_{Tx} \times N_s}$ represents the precoder matrix at the eNodeB, $n \in \mathbb{C}^{N_{Rx} \times 1}$ is the additive noise at the receiver, $s \in \mathbb{C}^{N_s \times 1}$ is the data vector transmitted by the eNodeB which has to be decoded by the UE, and $N_s$ denotes the number of data streams transmitted.

The precoder matrix that has to be used at the eNodeB to map the data $s \in \mathbb{C}^{N_s \times 1}$ to the $N_{Tx}$ antenna ports is decided by solving an optimization problem that is based on the instantaneous channel information $H \in \mathbb{C}^{N_{Rx} \times N_{Tx}}$. In a closed-loop mode of communication, the UE estimates the state of the channel and transmits the reports, channel state information (CSI), to the eNodeB via a feedback channel in the uplink (the communication link carrying traffic from the UE to the eNodeB) so that the eNodeB may determine the precoding matrix (see reference [8]). There are also occasions when multiple-layer transmissions are performed without feedback from the UE to determine the precoding matrices. Such a mode of communication is called 'open-loop' and the eNodeB makes use of signal diversity and spatial multiplexing to transmit information (see reference [8]).

In the following, the closed-loop DL transmission mode will be considered. The CSI feedback sent to the eNodeB in the closed-loop mode may be of two different types: implicit and explicit. FIG. 4 shows a block-based model of the MIMO DL transmission using codebook-based-precoding in accordance with LTE release 8. FIG. 4 shows schematically the base station 2000, the user equipment 3000 and the channel 4000, like a radio channel for a wireless data communication between the base station 2000 and the user equipment 300. The base station includes an antenna array 2020 having a plurality of antennas or antenna elements, and a precoder 2040 receiving a data vector 2060 and a precoder matrix F from a codebook 2080. The channel 4000 may be described by the channel matrix 4020. The user equipment 3000 receives the data vector 3020 via an antenna or an antenna array 3040 having a plurality of antennas or antenna elements. Further, a feedback channel 5000 between the user equipment 3000 and the base station 2000 is shown for transmitting feedback information.

In the case of an implicit feedback, the CSI transmitted by the UE 3000 over the feedback channel 5000 includes the rank index (RI), the precoding matrix index (PMI) and the channel quality index (CQI) allowing, at the eNodeB 2000, deciding the precoding matrix, and the modulation order and coding scheme (MCS) of the symbols transmitted. The PMI and the RI are used to determine the precoding matrix from a predefined set of matrices Ω called 'codebook' 2080. The codebook 2080, e.g., in accordance with LTE, may be a look-up table with matrices in each entry of the table, and the PMI and RI from the UE decide which row and column of the table the optimal precoder matrix is obtained from.

The codebook designs in DL transmissions may be specific to the number of antenna ports used for the transmission. For example, when two ports are used for the transmission, the codebook entries come from the columns of 2×2 unitary matrices with constant modulus entries. For a 4-port transmission, the columns of householder matrices $B_n = I_4 - 2u_n u_n^H / u_n^H u_n$ may be used for the precoder $F \in \mathbb{C}^{N_{Tx} \times N_s}$ ($N_s \leq 4$ in this case), where $u_n \in \mathbb{C}^{N_{Tx} \times 1}$ is a vector with unit modulus entries, with n denoting the codebook index.

With explicit CSI feedback, there is no use of a codebook to determine the precoder. The coefficients of the precoder matrix are transmitted explicitly by the UE. Alternatively, the coefficients of the instantaneous channel matrix may be transmitted, from which the precoder is determined by the eNodeB.

The design and optimization of the precoder 2040 and the codebook 2080 may be performed for eNodeBs equipped with 1-dimensional Uniform Linear Arrays (ULAs) or 2-dimensional Uniform Planar Arrays (UPAs) having a fixed down-tilt. These antenna arrays 2020 allow controlling the radio wave in the horizontal (azimuth) direction so that azimuth-only beamforming at the eNodeB 200 is possible. In accordance with other examples, the design of the codebook 2080 is extended to support UPAs for transmit beamforming on both vertical (elevation) and horizontal (azimuth) directions, which is also referred to as full-dimension (FD) MIMO.

The codebook 2080 in FD-MIMO is designed based on the array response of an ideal UPA. The response of an antenna array, also referred to as 'array response vectors', with $N_{Tx}$ antenna ports is a complex-valued vector of size $N_{Tx} \times 1$ which contains the amplitude gain and the (relative) phase shift induced or obtained at each antenna port of the antenna array 2020 for a wavefront incident from a certain direction. The response of an array is usually represented as a function of angle of arrival or angle or departure. The codebook 2080 used in the case of massive antenna arrays such as the ones FD-MIMO, is a set of beamforming weights that forms spatially separated electromagnetic transmit/receive beams using the array response vectors of the array. The beamforming weights of the array are amplitude gains and phase adjustments that are applied to the signal fed to the antennas (or the signal received from the antennas) to transmit (or obtain) a radiation towards (or from) a particular direction. The components of the precoder matrix are obtained from the codebook of the array, and the PMI and the RI are used to 'read' the codebook and obtain the precoder.

The array steering vectors of an ideal UPA having identical antennas with ideal antenna placement, e.g., antennas placed with infinite precision as dictated by the geometry, and omnidirectional radiation patterns may be described by the columns of a 2-D Discrete Fourier Transform (DFT) matrix. Hence, for the codebook of 2D UPAs 2D-DFT-based matrices may be used. 2D-DFT-based matrices are defined for a scalable number of antenna ports, e.g., up to 32 antenna ports per polarization/antenna orientation, or 64 antenna ports in co-polarized antenna arrays.

The precoder matrices used in FD-MIMO may have a dual-stage structure: $F = F_1 F_2$. Here, the matrix $F_1$ contains the beamforming vectors which are defined by a 2D-DFT codebook, i.e., the matrix $F_1$ contains the beamforming weights applied to each antenna port of the array to direct the radiation towards a particular direction. The matrix $F_2$ contains coefficients that select and/or linearly combine the 2D-DFT beams in the matrix $F_1$ to obtain a desired overall beam pattern. The matrix $F_2$ may also be used to perform co-phasing between different antenna orientations/polarization groups of the array.

In massive antenna arrays, multiple antennas that are oriented in different directions may be placed at a particular position in the array, i.e., there are P antenna ports at each position). Each of the antennas is sensitive to a particular polarization of the transmitted or received wavefront. As the orientation of the antenna defines the polarization direction of the wavefront it is sensitive to, the terms 'antenna orientations' and 'antenna polarizations' may be used interchangeably. However, in the following 'antenna orientation(s)' is used wherever applicable instead of 'antenna polarization(s)' so as to avoid confusion with wave polarizations that are also described introduced later. Considering a generic geometry of the array, the components of the FD-MIMO-type two-stage precoder matrix for an array with $N_{Tx}$ antenna ports per orientation, and P different antenna orientations among the antennas are, as shown, in the following equation:

$$F = F_1 F_2 = \begin{bmatrix} s_1^1 & s_2^1 & \cdots & s_D^1 & \cdots & & 0 \\ & \vdots & & \ddots & & \vdots & \\ 0 & & \cdots & s_1^P & s_2^P & \cdots & s_D^P \end{bmatrix} [c^1 \; \cdots \; c^{D'}]. \quad (R2)$$

The matrix $F_1 \in \mathbb{C}^{N_{Tx} \cdot P \times D \cdot P}$ has a block-diagonal structure. Each of the vectors $s_d^p \in \mathbb{C}^{N_{Tx} \times 1}$, d=1, 2, ..., D and p=1, 2, ..., P in $F_1$ corresponds to a beamforming vector that steers the beam along certain d-th direction selected from D directions, using the antennas oriented in the p-th direction. The possible vectors for $s_d^p \in \mathbb{C}^{N_{Tx} \times 1}$ are the columns contained in the so-called 'codebook' matrix of the array, which contains the steering vectors for various angles of radiation.

The vectors $c^d$, $d=1, 2, \ldots, D'$ in $F_2 \in \mathbb{C}^{D \cdot P \times D'}$ are used to perform the beam selection or perform a linear combination of beams. The combination/co-phasing of the beams may be performed within and across different antenna polarizations in this matrix. The variable $D'$ denotes the number of beams formed effectively.

To illustrate the use of the combining matrix $F_2$, the types of vectors used in the matrix are provided along with the purpose they satisfy.

To select a specific beam out of the D steered beam directions in the matrix $F_1$ from both orientations/polarizations, the vector $e^{(d)} \in \mathbb{C}^{D \times 1}$, $d=1, 2, \ldots, D$ may be used which contains zeros at all positions except the d-th position, which is one. For instance, $$F_2 = \begin{bmatrix} e^{(3)} \\ e^{(3)} \\ \vdots \\ e^{(3)} \end{bmatrix} \in \mathbb{C}^{D \cdot P \times 1} \quad \text{(R3)}$$

selects the beam steering direction corresponding to the third column vector (in each of the block matrices along the diagonal) in the matrix $F_1$. Multiple beams can be selected using multiple columns, for e.g., $$F_2 = \begin{bmatrix} e^{(3)} & e^{(5)} \\ e^{(3)} & e^{(5)} \\ \vdots & \vdots \\ e^{(3)} & e^{(5)} \end{bmatrix} \in \mathbb{C}^{D \cdot P \times 2}$$

selects the beam directions corresponding to the third and fifth columns in $F_1$. To perform beam selection while co-phasing between polarizations, a matrix of type $$F_2 = \begin{bmatrix} e^{j\delta_1} e^{(i)} \\ e^{j\delta_2} e^{(i)} \\ \vdots \\ e^{j\delta_P} e^{(i)} \end{bmatrix} \in \mathbb{C}^{D \cdot P \times 1} \quad \text{(R5)}$$

may be used, where the values $\delta_p$, $p=1, 2, \ldots, P$ are the phase adjustments. Using vectors with more than one non-zero element, while using complex coefficients with varying amplitudes, means that multiple steering vectors are combined while forming the beam.

The structure of the precoder in (2) considers that the number of columns in each of the blocks, i.e., the number of beamforming vectors for each of the antenna orientations, is the same for each block. Such a structure is assumed for the sake of simplicity of notation and providing examples for $F_2$, and may be readily generalized with a different number of beamforming vectors for different antenna orientations.

The precoder structure in (2) and the structure of the individual matrices $F_1$ and $F_2$ are generalizations of the precoder structure in FD-MIMO for an arbitrary array geometry.

SUMMARY

According to an embodiment, a transmitter may have: a 3D-antenna array including a plurality of antenna elements with each antenna element having a radiation pattern, wherein the radiation patterns overlap with respect to each other, wherein the plurality of antenna elements is adapted for a coherent wireless communication in a wireless communication system; wherein the 3D-antenna array includes a first and a second and a third antenna element spanning a two-dimensional antenna plane, and includes a fourth antenna element being arranged outside the two-dimensional antenna plane; or wherein the 3D-antenna array includes a first antenna element being configured to direct a transmitted signal into a first direction, and including a second antenna element being configured to direct a transmitted signal into a second direction and not into the first direction; the transmitter further including a precoder connected to the 3D-antenna array, the precoder configured to apply a set of beamforming weights to the 3D-antenna array, to form one or more transmit beams and/or receive beams with the 3D-antenna array, the beams pointing in directions of interest; wherein the precoder includes a precoder matrix that is based on a beam-set matrix and a selection matrix and a power allocation matrix including power values that indicate a power to be allocated to the antenna elements of the 3D-antenna array, the power allocation matrix adapted to selectively adjust an antenna gain of the antenna elements.

According to another embodiment, a transmitter may have: a 3D-antenna array including a plurality of antenna elements for a wireless communication with at least one receiver; and a precoder connected to the antenna array, the precoder configured to apply a set of beamforming weights to the 3D-antenna array using a precoder matrix, the beamforming weights selected from a codebook table associated with the 3D-antenna array, the transmitter configured to form one or more transmit/receive beams pointing in directions of interest using the codebook table; wherein the codebook table is a table that includes the candidates for each of the directions, wherein the codebook table includes a structure being based on a combination of a plurality of component matrices of the precoder, wherein the precoder is configured to select single components of the component matrices so as to select the beamforming weights, wherein the specific components include at least one of a subset of antenna elements of the 3D-antenna array elements and a power allocation to the antenna elements by use of at least one of a precoder matrix index and a rank index, wherein the precoder matrix of the precoder is based on a beam-set matrix containing the array steering vectors and a selection matrix and a power allocation matrix adapted to selectively adjust the power allocated to the antenna elements; or wherein the precoder includes a precoder matrix that is based on a beam-set matrix and a selection matrix, wherein the beam-set matrix is based on a combination of component beam-set matrices associated with different segments of antenna elements of the 3D-antenna array; or wherein the precoder includes a precoder matrix that is based on a beam-set matrix and a selection matrix, wherein the beam-set matrix is based on element-selection matrices for selecting at least one antenna element to remain unused for beamforming into a direction associated with the used steering vectors of the beam-set matrix.

According to another embodiment, a transmitter may have: a 3D-antenna array including a plurality of antenna elements for a wireless communication with at least one receiver, wherein the antenna elements are arranged according to a cylindrical or a conical configuration; wherein the transmitter is configured to transmit, to a receiver, a signal indicating a layout of the 3D-antenna array.

According to another embodiment, a user equipment may have: an antenna for a wireless communication with a transmitter; and a signal processor to receive and process a radio signal received at the antenna via a radio channel, the radio signal including information relating to a layout of the 3D-antenna array; wherein the user equipment is configured to construct a codebook table including a plurality of sets of beamforming weights for a plurality of directions using the information relating to a layout of the 3D-antenna array.

Another embodiment may have a user equipment configured to operate in a wireless communication network, wherein the user equipment is configured to transmit a request signal including information that indicates a request to transmit, to the user equipment, a radio signal including information relating to a layout of the 3D-antenna array of the transmitter.

According to another embodiment, a wireless communication network may have: an inventive transmitter, and inventive user equipment.

According to another embodiment, a method for operating a transmitter having a 3D-antenna array including a plurality of antenna elements each antenna having a radiation pattern, wherein the radiation patterns overlap with respect to each other, wherein the 3D-antenna array includes a first and a second and a third antenna element spanning a two-dimensional antenna plane, and including a fourth antenna element being arranged outside the two-dimensional antenna plane; or wherein the 3D-antenna array includes a first antenna element being configured to direct a transmitted signal into a first direction, and including a second antenna element being configured to direct a transmitted signal into a second direction and not into the first direction, may have the steps of: coherently controlling the plurality of antenna elements for a coherent wireless communication in a wireless communication system; applying a set of beamforming weights to the 3D-antenna array to form one or more transmit beams and/or receive beams with the 3D-antenna array, the beams pointing in directions of interest using a precoder matrix that is based on a beam-set matrix and a selection matrix and a power allocation matrix including power values that indicate a power to be allocated to the antenna elements of the 3D-antenna array, the power allocation matrix adapted to selectively adjust an antenna gain of the antenna elements.

According to another embodiment, a method for operating a transmitter having a 3D-antenna array including a plurality of antenna elements for a wireless communication with at least one receiver, wherein the antenna elements are arranged according to a cylindrical or a conical configuration, may have the steps of: transmitting, to a receiver, a signal including information relating to a layout of the 3D-antenna array; transmitting, to a receiver, a signal indicating a number of layers in the cylindrical or conical antenna array, a number of antenna elements in each of the layers, a distance between the layers, a polarization of the antenna elements and a geometry of the antenna array.

According to another embodiment, a method for operating a receiver may have the steps of: wirelessly communicating with a transmitter; and receiving and processing a radio signal received a radio channel, the signal including information relating to a layout of a 3D-antenna array; constructing a codebook table such that the codebook table includes a plurality of sets of beamforming weights for a plurality of directions, using information relating to the layout of the 3D-antenna array.

According to another embodiment, a method for obtaining a codebook matrix having array steering vectors for a precoder connected to a 3D-antenna array, each steering vector indicating a set of beamforming weights to be applied to a 3D-antenna array to form one or more transmit/receive beams with the 3D-antenna array, the beams pointing in directions of interest, may have the steps of: selecting the steering vectors for the directions of interest by sampling a response vector function of the 3D-antenna array at a plurality of values of azimuth and elevation angles contained in the exponents of the complex exponentials of the response vector function; or selecting the steering vectors for directions of interest by sampling the response vector function of the 3D-antenna array at a plurality of values of trigonometric functions of the azimuth and elevation angles contained in the exponents of the complex exponentials in the response vector function.

According to another embodiment, a non-transitory computer program product may have: a computer readable medium storing instructions which, when executed on a computer, perform any of the inventive methods.

According to an embodiment a transmitter comprises a 3D-antenna array comprising a plurality of antenna elements, each antenna element having a radiation pattern. The radiation patterns overlap with respect to each other, wherein the plurality of antenna elements is adapted for a coherent wireless communication in a wireless communication system. The 3D-antenna array comprises a first and a second and a third antenna element spanning a two-dimensional antenna plane and comprises a fourth antenna element being arranged outside the two-dimensional antenna plane. Alternatively or in addition, the 3D-antenna array comprises a first antenna element being configured to direct a transmitted signal into a first direction, and comprising a second antenna element being configured to direct a transmitted signal into a second direction and not into the first direction. Both configurations allow for a 3D-antenna array implementation. The transmitter further comprises a precoder connected to the 3D-antenna array, the precoder configured to apply a set of beamforming weights to the 3D-antenna array, to form one or more transmit beams and/or receive beams, i.e., advantageous directions of transmission/reception, with the 3D-antenna array, the beams pointing in directions of interest. The precoder comprises a precoder matrix that is based on a beam-set matrix and a selection matrix and a power allocation matrix comprising power values that indicate a power to be allocated to the antenna elements of the 3D-antenna array, the power allocation matrix adapted to selectively adjust antenna gain of the antenna elements.

The 3D-antenna array allows for a high number of selected directions along which the respective beam may be formed. The precoder matrix comprising the power allocation matrix may allow to efficiently control the 3D-antenna array which faces, when compared to a 2D-antenna array, further effects like shading or the like.

According to an embodiment, the beam-set matrix is based on a combination of beam set matrices associated with different segments of the 3D-antenna array, each segment containing at least one antenna elements. This may allow for selectively addressing segments of the 3D-antenna array.

According to an embodiment, the beam-set matrix is based on a combination of element-selection matrices for selecting at least one antenna element to remain unused for a beamforming into a direction associated with the used steering vectors of the beam-set matrix. The transmitter is configured to select columns of the beam-set matrix in the precoder from a codebook matrix that comprises a plurality of array steering vectors corresponding to a plurality of directions of interest along which the 3D-antenna array is configured to form one or more transmit beams and/or receive beams. This may allow for disabling one or more antenna elements from transmission and may therefore allow for a precise controlling of the 3D-antenna array.

According to an embodiment, the power allocation matrix comprises gain values to determine the power to be fed to each antenna element of the 3D-antenna array. This may allow for individually adjusting a power and to therefore precisely control beamforming of the 3D-antenna array.

According to an embodiment, a codebook containing a plurality of precoder matrices comprises at least one power allocation matrix per transmission rank. This may allow to selectively adjust the power allocation matrices dependent on the transmission rank.

According to an embodiment, each set of beamforming weights forms a steering vector for the 3D-antenna array. The beam-set matrix comprises a plurality of steering vectors, wherein for each steering vector an associated element-selection matrix is contained in the beam-set matrix. The element selection matrix comprises information for each antenna element of the 3D-antenna array, the information indicating if the antenna element is used or unused for the associated steering vector or plurality of steering vectors.

According to an embodiment, the 3D-antenna array comprises a plurality of subsets of antenna elements, wherein the element-selection matrices subset-wise indicate whether to use or not to use a specific subset of antenna elements for beamforming in a particular direction. This may allow for subset-wise enabling antenna elements.

According to an embodiment, a first and a second subset of the plurality of subsets of antenna elements in the 3D-antenna array are disjoined or contain common antenna elements. This criterion may also relate to each of the subsets, i.e., each of the subsets may be disjoined with respect to each other. Disjoined may be understood as having no common elements. This may allow for segmenting the 3D-antenna array.

According to an embodiment, each subset of antenna elements of the plurality of subsets is configured to form the beams into a particular direction along an elevation direction and/or an azimuth direction of the 3D-antenna array. The element-selection matrices are adapted to form the beam using the subset of antenna elements associated with depth specific direction while not using the subset of antenna elements associated with at least one other direction. This may allow to avoid interference by only using those subsets of the 3D-antenna array that may be used for forming the beam into the desired direction.

According to an embodiment, a value of an element-selection matrix comprises one of at least three values, the at least three values having a minimum value, a maximum value and at least one value therebetween. The value of the element-selection matrix comprises an amount of power provided to the antenna. This may allow to combine the functionality of the element-selection matrix with a functionality of the power allocation matrix.

According to an embodiment, at least a first and a second element-selection matrix area associated to a beam steering vector, the first and the second element-selection matrix comprising different values indicating different amounts of power to be provided to the antenna elements. The codebook of the transmitter is configured for selecting the first element-section matrix or for selecting the second-element selection matrix to be combined with the associated steering vector. This may allow to use the element-selection matrix that is more appropriate for the respective beam.

According to an embodiment, the transmitter is configured for a time-variant adaptation of the element-selection matrices based on a fading channel condition. This may allow for adapting the element-selection matrix to be selected, the values contained therein respectively based on a variation in the channel condition.

According to an embodiment, the transmitter is configured for a time-variant adaptation of the element-selection matrices responsive to a feedback signal received from a receiver associated to the transmitter, the feedback signal containing information relating to a channel state information associated to a channel between the transmitter and the receiver. This may allow to use information collected at the receiver for adapting the element-selection matrices and therefore a high amount of information.

According to an embodiment, the transmitter is configured to select the steering vectors for the directions of interest for sampling a response vector function of the 3D-antenna array at a plurality of values of azimuth and elevation angles contained in the exponents of the complex exponentials of the response vector function and/or to select the steering vectors for the directions of interest by sampling the response vector function of the 3D-antenna array at various values of trigonometric functions of the azimuth and elevation angles contained in the exponents of the complex exponentials of the response vector function. This may allow for obtaining the steering vectors based on a reproducible and predetermined criterion and may thus allow for a construction of the codebook at the transmitter using criterion that are reproducible at the receiver without transmitting the complete codebook.

According to an embodiment, the directions of interest are associated with the steering vectors in a codebook matrix and form a grid pattern in a 2D scatter plot, the grid pattern having parallel rows and parallel columns.

According to an embodiment, the 3D-antenna array comprises at least a rotational symmetry, wherein the beam-set matrix is based on a combination of component beam-set matrices, wherein first components of the component beam-set matrices are associated with a first segment of the 3D-antenna array, wherein second components of the component beam-set matrices are associated with a second segment of the 3D-antenna array and wherein the beam-set matrix comprises a Kronecker product structure of the combination. The first components are related to a first dimension of the 3D-antenna array being implemented by the first segment and the second components are related to a second dimension being implemented by the second segment of the 3D-antenna array. This allows for selectively addressing the first components and the second components and may thus allow for a low amount of data to be transmitted for indicating such an addressing.

According to an embodiment, the beam-set matrix is based on a combination of component beam-set matrices, wherein the 3D-antenna array comprises a plurality of planar antenna configurations arranged parallel to a first and a second direction, the plurality of planar antenna configurations stacked according to a linear antenna configuration along a third direction perpendicular to the first and second direction. The precoder matrix is based on a combination of a beam-set matrix comprising steering vectors for the 3D-antenna array and a selection matrix for selecting at least one steering vector from the beam-set matrix to be applied to the 3D-antenna array. The Kronecker product structure is based on a first component of the steering vectors relating to the planar antenna configurations and a second component relating to the linear antenna configuration of the 3D-antenna array. The first components and the second components are decoupled from each other. This may allow to individually addressing the components of the Kronecker product structure and by using values being decoupled from each other using a low amount of data to a change one of the components by indicating only the component to be changed.

According to an embodiment, the transmitter is configured to adapt the beamforming weights by changing one of the used first components and the second components of the beam set matrix while leaving the other component. This may be understood as adapting the beamforming weights by changing either the used first component beam-set matrix ($X_H$) or the second component beam-set matrix ($X_V$) of the beam-set matrix ($F_1$).

According to an embodiment, the transmitter is configured to adapt the beamforming weights responsive to a feedback signal, wherein the feedback signal comprises information relating to one of the first component and the second component of the beam set matrix while not comprising information relating to the other component. This may allow to implement the feedback signal comprising a low amount of data. Alternatively, the feedback signal may comprise information relating to both components.

According to an embodiment, the transmitter comprises a plurality of codebooks. Each codebook is associated to a specific subset of antenna elements, each codebook containing a set of steering vectors for the 3D-antenna array. This may allow to implement the codebooks for different subsets and may thus allow for comparatively small codebooks using a low amount of data.

According to an embodiment, the precoder comprises at least two elements of a) the precoder comprising the precoder matrix being based on the beam-set matrix and the selection matrix and the power allocation matrix adapted to selectively adjust antenna gain of the antenna elements, b) the precoder comprising the precoder matrix being based on the beam-set matrix and the selection matrix, wherein the beam-set matrix is based on a combination of component beam-set matrices associated with different segments of the 3D-antenna array and c) the precoder comprising the precoder matrix being based on the beam-set matrix and the selection matrix, wherein the beam-set matrix is based on the combination of element-selection matrices for selecting at least one antenna element to remain unused for beamforming into a direction associated with the used steering vector of the beam-set matrix ($F_1$). According to an embodiment, the 3D-antenna array comprises at least one of a cylindrical 3D-antenna array, a conical 3D-antenna array, a combination of a planar antenna array and a cylindrical 3D-antenna array, a combination of a planar antenna array and a conical 3D-antenna array and a combination of a planar antenna array, a cylindrical 3D-antenna array and a conical 3D-antenna array. This may allow to implement complex 3D-antenna array element structures.

According to an embodiment, the antenna elements of the 3D-antenna array are arranged according to at least a first and a second polarization. The beam-set matrix is a block diagonal matrix comprising a first block being a first submatrix associated to the first polarization and comprising a second block being a second submatrix associated to the second polarization. This may allow for further increasing precision of controlling the 3D-antenna array.

According to an embodiment, the 3D-antenna array comprises a plurality of planar antenna configurations arranged parallel to a first and a second direction, the plurality of planar antenna configurations stacked according to a linear antenna configuration along a third direction perpendicular to the first and second direction. This may allow to construct the 3D-antenna array according to a plurality of 2D-antenna arrays.

According to an embodiment, the transmitter is configured to transmit, to a receiver, a signal indicating at least one of information indicating a 3D shape of the antenna array; information indicating a number of antenna elements and an antenna element spacing; information indicating a divisibility of antenna elements into subsets of antenna elements; information indicating a down tilt of the 3D-antenna array with respect to a reference plane; and information indicating an orientation of the 3D-antenna array. Such information may allow to construct a codebook table at the receiver without transmitting all of the data of the codebook.

According to an embodiment, a transmitter comprises a 3D-antenna array comprising a plurality of antenna elements for a wireless communication with at least one receiver and a precoder connected to the antenna array, the precoder configured to apply a set of beamforming weights to the 3D-antenna array using a precoder matrix, the beamforming weights selected from a codebook associated with the 3D-antenna array, the transmitter configured to form one or more transmit/receive beams pointing in directions of interest using the codebook. The codebook is a table that comprises the candidates for each of the directions, wherein the codebook comprises a structure being based on a combination of a plurality of component matrices of the precoder, wherein the precoder is configured to select single components of the component matrices so as to select the beamforming weights. The specific components comprise at least one of a subset of 3D-antenna array elements and a power allocation to the antenna. These components are indicated by indices in addition to the Precoder Matrix Indices (PMIs) and Rank Indexes (RIs) defined in the state-of-the-art. The new indices to identify these components (power-allocation and element-selection) in a codebook may be similar to the PMI in the purpose they satisfy. The precoder matrix of the precoder is based on a beam-set matrix containing the array steering vectors and a selection matrix and a power allocation matrix adapted to selectively-adjust the power allocated to the antenna elements; or the precoder comprises a precoder matrix that is based on a beam-set matrix and a selection matrix, wherein the beam-set matrix is based on a combination of component beam-set matrices associated with different segments of the antenna array; or the precoder comprises a precoder matrix that is based on a beam-set matrix and a selection matrix, wherein the beam-set matrix is based on a combination of element-selection matrices for selecting at least one antenna element to remain unused for beamforming into a direction associated with the used steering vectors of the beam-set matrix ($F_1$).

According to an embodiment, a transmitter comprises a 3D-antenna array comprising a plurality of antenna elements for a wireless communication with at least one receiver. The antenna elements are arranged according to a cylindrical and/or conical configuration. The transmitter is configured to transmit, to a receiver, a signal indicating at least one of information indicating a 3D shape of the antenna array; information indicating a number of antenna elements and an antenna elements spacing; information indicating a divisibility of the antenna elements to subsets of antenna elements; information indicating a down tilt of the antenna array with respect to a reference plane; and information indicating an orientation of the 3D-antenna array. This allows a transmitter so as to provide to the receiver data indicating or describing its 3D-antenna array.

According to an embodiment, the 3D-antenna array comprises a first 3D-antenna array subset and a second 3D-antenna array subset, wherein the first 3D-antenna array subset comprises a cylindrical configuration and the second 3D-antenna array subset comprises a conical configuration. Alternatively, the first and second 3D-antenna array subsets comprise a same configuration and differ in view of a diameter of a planar layer of the 3D-antenna array subset or a number of antenna elements within the planar layer.

According to an embodiment, the transmitter comprises a precoder connected to the 3D-antenna array. The precoder is configured to apply a set of beamforming weights to the 3D-antenna array to form one or more transmit and/or receive beams with the 3D-antenna array using the steering vectors of the array. The beams point in selected directions (directions of interest), the set of beamforming weights is selected from a codebook so as to form with the 3D-antenna array one or more transmit/receive beams pointing in the directions of interest. The precoder comprises a precoder matrix that is based on a beam-set matrix and a selection matrix and a power allocation matrix adapted to selectively adjust antenna gain of the antenna elements. Alternatively or in addition, the precoder comprises a precoder matrix that is based on a beam-set matrix and a selection matrix, wherein the beam-set matrix is based on a combination of component beam-set matrices associated with different segments of the 3D-antenna array. Alternatively or in addition, the precoder comprises a precoder matrix that is based on a beam-set matrix and a selection matrix, wherein the beam-set matrix is based on a combination of element-selection matrices for selecting at least one antenna element to remain unused for a transmission of the array steering vectors of the 3D-antenna array, i.e., for beamforming into a direction associated with the used steering vectors of the beam-set matrix. Alternatively or in addition, the beam-set matrix in the precoder is connected to a codebook matrix comprising a plurality of array steering vectors, the codebook including a plurality of sets of beamforming weights for a plurality of selected directions. The transmitter is configured to select the steering vectors for the directions of interest by sampling a response vector function of the 3D-antenna array at a plurality of values of azimuth and elevation angles contained in the exponents of the complex exponentials of the response vector function; and/or is configured to select the steering vectors for the directions of interest by sampling the response vector function of the 3D-antenna array at various values of trigonometric functions of the azimuth and elevation angles contained in the exponents of the complex exponentials of the response vector function.

According to an embodiment, the user equipment comprises an antenna for a wireless communication with a transmitter and a signal processor to receive and process a radio signal received at the antenna via a radio channel. The user equipment is configured to construct a codebook table including a plurality of sets of beamforming weights for a plurality of directions using information relating to a layout of a 3D-antenna array of the transmitter.

Such information may include one or more of a number of layers in a cylindrical or conical configuration of the antenna elements, a number of antenna elements in each of the layers, a distance between the layers, a polarization of the antenna elements, the center frequency of the 3D-antenna array, an over-the-top (OTT) information with respect to an antenna type, a geometry of the 3D-antenna array, differences or distances between antenna elements with respect to single center frequencies in wavelength, serial numbers of a module, a transmit power used by the base station in a given segment of the 3D-antenna array, a broad side of selected antenna segments or the like. This may allow to construct the codebook table at the receiver or user equipment and may thus involve a low amount of data to be transmitted when compared to a complete codebook.

According to an embodiment, the user equipment is configured to select the steering vectors from the generated codebook matrix as was described in connection with the transmitter. This may allow to determine steering vectors that are used at the transmitter such that the user equipment may indicate a steering vector that is used at the transmitter.

According to an embodiment, the user equipment is configured to transmit, to a transmitter, a request signal indicating that the transmitter is requested to transmit a signal comprising information relating to the layout. Thus, the user equipment may request the information that is used for generating the codebook.

According to an embodiment, the user equipment is configured to transmit a signal indicting a beam to be formed at the transmitter, using the information relating to the layout of the 3D-antenna array. This may include, for example, indicating a steering vector to be used after having generated and/or sampled the codebook matrix. This may allow for an efficient communication between the transmitter and the user equipment.

According to an embodiment, the user equipment is configured to operate in a wireless communication network. The user equipment is configured to transmit a request signal comprising information that indicates a request to transmit, to the user equipment, information relating to the layout of the 3D-antenna array.

According to an embodiment, the user equipment is configured to determine and to transmit, to the serving base station of the user equipment, at least one of a subset of antenna elements to be used by the serving base station to transmit a signal to the user equipment; and information indicating a specific power allocation matrix to be used by the serving base station to transmit a signal to the user equipment.

According to an embodiment, the user equipment is configured to transmit the determined information in regular intervals. This may allow for updating parameters of communication at the base station.

According to an embodiment, the user equipment is configured to transmit the determined information responsive to a request received from the serving base station. Thus, the user equipment may provide the serving base station with parameters for enhancing communication responsive to a request.

According to an embodiment, the user equipment is configured for a wireless communication with a transmitter according to embodiments described herein. The user equipment is configured to construct a codebook table including a plurality of sets of beamforming weights for a plurality of directions. The codebook may mirror the capabilities of the serving base station such that a construction of the codebook table may allow the user equipment to obtain information relating to the capabilities of the serving base station.

According to an embodiment, a wireless communication network comprises a transmitter according to embodiments described herein and one or more user equipment according to embodiments described herein.

According to an embodiment, the transmitter is a base station serving a user equipment or is a user equipment served by a base station. Thus, the transmitter may be implemented by a base station and/or by a user equipment. Further embodiments related to a method for operating a transmitter, to a method for providing a transmitter comprising a 3D-antenna array, to a method for operating a user equipment, to a method for obtaining a codebook matrix and to a computer program.

BRIEF DESCRIPTION OF THE DRAWINGS

Embodiments of the present invention will be detailed subsequently referring to the appended drawings, in which:

FIG. 1 shows a uniform planar antenna array (UPA);

FIG. 2 shows on the left a typical multi-sector antenna deployment, and a commercial 64 TRx M-MIMO radio heads on the right.

FIG. 7a shows a schematic diagram illustrating vectors sampled from a codebook according to an embodiment;

FIG. 7b shows a schematic diagram illustrating vectors sampled according to a grid-like pattern from a codebook according to an embodiment;

FIG. 8 shows an example codebook structure for a 3D antenna array according to an embodiment;

FIG. 9 shows an example codebook table for a 3D-antenna array and an associated codebook table for performing beamforming with power-loading according to an embodiment;

FIG. 10 shows a schematic diagram of an example codebook structure for a Kronecker product model of the precoder according to an embodiment;

DETAILED DESCRIPTION OF THE INVENTION

Figure 3:
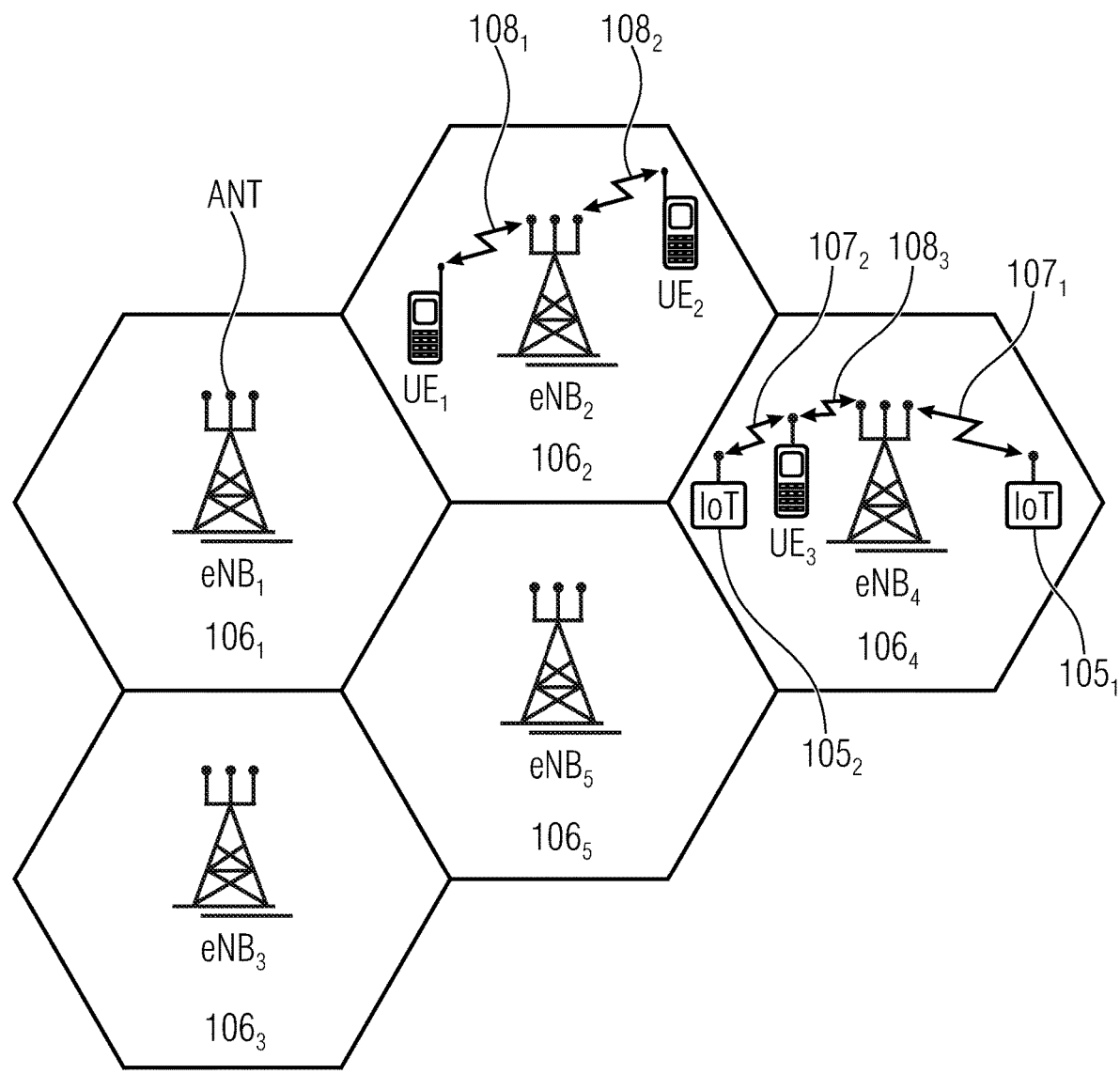
FIG. 3 shows a schematic representation of an example of a wireless network.
Figure 4:
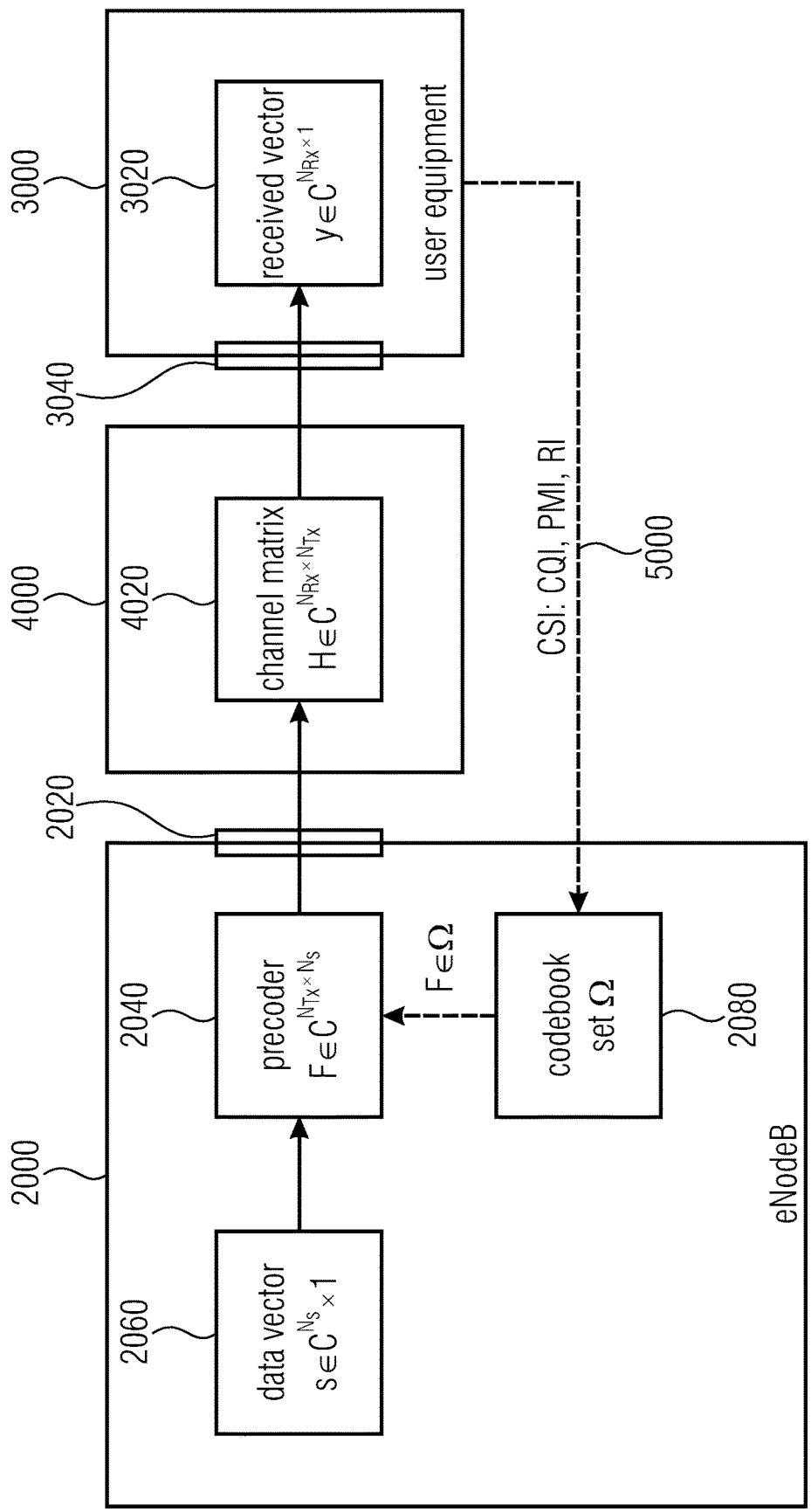
FIG. 4 shows a block-based model of the MIMO DL transmission using codebook-based-precoding in accordance with LTE release 8.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Figure 5:
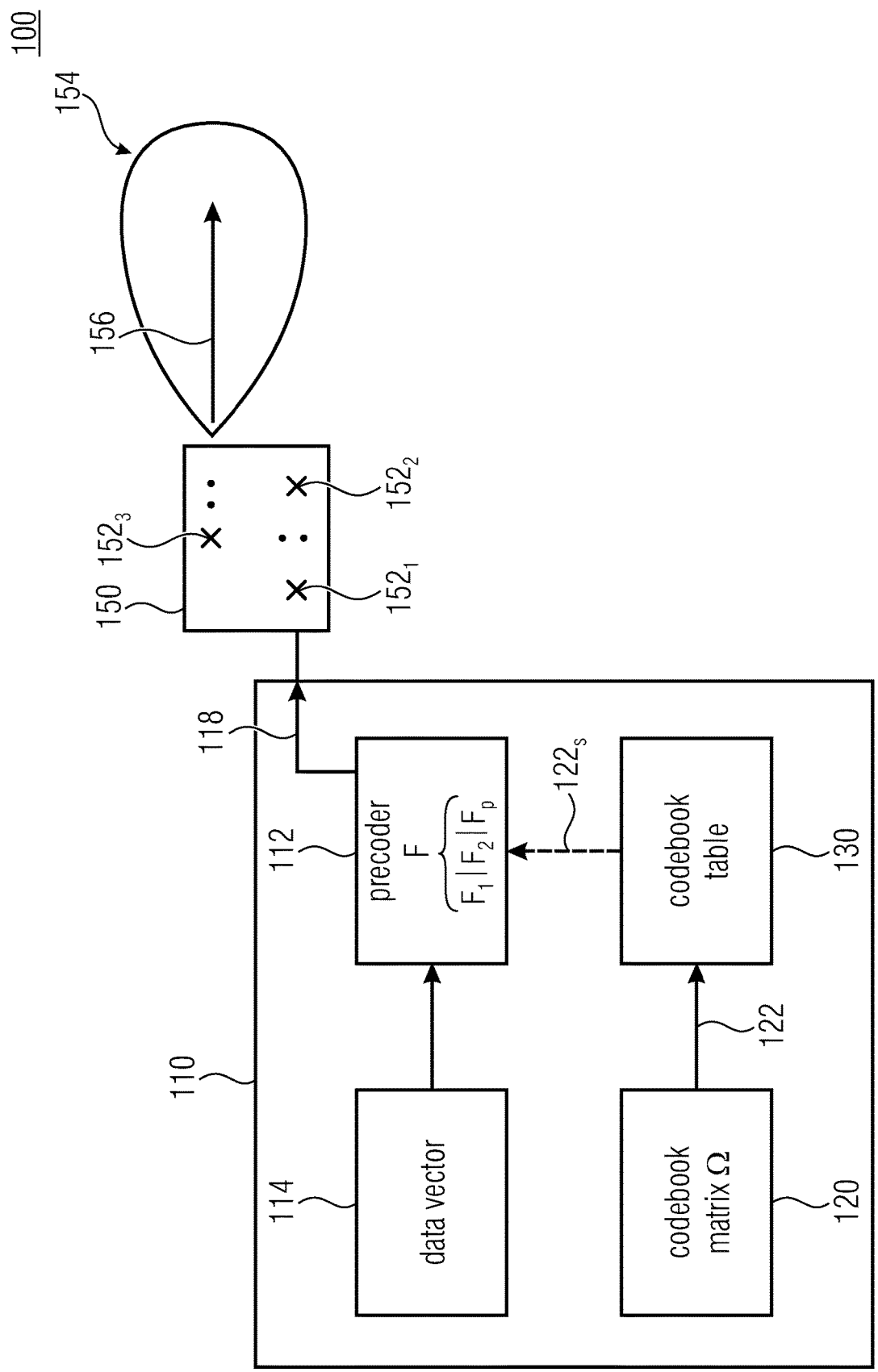
FIG. 5 shows a schematic block diagram of a transmitter according to an embodiment.

FIG. 5 shows a schematic block diagram of a transmitter 100 according to an embodiment. The transmitter 100 comprises a calculation unit 110 and a 3D-antenna array 150. A 3D-antenna array may be understood as an antenna array that comprises a plurality of antenna elements $152_1$ to $152_3$ that are arranged according to a three-dimensional pattern which may be expressed such that two or at least three antenna elements $152_1$, $152_2$ and $152_3$ are spanning a two-dimensional antenna plane and a fourth antenna element $152_4$ is arranged outside the two-dimensional antenna plane. Alternatively or in addition, a first antenna element may be configured to transmit a signal into a first direction and a second antenna element may be configured to transmit a transmitted signal into a second direction and not to the first direction, i.e., it excludes the first direction covered by the first antenna element from transmission. Each antenna element 151 to 153 is configured to transmit a signal, i.e., to radiate electromagnetic energy, with a radiation pattern. The radiation patterns of the antenna elements 151 to 153 overlap with respect to each other, i.e., each of the patterns overlaps with at least one other pattern. The radiation patterns may overlap, for example, in a space into which the electromagnetic energy is transmitted may be the same. For example, based on different polarizations or the like, a path of propagation, a direction into which the signal is transmitted, may be different and/or excluding one the other.

The plurality of antenna elements $152_1$ to $152_3$ is adapted for a coherent wireless communication in a wireless communication system. Coherent may be understood in that the antenna elements $152_1$ to $152_3$ are driven by a same clock and/or that phase drifts between the clocks feeding the various antenna elements is zero, i.e., that the clocks are synchronized so as to minimize a phase drift therebetween.

Although the 3D-antenna array 150 is illustrated as comprising four antenna elements $152_1$ to $152_4$, a different number of at least two antenna elements may be used such as at least two, at least three but typically more than ten, more than twenty, more than fifty or even more than one hundred. As will be described later in more detail, the transmitter 100 may be configured to transmit a signal with the 3D-antenna array 150 that comprises information relating to a layout of the 3D-antenna array 150. Three dimensional antenna configurations allow a more flexible antenna mount on existing monopoles. Some of the described 3D antenna shapes are based on stacked circular arrays and/or cylindrical and conical arrays and allow for a higher flexibility since they can be mounted as half-cylindrical array or a full-cylindrical array on an existing monopole. A higher performance may be obtained, since interference between multiple cylindrical arrays can be better optimized, and thus beamforming gains can be better exploited.

The transmitter 100 comprises a precoder 112 which is connected to the 3D-antenna array 150. The precoder 112 is configured to apply a set of beamforming weights to the 3D-antenna array 150 so as to form one or more beams 154 with the 3D-antenna array 150. The one or more beams 154 point in directions of interest which may be referred to as a direction along which a main lobe of the 3D-antenna array 150 extends. The direction of interest 156 may be selected based on the beamforming weights as will be described in more detail later.

The one or more beams 154 may be used so as to define an advantageous direction or pattern of signal propagation when the transmitter 100 transmits a signal. Without limitation, the beam 154 may be used for an advantageous direction when receiving a signal, i.e., the transmitter 100 may also adapt an advantageous direction of reception.

For implementing the one or more beams 154, the precoder 112 may be configured to combine a data vector and a steering vector 122 so as to obtain a result 118 of the combination which may be fed to the antenna array 150. The steering vector may contain a set of beam forming weights to be applied to the antenna array 150, i.e., weights and/or gains to be applied to the antenna elements $152_1$ to $152_3$.

A plurality of steering vectors 122 may be contained in a codebook matrix 120. As will be described later in more detail, the steering vectors 122 may be obtained, for example, by selecting specific results of a response vector function of the 3D-antenna array, the response vector function linking the directions along which the 3D-antenna element may form a beam. Such specific results may be obtained by sampling the response vector function. The calculation unit 110 may comprise or may be connected to a codebook table 130 which may comprise selected steering vectors $122_s$ and may provide those selected steering vectors $122_s$ to the precoder 112. The selected steering vectors $122_s$ may thus be at least a subset of the steering vectors 122. The codebook matrix may contain a set including Ω including the set of steering vectors that may be selected by the precoder 112 for implementing the directions of interest 156.

The codebook table 130 (or just codebook) may furthermore contain the possible components of the beam-set matrix $F_1$, the selection matrix $F_2$ and/or the power selection matrix $F_P$ of the precoder matrix F, i.e., the candidate components that can go into assembling a precoder matrix. The candidate beam-set matrices ($F_1$) in the codebook table 130 are obtained by choosing various subsets of columns from the codebook matrix Ω. The precoder 112 is put together by taking the components from the codebook table 130. The components to be used to obtain the precoder are indicated by the various indices which will be described later in more detail and may relate to PMI, RI, etc. The indices may be fed by a receiver of the transmitter, e.g., by using a feedback signal that decides what the best fit precoder should be used for the channel it sees/estimates.

For selecting the steering vector 122 from the codebook matrix 120, the precoder may use a precoder matrix F. The precoder matrix F is based on a beam-set matrix $F_1$, a selection matrix $F_2$ and a power allocation matrix $F_P$. With each beam to be formed, i.e., to each steering vector, a beam-set matrix $F_1$ may be associated. The power allocation matrix $F_P$ comprises power values that indicate a power to be allocated to the antenna elements $152_1$ to $152_3$ of the 3D-antenna array 150. The power allocation matrix $F_P$ is adapted to selectively adjust an antenna gain of the antenna elements $152_1$ to $152_3$ by allocating the power.

For describing the precoder structure in more detail, first some details are described with respect to the codebook and the codebook matrix. By way of non-limiting example only, the following discussion will focus on the design of a codebook for 3D-antenna arrays that are formed according to cylindrical arrays, i.e., they are formed by a plurality of uniform planar arrays (UPAs) are stacked aligned so as to a uniform linear array (ULA) structure. Although some specific details relate to such a cylindrical array, the disclosure contained herein also relates to 3D-antenna array configurations in general. Thus, the details provided relate to generic 3D-antenna array configurations for which a cylindrical antenna array is an example.

By way of example, a stacked uniform circular array (SUCA) or a cylindrical array consists or at least comprises of several stacked uniform circular arrays with identical geometry. The response of a SUCA can be expressed as a Kronecker product of the response of the UCA in one row/stack of the cylinder and the response of the ULA in each column of the cylinder.

Figure 6:
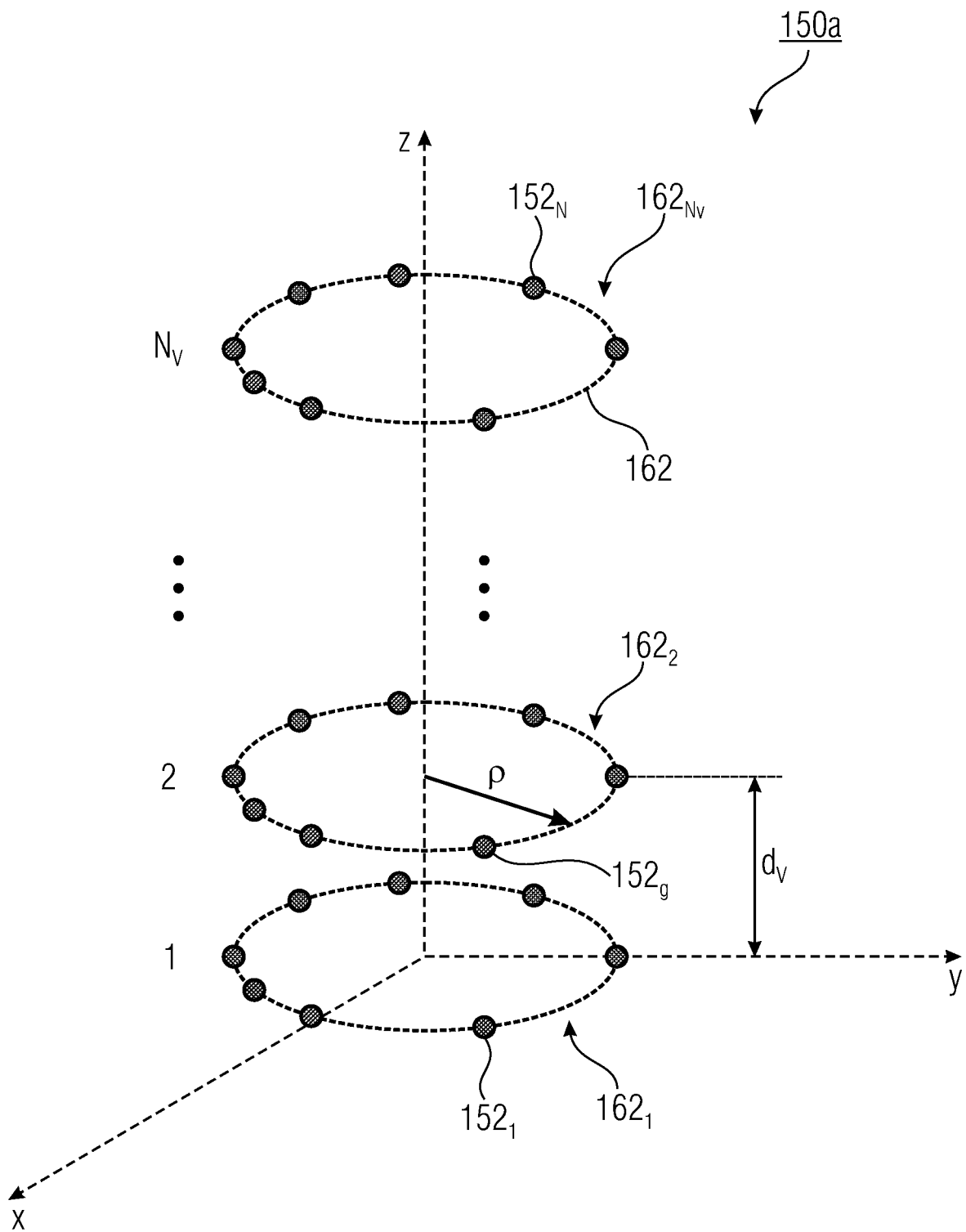
FIG. 6 shows a uniform cylindrical array according to an embodiment.

A cylindrical array with $N_V$ stacks of UCAs, separated by distance $d_V$ from each other, and each UCA with a radius ρ and $N_H$ antenna elements placed uniformly on the circumference of the circle is considered here. The narrowband response of the array considering isotropic antenna elements, $a(θ, φ) \in \mathbb{C}^{N_V N_H \times 1}$ for the azimuth angle φ the and elevation angle θ is $$a(θ,φ)=a_V(θ,φ) \otimes a_H(θ,φ), \quad (9)$$

where $a_V(θ, φ) \in \mathbb{C}^{N_V \times 1}$ is the response of the ULA having $N_V$ antenna elements in each column of the cylinder, and $a_H(θ,φ) \in \mathbb{C}^{N_H \times 1}$ is the response of the UCA in a row of the cylindrical stack. This isotropic, narrowband array response in (9) denotes the spatial signature of the array whose elements are present in the $N_V N_H$ positions as shown in FIG. 6, without taking the polarization of the element at each position into account. FIG. 6 shows a uniform cylindrical array with $N_V$ UCA stacks separated by distance $d_V$ from each other, and the UCA in each stack with $N_H$ elements and radius ρ.

The responses of the component UCA [4] and ULA in the SUCA as shown in FIG. 6, are given by $$a_V(\theta, \varphi) = \begin{bmatrix} 1 \\ e^{j\frac{2\pi d_V}{\lambda}\cos\theta} \\ \vdots \\ e^{j\frac{2\pi d_V}{\lambda}(N_V-1)\cos\theta} \end{bmatrix} \quad (10)$$

$$\text{and } a_H(\theta, \varphi) = \begin{bmatrix} e^{j\frac{2\pi\rho}{\lambda}\sin\theta\cdot\cos(\varphi-\gamma_1)} \\ e^{j\frac{2\pi\rho}{\lambda}\sin\theta\cdot\cos(\varphi-\gamma_2)} \\ \vdots \\ e^{j\frac{2\pi\rho}{\lambda}\sin\theta\cdot\cos(\varphi-\gamma_{N_H})} \end{bmatrix}$$

-continued $$\text{with } \gamma_n = \frac{2\pi(n-1)}{N_H}, n = 1, 2, \ldots, N_H.$$

The first step in the 'Codebook' design for an array is to define the codebook matrices that contain sets of candidate steering vectors that may be used to form a desired beam.

The illustrated 3D-antenna array 150a may thus comprise a plurality of planar antenna configurations $162_1$ to $162_{N_V}$ that are arranged parallel to the x-direction and the y-direction. The plurality of planar antenna configurations $162_1$ to $162_{N_V}$ may be stacked according to a linear configuration along the z-direction perpendicular to the x-direction and the y-direction. Each of the planar antenna configurations may form a subset of a total number of antenna elements and form an example segment of the 3D-antenna array 150a. A segment of an antenna array may be understood as relating to a particular dimension of the 3D-antenna array such as layers, rows and/or columns.

3D-antenna arrays may be configured to direct a beam in each direction along an azimuth angle and an elevation angle of a sphere surface.

When referring again to FIG. 5, the set Ω 120 may be selected or chosen by a specific implementation rule or sampling rule that allows to reproduce the set Ω from the layout of the 3D-antenna array and/or the response vector function. The codebook or codebook table 130 may be constructed based thereon and thus based on the layout of the 3D antenna array. Such a selection may be performed based on a sampling a response vector function of the 3D-antenna array at various values of an azimuth angle and an elevation angle found in exponents of complex exponentials of the response vector function and/or by sampling the response vector function of the 3D-antenna array at various values of trigonometric functions of the azimuth and elevation angles in the exponents of the complex exponentials in the response vector function. The first option may be referred to as an angular space sampling. This angular space sampling may be performed at arbitrary but predetermined values of the elevation angle and the azimuth angle as illustrated in FIG. 7a but may also be executed according to a grid-based angular sampling as indicated in FIG. 7b. The grid-based angular sampling according to FIG. 7b may result that the directions of interest which are associated with the steering vectors in the codebook matrix form a grid-like pattern in a 2D scatter plot being illustrated in FIG. 7b. The grid pattern may comprise parallel rows 402 and parallel columns 404, wherein rows and column may be (but are not required) perpendicular with respect to each other. This may allow to obtain the grid-like pattern in the codebook matrix 120 and may thus allow for a regular pattern in which, or out of which, the beam to be implemented or the plurality of beams to be implemented may be selected. To be more specific, the following explanation should be considered:

1) Angular space sampling: The candidate steering vectors for the codebook matrix can be obtained by taking response vectors specific to certain points in the angular space (specific azimuth and elevation angles that denote a certain direction). Considering that we take a total of T points in the angular space and they can be represented by an elevation-azimuth pair $(\theta_t, \varphi_t)$, $t=1, 2, \ldots, T$, the codebook matrix $\Omega \in \mathbb{C}^{N_V N_H \times T}$ for the cylindrical array is written as $$\Omega = [b_1 \ \ldots \ b_t \ \ldots \ b_T] \quad (11)$$

where $$b_t = b_{V,t} \otimes b_{H,t} \quad (12)$$

with $$b_{V,t} = \frac{1}{\sqrt{N_V}} \begin{bmatrix} 1 \\ e^{j\frac{2\pi d_V}{\lambda}\cos\theta_t} \\ \vdots \\ e^{j\frac{2\pi d_V}{\lambda}(N_V-1)\cos\theta_t} \end{bmatrix} \quad (13)$$

and $$b_{H,t} = \frac{1}{\sqrt{N_H}} \begin{bmatrix} e^{j\frac{2\pi\rho}{\lambda}\sin\theta_t \cdot \cos(\varphi_t - \gamma_1)} \\ e^{j\frac{2\pi\rho}{\lambda}\sin\theta_t \cdot \cos(\varphi_t - \gamma_2)} \\ \vdots \\ e^{j\frac{2\pi\rho}{\lambda}\sin\theta_t \cdot \cos(\varphi_t - \gamma_{N_H})} \end{bmatrix} \quad (14)$$

A specific type of angular sampling named grid-based angular sampling can also be employed to obtain the codebook matrix:

From the range of possible elevation angles in which the array can perform beamforming, a total of P points/directions $\theta_1, \theta_2, \ldots, \theta_P$ are taken.

A total of Q points/directions $\varphi_1, \varphi_2, \ldots, \varphi_Q$ are taken/sampled from the range of azimuth angles.

The steering vectors of all possible combinations of the set of elevation and azimuth angle samples $(\theta_p, \varphi_q)$, $p=1, 2, \ldots, P$ and $q=1, 2, \ldots, Q$ are the candidate steering vectors.

Therefore, the codebook matrix containing the candidate steering vectors $\Omega \in \mathbb{C}^{N_V N_H \times PQ}$ is $$\Omega = [b_{1,1} \ b_{1,2} \ \ldots \ b_{p,q} \ \ldots \ b_{P,Q}] \quad (15)$$

where $$b_{p,q} = b_{V,p,q} \otimes b_{H,p,q} \quad (16)$$

with $$b_{V,p,q} = \frac{1}{\sqrt{N_V}} \begin{bmatrix} 1 \\ e^{j\frac{2\pi d_V}{\lambda}\cos\theta_p} \\ \vdots \\ e^{j\frac{2\pi d_V}{\lambda}(N_V-1)\cos\theta_p} \end{bmatrix} \quad (17)$$

and $$b_{H,p,q} = \frac{1}{\sqrt{N_H}} \begin{bmatrix} e^{j\frac{2\pi\rho}{\lambda}\sin\theta_p \cdot \cos(\varphi_q - \gamma_1)} \\ e^{j\frac{2\pi\rho}{\lambda}\sin\theta_p \cdot \cos(\varphi_q - \gamma_2)} \\ \vdots \\ e^{j\frac{2\pi\rho}{\lambda}\sin\theta_p \cdot \cos(\varphi_q - \gamma_{N_H})} \end{bmatrix} \quad (18)$$

Sufficient caution should be applied while applying grid-based sampling technique to ensure that every sample taken in the elevation direction is a viable beamforming direction for every sampled azimuth direction. Moreover, it is only an example technique to sample the angular space and not the only technique that could be used. FIGS. 7a and 7b show the angular samples obtained by a generic sampling method and a grid-based method to obtain the codebook matrix that contains the candidate steering vectors.

The expression a (θ, φ) in formula (9) thus represents an example response vector function of the 3D antenna array. By sampling the response vector function or their components, the codebook matrix Ω may be obtained, i.e., the candidate beamforming vectors in the codebook matrix may be obtained by sampling this functions at various values of azimuth and elevation angles. To be more specific, the codebook matrix Ω may contain the candidate steering vectors that are obtained by sampling the response vector function, e.g., a (θ, φ). The beam-set matrix $F_1$ in the precoder is formed by choosing a subset of columns from the codebook matrix.

This may be written in a Kronecker product structure as illustrated in formula (9), depending on the geometry of the array, in which the component beam-set matrices $a_V$ and $a_H$ may relate to different segments of the 3D-antenna array being associated with a horizontal dimension, to a vertical dimension respectively. As illustrated in formula (10) $a_V$ and $a_H$ may comprise a vector-form in which the respective elements are complex exponentials, i.e., complex elements of the response vector function. Those complex exponentials may comprise a base and an exponent.

When performing the described angular space sampling, the response vector function may be sampled at a plurality of values of azimuth and elevation angles in the exponents. This may be understood as an arbitrary or regular distance between the single angles.

Alternatively or in addition, an exponent range sampling may be performed in which the response vector function of the 3D-antenna array is sampled at various values of trigonometric functions of the azimuth and elevation angles contained in the exponents of the complex exponentials in the response vector function. By way of example, 2) Exponent range sampling: The array steering vectors can be discretized by sampling the range of the values of the trigonometric exponents in (13) and (14) instead of the angles. Parametrizing the steering vectors of the component UCAs and ULA of the SUCA from the equation (13) and (14) using the trigonometric functions $c_\theta = \cos\theta$ and $c_\varphi = \cos\varphi$, we have $$b_V(c_\theta, c_\varphi) = \frac{1}{\sqrt{N_V}} \begin{bmatrix} 1 \\ e^{j\frac{2\pi d_V}{\lambda} \cdot c_\theta} \\ \vdots \\ e^{j\frac{2\pi d_V}{\lambda}(N_V-1)c_\theta} \end{bmatrix} \quad (19)$$

and $$b_H(c_\theta, c_\varphi) = \frac{1}{\sqrt{N_H}} \begin{bmatrix} e^{j\frac{2\pi \rho}{\lambda} \cdot \sqrt{1-c_\theta^2} \cdot (c_\varphi \cdot \cos\gamma_1 + \sqrt{1-c_\varphi^2} \cdot \sin\gamma_1)} \\ e^{j\frac{2\pi \rho}{\lambda} \cdot \sqrt{1-c_\theta^2} \cdot (c_\varphi \cdot \cos\gamma_2 + \sqrt{1-c_\varphi^2} \cdot \sin\gamma_2)} \\ \vdots \\ e^{j\frac{2\pi \rho}{\lambda} \cdot \sqrt{1-c_\theta^2} \cdot (c_\varphi \cdot \cos\gamma_{N_H} + \sqrt{1-c_\varphi^2} \cdot \sin\gamma_{N_H})} \end{bmatrix}. \quad (20)$$

Taking a total of T different values of the ordered pair ($c_\theta$, $c_\varphi$) from the viable exponent range values, we obtain the codebook matrix for the cylindrical array, $$\Omega = [b_1 \ \ldots \ b_t \ \ldots \ b_T] \quad (21)$$

where $$b_t = b_{V,t} \otimes b_{H,t}, \ t = 1, \ldots, T \quad (22)$$

with $$b_{V,t} = \frac{1}{\sqrt{N_V}} \begin{bmatrix} 1 \\ e^{j\frac{2\pi d_V}{\lambda} \cdot c_{\theta,t}} \\ \vdots \\ e^{j\frac{2\pi d_V}{\lambda}(N_V-1)c_{\theta,t}} \end{bmatrix} \quad (23)$$

and $$b_{H,t} = \frac{1}{\sqrt{N_H}} \begin{bmatrix} e^{j\frac{2\pi \rho}{\lambda} \cdot \sqrt{1-c_{\theta,t}^2} \cdot (c_{\varphi,t} \cdot \cos\gamma_1 + \sqrt{1-c_{\varphi,t}^2} \cdot \sin\gamma_1)} \\ e^{j\frac{2\pi \rho}{\lambda} \cdot \sqrt{1-c_{\theta,t}^2} \cdot (c_{\varphi,t} \cdot \cos\gamma_2 + \sqrt{1-c_{\varphi,t}^2} \cdot \sin\gamma_2)} \\ \vdots \\ e^{j\frac{2\pi \rho}{\lambda} \cdot \sqrt{1-c_{\theta,t}^2} \cdot (c_{\varphi,t} \cdot \cos\gamma_{N_H} + \sqrt{1-c_{\varphi,t}^2} \cdot \sin\gamma_{N_H})} \end{bmatrix} \quad (24)$$

Similar to grid-based angular sampling, grid-based exponent range sampling can also be performed to obtain the codebook matrix Ω.

A total of P samples $c_{\theta,p}$, p=1, 2, ..., P∀$c_{\theta,p}$∈[−1,1] are taken from the exponent corresponding to the elevation, $c_\theta = \cos\theta$.

From the exponent corresponding to the azimuth, $c_\varphi = \cos\varphi$, Q viable samples $c_{\varphi,q}$, q=1, 2, ..., Q∀$c_{\varphi,q}$∈[−1,1] are obtained.

The steering vectors are obtained for all possible combinations of the sampled exponents: ($c_{\theta,p}$, $c_{\varphi,q}$), p=1, 2, ..., P and q=1, 2, ..., Q.

Thus, the codebook matrix using separate elevation and azimuth exponent range sampling is $$\Omega = [b_{1,1} \ b_{1,2} \ \ldots \ b_{p,q} \ \ldots \ b_{P,Q}] \quad (25)$$

where $$b_{p,q} = b_{V,p,q} \otimes b_{H,p,q} \quad (26)$$

with $$b_{V,p,q} = \frac{1}{\sqrt{N_V}} \begin{bmatrix} 1 \\ e^{j\frac{2\pi d_V}{\lambda} \cdot c_{\theta,p}} \\ \vdots \\ e^{j\frac{2\pi d_V}{\lambda}(N_V-1)c_{\theta,p}} \end{bmatrix} \quad (27)$$

and $$b_{H,p,q} = \frac{1}{\sqrt{N_H}} \begin{bmatrix} e^{j\frac{2\pi \rho}{\lambda} \cdot \sqrt{1-c_{\theta,p}^2} \cdot (c_{\varphi,q} \cdot \cos\gamma_1 + \sqrt{1-c_{\varphi,q}^2} \cdot \sin\gamma_1)} \\ e^{j\frac{2\pi \rho}{\lambda} \cdot \sqrt{1-c_{\theta,p}^2} \cdot (c_{\varphi,q} \cdot \cos\gamma_2 + \sqrt{1-c_{\varphi,q}^2} \cdot \sin\gamma_2)} \\ \vdots \\ e^{j\frac{2\pi \rho}{\lambda} \cdot \sqrt{1-c_{\theta,p}^2} \cdot (c_{\varphi,q} \cdot \cos\gamma_{N_H} + \sqrt{1-c_{\varphi,q}^2} \cdot \sin\gamma_{N_H})} \end{bmatrix}. \quad (28)$$

The grid-based exponent range sampling should employ similar caution as in grid-based angular space sampling to ensure the exponent range values sampled translate into viable directions of beamforming.

The exponent range sampling method is different from the angular space sampling in the sense that it may result in steering vectors that have more than one peak gain direction in the beam pattern. Depending on the frequency of deployment, coverage requirements and various other practical considerations, such a feature in the beam pattern could be exploited.

Both samplings may be made arbitrary or according to a uniformity of sampling intervals between successive samples for both the angular space and the exponent range sampling. Both samplings for obtaining the codebook matrix that contains the candidate steering vectors, angular space sampling and exponent range sampling, may be performed so as to obtain a grid-based sampling. This is applicable for the cylindrical array as described but also for other 3D-antenna arrays.

The transmitter 100 may be configured to generate or determine the codebook using information relating to the layout of the 3D-antenna array. For obtaining the codebook matrix 120, the transmitter may be configured to sample response vector function as described above. Although this may result in computational effort, it allows to avoid a transmission of the codebook matrix 120 and/or the codebook table 130 which may comprise a significant amount of data. Furthermore, it may allow to transmit information relating to the layout of the 3D-antenna array 150 to other nodes such as a user equipment so as to enable them to determine or generate the codebook and thereby the codebook matrix 120 by using this information. Different transmitters 100 may have different layouts of a respective 3D-antenna array 150 such that a user equipment or other communicating nodes would have to store a high number of codebooks or codebook matrices for each possible configuration and would fail to properly communicate if the communication is initiated with a transmitter that has an antenna array with an unknown layout or geometry.

The information relating to the layout of the 3D-antenna array may include but is not limited to one or more of a number of layers in a cylindrical or conical configuration of the antenna elements, a number of antenna elements in each of the layers, a distance between the layers, a polarization of the antenna elements, the center frequency of the 3D-antenna array, an over-the-top (OTT) information with respect to an antenna type, a geometry of the 3D-antenna array, differences or distances between antenna elements with respect to single center frequencies in wavelength, serial numbers of a module, a transmit power used by the base station in a given segment of the 3D-antenna array, a broad side of selected antenna segments or the like.

Thereby, advantages may be obtained when determining the codebook and/or the codebook matrix based on the respective layout of the 3D-antenna array 150.

In the following, reference is made to a structure of precoders that may be used in embodiments described herein, for example, in the precoder 112.

Similar to FD-MIMO in LTE release 13 [1], the proposed precoding matrix $F \in \mathbb{C}^{2M \times D'}$ for a 3D array with M antenna elements per orientation/polarization and two orthogonal antenna polarizations at each position, has a two-stage structure as follows:

$$F = F_1 F_2 = \begin{bmatrix} X_1 & 0 \\ 0 & X_2 \end{bmatrix} \quad (29)$$

$$F_2 = \begin{bmatrix} s_1^{(1)} & s_2^{(1)} & \cdots & s_D^{(1)} & 0 \\ 0 & & & s_1^{(2)} & s_2^{(2)} & \cdots & s_D^{(2)} \end{bmatrix} [c_1 \cdots c_{D'}].$$

Here, the vectors $s_d^{(e)} \in \mathbb{C}^{M \times 1}$, d=1, 2, ..., D; e=1, 2 are the array steering vectors of the SUCA of the e-th polarization dimension. The columns of the codebook matrix $\Omega$ correspond to the candidates for the vectors $s_d^{(e)}$.

The block diagonal matrix $F_1 \in \mathbb{C}^{2M \times 2D}$ that contains the steering vectors for one set of antenna orientations/polarizations in one block is the beam-set matrix. There is a total of D beams (steering vectors) per polarization dimension in $F_1$. The second matrix $F_2 \in \mathbb{C}^{2D \times D'}$ is used for beam-selection/combining to form a desired beam pattern. The variable D' represents here the number of data layers or the rank of the transmission.

The precoding matrix structure in (29) specific to the cylindrical array in FIG. 6 (but with two antenna polarizations at each position) consists of a beam-set matrix $F_1$ of size $2N_V N_H \times 2D$ and selection/combining matrix $F_2$ of size $2D \times D'$.

The elements of the beam-set matrix X1 and X2 may relate to a first and a second polarization of the 3D-antenna array, the antenna elements thereof respectively. The beam-set matrix may be formed as a block diagonal matrix, wherein a first block X1 may form a first submatrix associated with a first polarization and wherein a second block X2 is a second submatrix and associated to the second polarization. Polarizations may be, for example, horizontal, vertical or circular.

The two-stage structure in (29) enables separation of the steering-vector selection for each antenna polarization and the co-phasing/combining process, which in turn simplifies the feedback process for precoder selection.

In the following, reference will be made to a codebook design for non-precoded CSI-RS based feedback schemes. The specifications of FD-MIMO [1] discuss various precoding matrix structures for non-precoded CSI-RS transmissions. The receiver recommends the best-fit precoding matrix F from a 'codebook' using various indices such as the precoding matrix indices (PMI) and rank indices (RI). In this invention report, we propose a 3D array codebook design for such a feedback scheme. A 'codebook table' structure that contains possible component matrices of the precoder (beam-set matrix $F_1$ and selection/combining matrix $F_2$) is proposed along with the indices used to select them. The set of beam-set and selection/combining matrices in the codebook table provide choices for varying transmission ranks, beam steering directions and beam patterns.

The specifics of the choices/selections to be made with respect to the component matrices of the precoder may be different within 3D-antenna arrays as each 3D-antenna array may differ with respect to each other and may thus provide for different 3-dimensional effects in the antenna array. However, the codebook table structure described in the following may be considered as generic and may be used for arbitrary 3D-antenna array configurations.

The following codebook table structure is proposed for the precoder matrices $F_1$ and $F_2$ for a 3D array with M antenna elements per antenna orientation/polarization and two orthogonal antenna polarizations in each position of the array:

The rank of the transmission is the primary parameter of interest. The rank index (RI) is used to indicate the rank of the transmission. A total of R different transmission ranks (R different values of D') are possible for a given array. Thus $\lceil \log_2 R \rceil$ bits are used in the rank index (RI) to indicate the rank of the transmission.

A set of viable precoding matrices $F_1$ and $F_2$ are defined for each transmission rank. Two precoder matrix indices (PM's), PMI1 and PMI2, are used to indicate the beam-set matrix $F_1$ and selection/combining matrix $F_2$. The following table shows the structure of the codebook of precoding matrices.

Thus, the transmitter may be configured to select the steering vectors for the direction of interest by sampling the response vector function of the 3D-antenna array at the plurality of values of azimuth and elevation angles contained in the exponents of the complex exponentials of the response vector functions. Alternatively or in addition, the transmitter may be configured to select the steering vectors for the direction of interest by sampling the response vector function of the 3D-antenna array at various values of trigonometric functions of the azimuth and elevation angles contained in the exponents of the complex exponentials of the response vector function. As will be described later, a receiver may form or build at least a part of a codebook based on the layout of the transmitter antenna array, representing the codebook used by the transmitter. The receiver may indicate a specific precoding matrix to be used by the transmitter.

FIG. 8 shows an example codebook structure for a generic 3D antenna array and may be used, for example, for a cylindrical array. The precoder matrix F is based on a combination of a beam-set matrix $F_1$, a plurality of beam-set matrices $F_1$, respectively, and a corresponding number of selection/combining matrices $F_2$.

The matrices may be different between different rank indexes RI and/or between different ranks of transmissions $D'_1, \ldots D'_R$.

Each candidate beam-set matrix $F_1^{(r,k)}$, r=1, 2, ..., R; k=1, 2, ..., $K_r$ is of size 2M×2$D_{r,k}$ and the columns of the individual blocks in the matrix are chosen from the codebook matrix $\Omega$. As observed, the number of beams in the steering matrix might be different in each of the candidate matrices for a given transmission rank to satisfy various beamforming requirements.

The candidate selection/combining matrices $F_2^{(r,l)}$, r=1, 2, ..., R; l=1, 2, ..., $L_r$ are of size 2$D_{r,k}$×$D_r'$. These entries of these matrices are either unit-magnitude complex numbers or zeros that help in selecting/combining the steering vectors in the beam-set matrix.

A complete binary representation of a specific precoder matrix from the codebook (which is a table as shown in Table 1) has the following binary words:

The rank index $D_r'$ is indicated by one of R binary words of length $\lceil \log_2 R \rceil$. The PMI1 k, whose possible values are k=1, 2, ..., $K_r$, is indicated by a binary word of length $\lceil \log_2 K_r \rceil$. The PMI2 l, whose possible values are l=1, 2, ..., $L_r$, is indicated by a binary word of length $\lceil \log_2 L_r \rceil$. Therefore, the total number of bits to represent the whole precoding matrix is $\lceil \log_2 R \rceil + \lceil \log_2 K_r \rceil + \lceil \log_2 L_r \rceil$.

The number of antennas used in the precoding process can also be a subset of the total number of antennas in the array, M and hence for every specific number of antennas used for beamforming, a separate codebook table like the one in Table 1 may be maintained. Therefore, the number of codebook tables maintained would be the same as the number of array subsets considered for beamforming.

The steering vectors in the beam-set matrices $F_1^{(r,k)}$, r=1, 2, ..., R; k=1, 2, ..., $K_r$ in the codebook structure in Table 1 need not all come from the same codebook matrix $\Omega$. The steering vectors of different matrices may come from different codebook matrices with varying candidate steering vectors.

According to embodiments such a structure may be modified. In FIG. 8, the various indices used to indicate the component matrices refer to the precoder. For constructing the component matrices by way of presenting a generic framework for codebook tables, the following example may be considered, the example illustrating on how to construct the component matrices in the codebook table. Although referring to a specific example, it may be understood that the teachings may be adapted to other geometries of a 3D-antenna array.

For constructing the component matrices in the codebook table, for each transmission rank $D_r'$, r=1, ..., R, a separate codebook matrix $\Omega^{(r)}$, r=1, ..., R may be defined.

From the codebook matrix $\Omega^{(r)}$ for a given transmission rank $D_r'$ $K_r$ subsets of steering vectors are formed for the block $X_1$ of the beam-set matrix, each subset containing $D_{r,k}$ columns. $K_r$ subsets of steering vectors are formed for the block $X_2$ of the beam-set matrix, each subset containing $D_{r,k}$ columns. The two blocks $X_1$ and $X_2$ in the beam-set matrices may be distinct by choosing different subsets of vectors for each block as mentioned above (or) the same subset of columns can be used for both blocks making them identical.

The steering vectors chosen for each subset are obtained from closely placed points in the angular space/exponent range. A typical column of the selection-combining matrices $F_2^{(r,l)}$, r=1, 2, ..., R; l=1, 2, ..., $L_r$ has the following structure:

$$\begin{bmatrix} w_1 \tilde{z}_1 \\ w_2 \tilde{z}_2 \end{bmatrix} \in \mathbb{C}^{2D_{r,k} \times 1},$$

where the vectors $\tilde{z}_1, \tilde{z}_2 \in \mathbb{C}^{D_{r,k} \times 1}$ (that contain unit-magnitude complex numbers and zeros) are used to perform steering vector selection and combination within a particular antenna polarization and the unit-magnitude scalars $w_1, w_2 \in \mathbb{C}$ are used to perform co-phasing between different antenna polarizations.

According to an embodiment, the precoder matrix F may be based on a combination of the beam-set matrix $F_1$, the selection matrix $F_2$ and a power allocation matrix $F_P$. This may be referred to as a codebook with power-loading.

The codebook table presented in FIG. 8 may refer to a precoder that allocated power equally to all antenna elements. According to an embodiment, a precoder may be configured to element-by-element-wise performing a power-loading/allocation while beamforming.

For a dual-polarized array with M antenna elements per antenna orientation/polarization (with arbitrary 3D configuration/geometry), such a precoder has the following structure:

$$F = F_P F_1 F_2 = F_P \begin{bmatrix} X_1 & 0 \\ 0 & X_2 \end{bmatrix} F_2 = \begin{bmatrix} f_1 & \cdots & 0 \\ \vdots & \ddots & \vdots \\ 0 & \cdots & f_{2M} \end{bmatrix} \quad (30)$$

$$\begin{bmatrix} s_1^{(1)} & s_2^{(1)} & \cdots & s_D^{(1)} & & & 0 \\ & & 0 & & s_1^{(2)} & s_2^{(2)} & \cdots & s_D^{(2)} \end{bmatrix} [c_1 \ \cdots \ c_{D'}].$$

where $F_P \in \mathbb{C}^{2M \times 2M}$ is the power-loading/allocation matrix with a diagonal structure whose coefficients decide the amount of power fed to each element. The beam-set and the selection/combining matrices $F_1$ and $F_2$ follow the same structure as in equation (29) with $F_1$ having dimensions 2M×2D and $F_2$ of size 2D×D'.

The codebook table, in this case, has a modified structure with the inclusion of the power-loading matrix. A new PMI value, PMIP, is added for the power-allocation matrix along with the existing RI, PMI1 and PMI2.

A total of $\lceil \log_2 U_r \rceil$ bits may be used for indicating one of the candidate power-allocation matrices $F_P^{(r,k)}$, r=1, 2, ..., R; k=1, 2, ..., $U_r$ from the codebook table. Therefore the total number of bits used to indicate a precoding matrix F from FIG. 9 is $\lceil \log_2 R \rceil + \lceil \log_2 U_r \rceil + \lceil \log_2 K_r \rceil + \lceil \log_2 L_r \rceil$ given rank index r.

Thus, the precoder matrix may be based on a combination of the beam-set matrix $F_1$ comprising steering vectors for the 3D-antenna array and may be based on a selection matrix $F_2$ for selecting at least one steering vector from the beam-set matrix to be applied to the 3D-antenna array.

FIG. 9 shows an example codebook table for a 3D-antenna array and an associated codebook table for performing beamforming with power-loading. The precoder matrix F is based on a combination of the beam-set matrix $F_1$, the selection matrix $F_2$ and the power allocation matrix $F_P$. The power allocation matrix $F_P$ may comprise power values that indicate a power to be allocated to the antenna elements of the 3D-antenna array. The power allocation matrix $F_P$ may be adapted to selectively adjust an antenna gain of the antenna elements.

As mentioned before, the power allocation matrices $F_P$ may be set up for each rank index r=1, ..., R and k relating to the PMI1 being from 1 to $U_r$. The power-allocation matrices $F_P$ may be decided based on various factors such as a request by the receiver for higher power allocation which may be done, for example, using a PMIP or a power grant, deteriorating channel conditions observed by the transmitter from the CQI feedback and compensation for power-imbalances in the transmitter array. Hence, the matrix index feedback (PMIP) may not be the only factor deciding the power allocation.

According to embodiments, the power allocation may be modified or refined by a number of power levels that can be fed to an antenna element, which in turn decides the number of possible power allocation matrices and the number of bits used to indicate them. An exemplary bit-pattern to indicate the power allocated to an antenna element of the 3D-antenna array may be based on the following considerations:

The power allocation values are taken from a discrete set of values that range from 0 to a maximum power value for the element $P_{max,m}$, m=1, ..., M for the m-th antenna element. The power allocation value for the m-th antenna element is indicated with $N_P$ bits (common for all elements). This implies a total of $2^{N_P}$ possible power levels to allocate in the interval [0, $P_{max,m}$]—the uniformity of sampling the interval is decided on a case-by-case basis (based on array configuration, beam patterns that may be used, etc.). Extra bits might be used to allocate power levels higher than $P_{max,m}$ to compensate for different coupling losses/power imbalances. A codebook of the transmitter may therefore contain a plurality of precoder matrices and may comprise at least one power allocation matrix per transmission rank. The transmission rank may correspond to a number of beams that may be generated. Therefore, the index R may also be referred to as a beam index. For one, two or more separate groups of beams or even for each beam, i.e., transmission rank, a power allocation matrix may be used.

While this example provides a large set of possible power allocation matrices and hence offering more flexibility in the process, the number of bits to represent the matrix is also high. Therefore, a trade-off has to be made between flexibility of power allocation and feedback overhead.

When referring again to the example of a cylindrical 3D-antenna array, the response of the cylindrical array as seen in (9) has a Kronecker product structure. Therefore, it is possible to introduce a Kronecker product based decoupling of the beamforming vectors in the precoder for cylindrical arrays. In that case, the precoder can be written as $$F = F_1 F_2 = \begin{bmatrix} X_{V,1} \otimes X_{H,1} & 0 \\ 0 & X_{V,2} \otimes X_{H,2} \end{bmatrix} \quad (31)$$

$$F_2 = \begin{bmatrix} s_1^{(1)} & s_2^{(1)} & \ldots & s_D^{(1)} & 0 \\ 0 & & s_1^{(2)} & s_2^{(2)} & \ldots & s_D^{(2)} \end{bmatrix} [c_1 \ldots c_{D'}].$$

where the matrices $X_{V,1}$, $X_{V,2} \in \mathbb{C}^{N_V \times D_V}$ are the beam-set matrices corresponding to the ULA, and the matrices $X_{H,1}$, $X_{H,2} \in \mathbb{C}^{N_H \times D_H}$ are the beam-set matrices corresponding to the UCA. The subscripts '1' and '2' denote the two different antenna orientations in the array. The resulting total number of beam steering vectors D in each block of the beam-set matrix $F_1$ is $D_H D_V$. Each dimension or segment of the antenna array may be addressed by individual components within the Kronecker model. For such a Kronecker model of the precoder, the codebook table structure is as shown in FIG. 9.

FIG. 10 shows a schematic diagram of an example codebook structure for the Kronecker product model of the precoder that may be implemented, like the other precoder structures, in transmitters according to embodiments. Although being illustrated in different examples, the enhancements of different precoder structures may be combined with each other in various number, i.e., at least one, at least two, at least three or more. For example, the Kronecker product model structure according to FIG. 10 may be implemented together with the power-loading matrix FP according to FIG. 9. The beam-set matrix $F_1$ may be based on a combination of component beam-set matrices $X_H$ and $X_V$, that may form a structure according to formula (31) when being combined with each other. Each of the components, i.e., the matrices $X_H$ and $X_V$ may be associated to a specific segment of the 3D-antenna array, each segment containing at least one, advantageously at least two antenna elements. Thus, each of the component beam-set matrices may be addressed individually, for example, when using individual indices such as PMI11 and PMI12. The segments of the 3D-antenna array may be divided so as to allow to address different azimuth-angles with the first index, e.g., a horizontal index H using the identifier PMI11 and to amend a second direction according to which the beam is formed using a second identifier such as PMI12 for a vertical or elevation direction. A segment may be understood as a set of antenna elements and may therefore be a subset of the antenna elements of the complete 3D-antenna array. When compared to a subset of antenna elements which is used herein for describing a functional group of antenna elements within the 3D antenna array used for forming a specific beam (which may include using more than one segment), a segment may relate to different dimensions within the antenna array as will be described, for example, in connection with FIG. 11.

For example, a plurality of receivers or a moving receiver may be arranged at almost the same altitude or elevation within a wireless network cell. Therefore, it may often be unnecessary to amend the direction of a beam along the elevation-angle. By separating the beam-set matrix according to the Kronecker product model, it may be possible to only transmit the PMI11 (the PMI12 respectively) while not transmitting the other identifier and to thereby save transmitted data. This may be a sufficient amount of data so as to indicate a new direction of the beam as the transmitter may leave the not transmitted parameter unchanged. This may be of further advantage when the 3D-antenna array is formed so as to comprise a rotational symmetry, for example, when being formed as a cylindrical antenna array or a combination of a multitude of cylinders that may have the same centers of gravity of their main surfaces projected into a same plane. Thus, the transmitter using a 3D-antenna array having a rotational symmetry may use a precoder that utilizes a beam-set matrix $F_1$ which is based on a combination of component beam-set matrices $X_H$ and/or $X_V$. First components $X_H$ of the beam-set matrices $F_1$ may be associated with a first segment of the 3D-antenna array and/or a multitude of segments may be associated with a multitude of the matrices $X_H$ and may be related to a first direction along which the 3D-antenna array is configured to transmit a beam. The first direction may be one of the elevation angle and the azimuth angle. Second components $X_V$ of the beam-set matrices $F_1$ may be associated with a second segment or a plurality of second segments along a second direction along which the 3D-antenna array is configured to transmit beams. The beam-set matrix $F_1$ may comprise a Kronecker product structure of the combination of both components $X_H$ and $X_V$. The components $X_H$ and $X_V$ may be related to dimensions of the 3D-antenna array, for example, an axial extension of the cylinder and/or a rotational angle within the cylinder.

When referring again to FIG. 6, one of the components $X_H$ and $X_V$ may comprise the steering vectors of the codebook relating to the planar antenna configurations 162, wherein the other component relates to the linear antenna configuration along the z-direction and therefore to a direction within the 3D-antenna array 150a along which the antenna elements and therefore the components $X_H$ and $X_V$ are decoupled from each other. For example, one of the components may indicate a direction within the UPA $162_1$ to $162_{N_V}$ and the other may indicate one or more of the UPAs to be used.

Thereby, the transmitter may be configured to adapt the beamforming weights of the 3D-antenna array by changing only one of the first and the second components and to leave the other component. Alternatively or in addition, the transmitter may be configured to adapt the beamforming weights responsive to a feedback signal that may be received, for example, from a receiver that indicates a steering vector to be used. The feedback signal may comprise information to one of the first component and the second component $X_H$ or $X_V$ of the beam-set matrix while not comprising information relating to the other component as it may be unnecessary to transmit this information. Alternatively, the feedback signal may comprise information relating to both components. Thus, the transmitter may be configured to adapt the beamforming weights responsive to a received feedback signal such as the feedback signal 508, wherein the feedback signal 508 may comprise information relating to either the first component beam-set matrix or the second component beam-set matrix; or the feedback signal may relate to both of the first component beam-set matrix and the second component beam-set matrix $(X_V, X_H)$. This means that the information is related to either component beam-set matrix $(X_V)$ or component beam-set matrix $(X_H)$ or both component beam-set matrices Further to FIG. 10, in the present example, the beam-set matrices $X_H^{(r,k_H)}$, r=1, 2, . . . , R; $k_H$=1, 2, . . . , $K_{H,r}$ are each of size $N_H \times D_{r,k_H}$ and their columns are taken from the set of $b_{H,t} \in \mathbb{C}^{N_H \times 1}$ with t=1, 2, . . . , T. Similarly, the steering matrices $X_V^{(r,K_V)}$, r=1, 2, . . . , R; $k_V$=1, 2, . . . , $K_{V,r}$ are of size $N_V \times D_{r,k_V}$ and their columns are taken from the set of $b_{V,t} \in \mathbb{C}^{N_V \times 1}$ with t=1, 2, . . . , T. The binary representation of the precoder F based on the Kronecker product consists of the following components: The rank $D_r'$ is indicated by the rank index r, represented by one of R binary words of length $\lceil \log_2 R \rceil$. The PMI11 $k_H$ for the beam-set matrix of the UCA, whose possible values are $k_H$=1, 2, . . . , $K_{H,r}$, is indicated by a binary word of length $\lceil \log_2 K_{H,r} \rceil$. The PMI12 $k_{V,r}$ for the beam-set matrix of the ULA, whose possible values are $k_V$=1, 2, . . . , $K_{V,r}$, is indicated by a binary word of length $\lceil \log_2 K_{V,r} \rceil$. The PMI2 l, whose possible values are l=1, 2, . . . , $L_r$, is indicated by a binary word of length $\lceil \log_2 L_r \rceil$.

Therefore, the total number of bits to represent the precoding matrix F using the Kronecker product model is $\lceil \log_2 R \rceil + \lceil \log_2 K_{H,r} \rceil + \lceil \log_2 K_{V,r} \rceil + \lceil \log_2 L_r \rceil$. The indication of the beam-set matrices at times might be separate for the two different antenna orientations in the array and hence two PMI11 and PMI12 values might be used to represent the steering matrix in the precoder, $F_1$.

An advantage of the Kronecker product formulation is the separate PMI indication for the two dimensions of the array. In many cases, each dimension of the array is associated with a particular angular dimension for beamforming. The ULAs along the columns of the SUCA, for example, affect only the changes in the elevation beamforming. In many practical terrestrial base station deployments, the changes in elevation beamforming are negligible and hence they need not be updated as frequently as azimuth-beamforming-related PMI. Therefore, such a Kronecker model would help in selective PMI indication only along desired dimensions of the array and hence decrease feedback overhead.

Although the Kronecker product model extension of the codebook is described herein by way of the example according to the cylindrical 3D-antenna array it is also applicable to arbitrary 3D-antenna array configurations that may differ from one configuration to another depending on an array geometry and possible angular space samplings. According to a further aspect, an antenna array may be formed by two or more subsets of antenna elements. For some of the beams, it may be sufficient to only use one or more of the subsets of antenna elements whilst not using other subsets. Therefore, according to embodiments, the transmitter may be implemented such that each set of beamforming waves forms a steering vector for the 3D-antenna array. To each steering vector or to a plurality of steering vectors an element-selection matrix may be associated. To a plurality of steering vectors, a plurality of element-selection matrices may be associated. The element-selection matrices may comprise information for each antenna element for the 3D-antenna array, the information indicating if the antenna element is used or unused for the associated steering vector or a plurality of steering vectors. I.e., the cylindrical array or in any 3D array for that matter, in many cases, may not use the entire array to beamform in a particular direction. As indicated, the beam-set matrix $F_1$ may comprise a plurality of steering vectors, wherein for each steering vector an associated element-selection matrix $T_d$ may be contained in the beam-set matrix $F_1$, the respective element selection matrix $T_d$ may comprise information for each antenna element of the 3D-antenna array, the information indicating if the antenna element is used or unused for the respective associated steering vector or plurality of steering vectors. Two practical scenarios when only a subset of antennas is used for beamforming in a cylindrical array are as follows:

Elevation range partition: The ULAs along the columns of the cylindrical array may be partitioned into multiple subsets, thus partitioning the elevation angle range into multiple regions, each beamformed by a different subset of the cylindrical array. Each of the beamforming array subsets may or may not have overlapping elements (Using all the antenna elements while sectorizing the elevation dimension is a special case of an array subset). An example of such a partition is shown in FIG. 5. For each subsets, but also for a combination of subsets, a maintenance of separate codebook tables for each sector of angular space and subsets of antennas may be implemented. In the previous proposition that uses element-selection matrices, only a single codebook table is present and, the sectorization of the angular space and array subsets are decided by the design of the selection matrices. In this proposition with multiple codebook tables, each table is associated with a subset of antennas in the array (which may or may not overlap with other subsets in the array) and the beam-set matrices $F_1$ are so designed to form beams in a particular sector of the angular space.

'Blind' antenna elements: This is a phenomenon observed in almost every cylindrical array—each antenna element can be 'blind' to the radiation received from certain directions. For example, an antenna along the azimuth angle 0° in the array may not receive sufficient energy from signals impinging at the azimuth angle 180°. The design of the selection matrices should also take this 'blindness' of the antenna elements into account.

This phenomenon of 'blind antenna elements' is not just specific to cylindrical arrays and can be observed in other 3D array configurations as well (for e.g., conical, spherical, etc.).

To facilitate the use of a subset of array elements for beamforming the following propositions are considered:

Use of element-selection matrices in the precoder: Selection matrices are introduced in the precoder to select the desired antenna elements for the beamforming process. The precoder modified from the structure in (29) for a 3D array with M antenna elements per antenna orientation/polarization and two orthogonal antenna polarizations in each position of the array is as follows:

$$F = F_1 F_2 = \begin{bmatrix} T_1 s_1^{(1)} & T_2 s_2^{(1)} & \ldots & T_D s_D^{(1)} & 0 \\ 0 & & & T_1 s_1^{(2)} & T_2 s_2^{(2)} & \ldots & T_D s_D^{(2)} \end{bmatrix} \quad (32)$$

$$[c_1 \ldots c_{D'}]$$

where $T_d \in \mathbb{C}^{M \times M}$, d=1, 2, . . . , D are the element-selection matrices for the D beams in the steering matrix. The selection matrices contain only 1's and 0's and are tasked with selecting the beamforming weights of antenna elements of interest from the steering vectors $s_d^{(e)} \in \mathbb{C}^{M \times 1}$. Each of the candidate steering vectors in the codebook matrix $\Omega$ has an element-selection matrix of its own, depending on the direction in which the beam is steered. Therefore, selecting the beam-set matrix $F_1 \in \mathbb{C}^{2M \times 2D}$ using the indicator PMI1 (the codebook table scenario from FIG. 8 is assumed here) automatically decides the corresponding element-selection matrices and hence no extra bits are used to represent the beam-set matrix even with the inclusion of the element-selection matrices in it. This proposition results in no change in the codebook table structure or the number of codebook tables to be maintained. The design of the element-selection matrices decides the sectorization of the angular space and the antenna element subsets for each sector.

An extension of this proposition would be to have non-static element-selection matrices and have the matrices contain values other than just 0's and 1's, i.e., the element-selection matrices perform power allocation along with selecting antenna elements to form a desired beam pattern or achieve a desired gain in a certain direction, and there might exist more than one element-selection matrix per candidate steering vector and they may change over time during transmission. A new index, element-selection matrices index (ESMI), in the codebook table (FIG. 8) hierarchy is introduced to facilitate the tracking, reporting and indication of the set of element-selection matrices used in the precoder. The time period of tracking/reporting from the receiver can be the same as the beam-set matrix $F_1$ that follows the changes in long-term channel conditions.

When comparing now the formula (32) with the formula (29) it may be seen that the beam-set matrix $F_1$ is comprising the element-selection matrices $T_d$ with d=1, . . . , D, wherein individual element-selection matrices may be combined with individual steering vectors of the beam-set matrix $F_1$. The element-selection matrices $T_d$ may subset-wise indicate whether to use or not to use a specific subset of antenna elements of the 3D-antenna array for beamforming in a particular direction. For example, a first binary value such as 0 or 1 may indicate a use of the subset wherein the other binary value such as 1 or 0 may indicate that the respective subset remains unused. This may allow for reducing data to be processed in future steps when already indicating that the complete subset will remain unused.

By forming the beam-set matrix $F_1$ such that it is based on a combination of element-selection matrices with steering vectors for selecting at least one antenna element in the 3D-antenna array to remain unused for a transmission a connection may be made with a configuration of the transmitter such that it is configured to select columns of the beam-set matrix in the precoder from the codebook matrix that comprises a plurality of array steering vectors corresponding to a plurality of directions of interest along which the 3D-antenna array is configured to form one or more transmit and/or receive beams. Simplified, by selecting a direction of the beam, information may be obtained on which antenna elements and/or which subsets may remain unused for the respective transmission and the respective elements and/or subsets may be switched off to avoid interference, i.e., remain unused for beamforming into a direction associated with the used steering vector of the beam-set matrix. For some beams to be formed with the 3D-antenna array, it may be advantageous or even recommended to use all antenna elements. Thus, there may be implemented one or more element selection matrices that select all elements within the 3D-antenna array. With each steering vector or set of steering vectors in the beam-set matrix $F_1$, an element selection matrix may be associated.

The element-selection matrices may be user-specific which may allow to modify them over time according to long-term channel conditions, for example, this may be a used case for non-static element-selection matrices, i.e., the transmitter may be configured for a time-variant adaptation of the element-selection matrices based on a fading channel condition. The fading may be a slow fading channel condition such as a second order statistic, an averaged feedback or a differential feedback between the transmitter and a receiver. An average feedback may be understood as that either the receiver provides instantaneous feedback and the transmitter is performing an averaging step or the receiver is feedbacking already averaged data. A differential feedback may refer to the case where the receiver feeds back only changed entries in the element-selection matrix according to the embodiments described herein. To one beam-steering vector one or more element-selection matrices $T_d$ may be associated. When having at least two element-selection matrices associated with the beam-steering vector, both element-selection matrices may comprise different values indicating different amounts of power to be provided to the antenna elements, i.e., different sets or subsets of antenna elements to be used or switched off. The receiver may indicate such a selection by using a specific parameter that may be referred to as an element-selection matrix indicator (ESMI). The transmitter may be configured for selecting one of the associated element-selection matrices to be combined with the associated steering vector based on the received information.

The one or more element-selection matrices may be adapted as was described before. As indicated, the adaptation may be performed responsive to a feedback signal from the receiver. The feedback signal may contain information relating to a channel state information associated to a channel between the transmitter and the receiver. This may include one or more of a channel quality index (CQI), a precoding matrix index (PMI), a rank indicator (RI) and/or an ESMI.

When referring again to the content of the element-selection matrices, same may be formed by binary values indicating a use or a non-use of a specific antenna element or a subset of antenna elements. According to embodiments described herein, the element-selection matrices may comprise elements that comprise values between a minimum and a maximum value. When considering a zero as minimum value and, for example, a one as maximum value, then a value of an element-selection matrix may have one of the minimum values, the maximum value or of at least one value therebetween, for example, 0.1, 0.2, 0.5 or the like. When being coded, those values may be different, for example, when being coded by more than one bit, then the value may be one of the values being covered by the respective bit range, for example, 00; 01; 10; 11. This may allow to combine the functionality of the element-selection matrix so as to deactivate some antenna elements or subsets of antenna elements with the functionality of the power allocation. For example, a value between the minimum and the maximum value may indicate that only a portion of the maximum available power shall be applied to the respective antenna element or a subset of antenna elements.

In the following, reference will be made to example configurations of 3D-antenna arrays.

Figure 11:
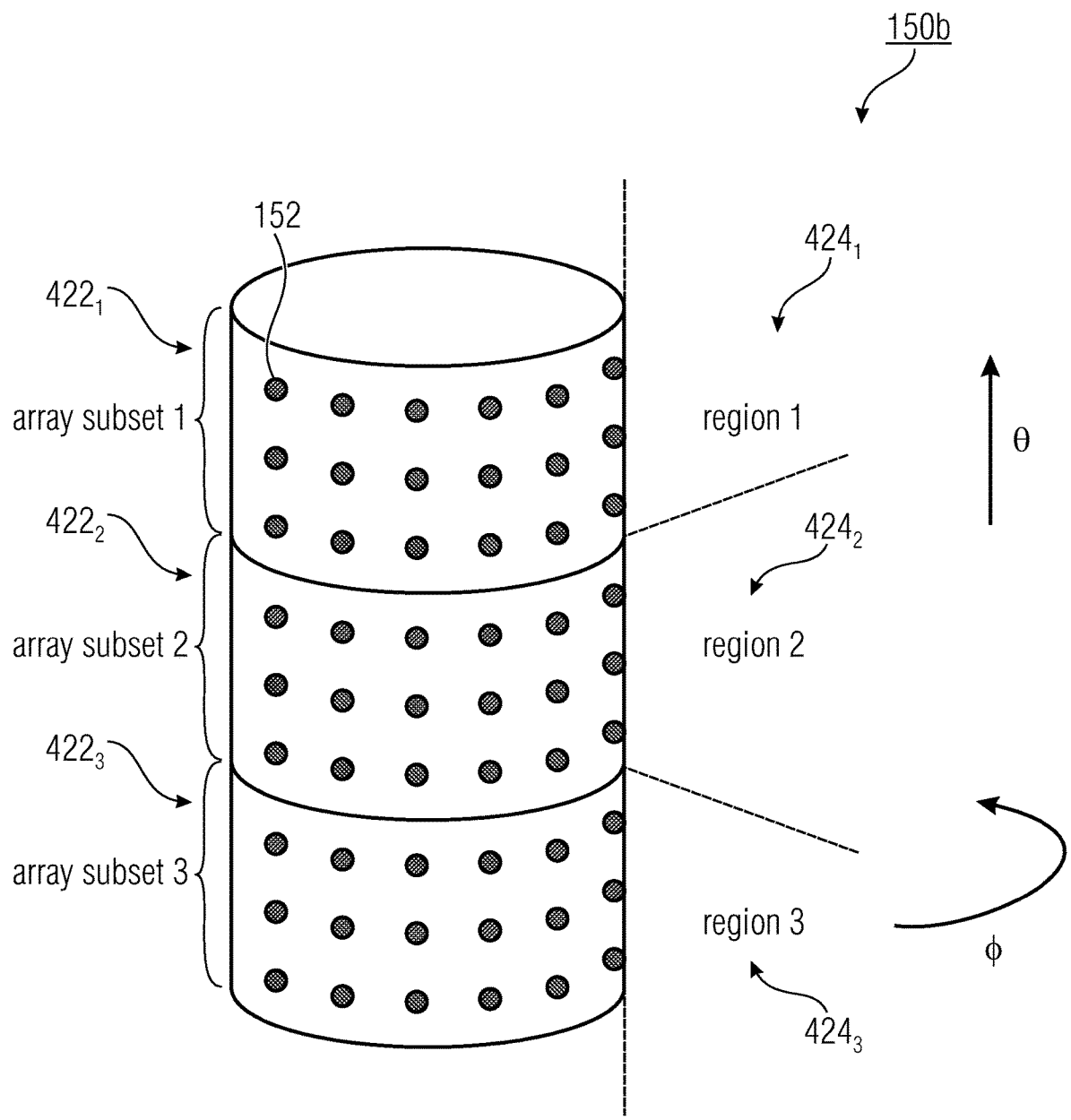
FIG. 11 shows a schematic diagram of a cylindrical 3D-antenna array according to an embodiment.

FIG. 11 shows a schematic diagram of a cylindrical 3D-antenna array 150b comprising a plurality of subarrays $422_1$ to $422_3$, of the 3D antenna array, for example, a number of 3. According to other embodiments, the 3D-antenna array may comprise two or more, four or more, five or more, or 10 or more segments. Each of the subarrays of 422 is configured to transmit beams into a specific region $424_1$, $424_2$ or $424_3$. Although being illustrated as being disjoint with respect to each other, i.e., comprising no common antenna elements 152, adjacent subarrays such as subarray $422_1$ and $422_2$ or $422_3$ may comprise common antenna elements 152. Based on a subset selection matrix, a specific subarray 422 may be addressed which does not exclude that an antenna element 152 thereof is also addressed by a different subarrays 422. Each of the subarrays 422 is configured to transmit beams into an associated region 424. Thus, each subarray 422 of antenna elements 152 of the plurality of subarrays 422 is configured to form the beams into a particular direction along a direction Θ and/or an azimuth direction Φ of the 3D-antenna array 150b. The element-selection matrices $T_d$ may be adapted to form the beam using the subarray 422 of antenna elements 152 associated with that specific direction/region while not using at least one subset of antenna elements associated with another direction.

When compared to segments described herein, e.g., the segments 162 in FIG. 6, a subarray $422_1$ to $422_3$ may also comprise a subset of antenna elements 152. In contrast to the segments 162, the subarrays 422 may form a logical subset of antenna elements. The logical subset may be formed according to a direction or region 424 along which the subarray is adapted to form beams.

The directions of interest may be associated with the steering vectors in a codebook matrix and may form a grid pattern in a 2D scattered plot, the grid pattern having parallel rows and parallel columns.

Although the transmitter 100 is described as using one codebook table 130, one codebook matrix 120 respectively, the transmitter may comprise a plurality of codebooks and/or codebook matrices. Each codebook may be associated to a specific subarray or subset of antenna elements and each codebook may contain a set of steering vectors for the 3D-antenna array. With respect to the aspects described herein, the power allocation matrix, the Kronecker product structure and the element-selection matrices, one, two or even three of the aspects may be implemented in a transmitter and/or receiver according to embodiments.

Combining the two propositions above would result in multiple codebook tables for various subsets of the array (which may or may not have overlapping elements) and use element-selection matrices on top of them. This offers multiple degrees of freedom to configure subarrays and perform sectorization of the angular space.

Similar to the power-allocation matrices in equation (30) the element-selection matrices with power-loading capabilities may be decided based on a receiver request for higher power allocation or deteriorating channel conditions observed by the transmitter from the CQI feedback or power-imbalance compensation in the transmitter array. The ESMI may not be the only factor that decides the power levels.

The element-selection matrices $T_d$ perform element-selection/power-loading separately for every steering vector while the power allocation matrices $F_p$ perform the same at the element-level instead of the steering-vector-level. The two methods to perform power allocation and element-selection provide different choices when it comes to beam pattern designs, having two varying degrees/levels of freedom.

Figure 12:
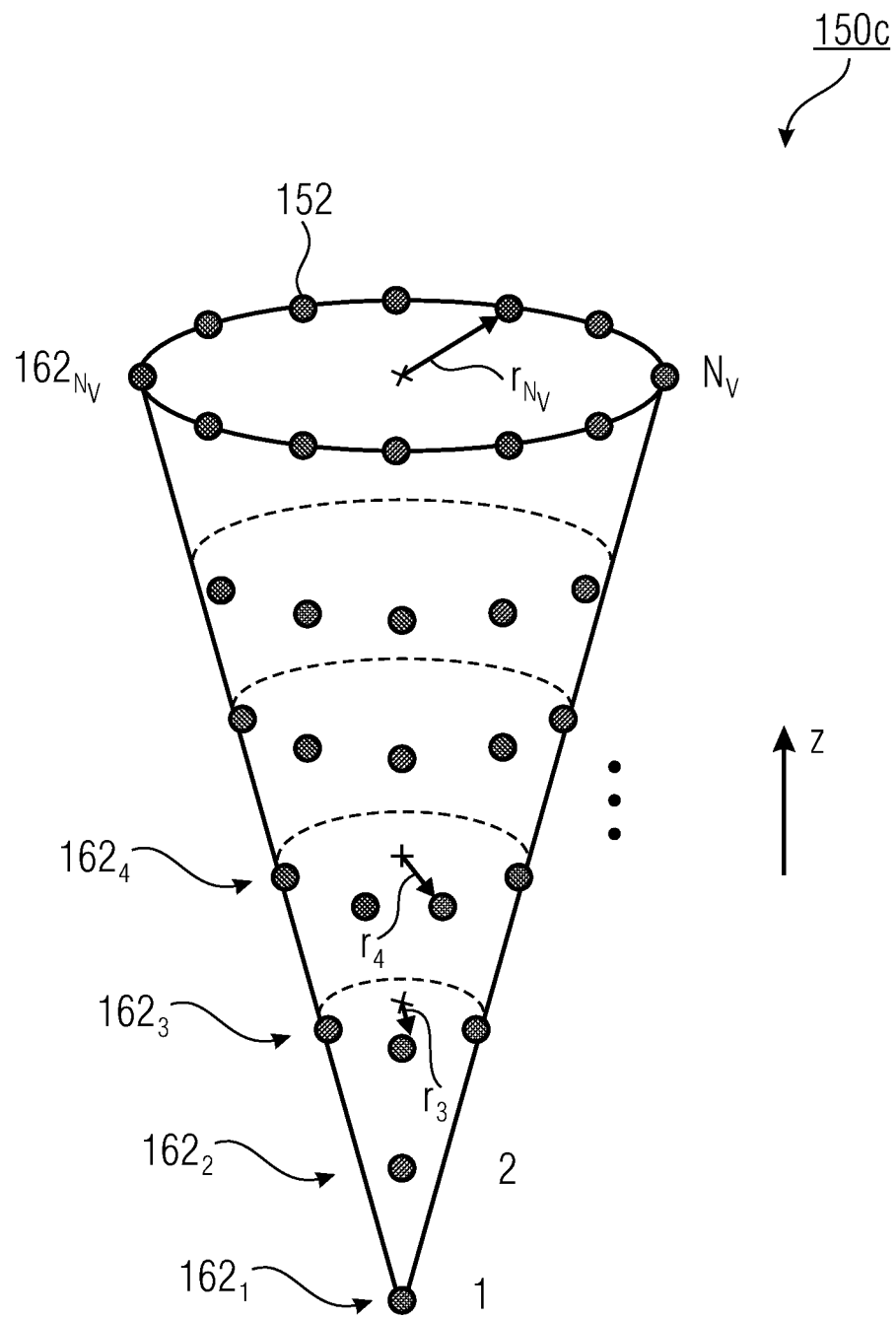
FIG. 12 shows a schematic diagram of a conical 3D-antenna array according to an embodiment.

FIG. 12 shows a schematic diagram of a 3D-antenna array 150c that may be connected with a precoder according to embodiments described herein. The 3D-antenna array 150c may be a so-called conical antenna array that comprises a plurality of UPA or UCA configurations 162 being stacked along the ULA configuration. The conical configuration may relate to a varying radius r and thereby a varying diameter increasing, for example, along the positive z-direction. A number of antenna elements may also increase. Each of the configurations 162 or a group of two or more of the configurations 162 may be combined so as to form a subarray/subset of antenna elements 152.

Figure 13B:
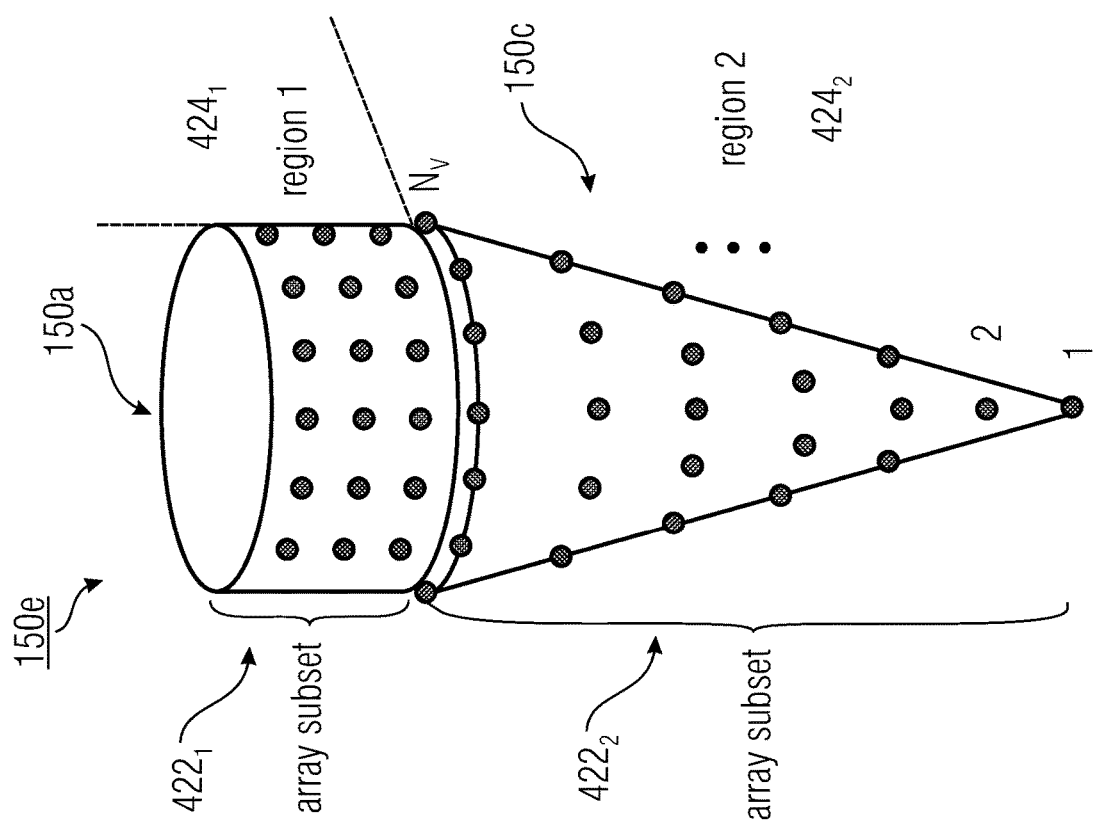
FIG. 13b shows a schematic diagram of a 3D-antenna array according to an embodiment, comprising a combination of a cylindrical and a conical 3D-antenna array.
Figure 13A:
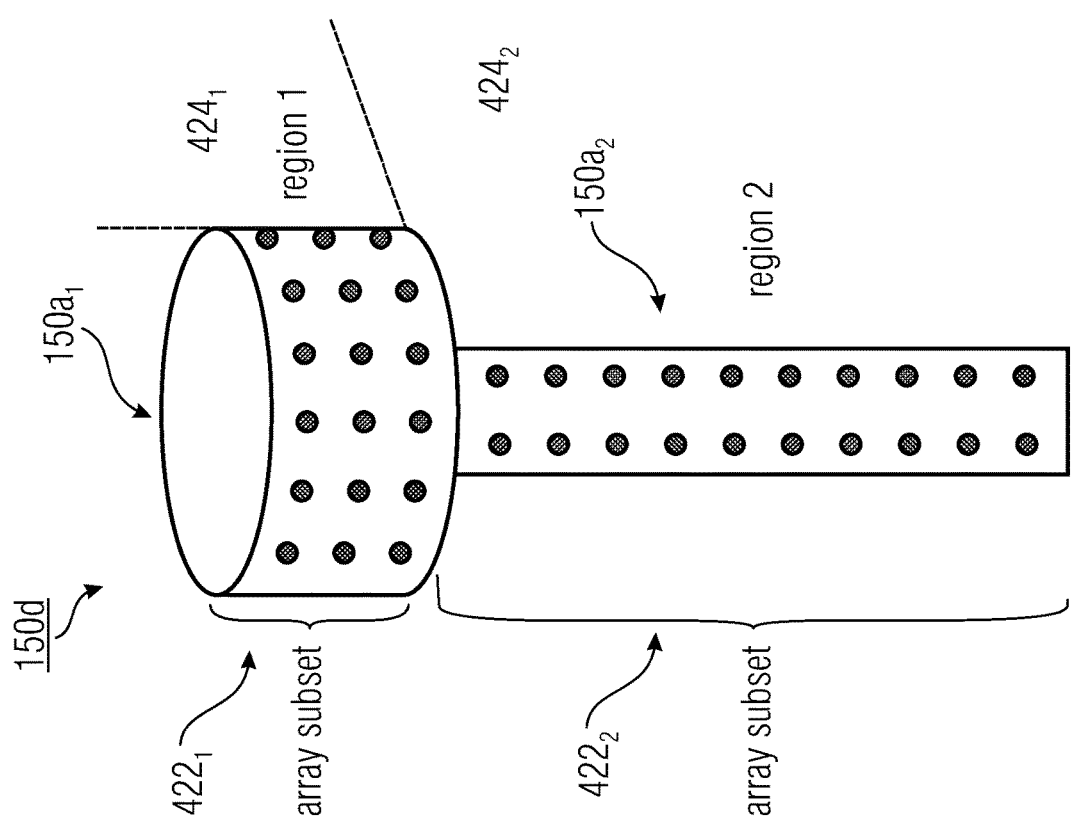
FIG. 13a shows a schematic diagram of a 3D-antenna array according to an embodiment, being formed by a combination of a first cylindrical antenna array and a second cylindrical antenna array.

FIG. 13a shows a schematic diagram of a 3D-antenna array 150d being formed by a combination of a first cylindrical antenna array 150a₁ and a second cylindrical antenna array 150a₂, wherein each of the conical antenna arrays 150a₁ and 150a₂ forms a subset 422₁, 422₂ respectively that may be addressed independently from each other.

FIG. 13b shows a schematic diagram of a 3D-antenna array 150e comprising the 3D-antenna array 150a and the 3D-antenna array 150c, each of the 3D-antenna arrays 150a and 150c forming a subset 422₁, 422₂ respectively, each subset being configured to direct the beams into an associated region 424₁, 424₂ respectively. I.e., each subarray 422 may be associated with a respective dimension of the antenna array and/or to specific regions into which the beam may be directed.

When referring to the antenna arrays, the configuration of the array antenna has to be transmitted to the receiver so that the receiver can construct the transmitter array codebook. The parameters to be transmitted vary with every 3D array configuration.

In the case of the cylindrical array, the following parameters need to be known at the receiver to construct the transmitter array codebook:

$$\left(N_V, N_H, \frac{\rho}{\lambda}, \frac{d_V}{\lambda}, E, \text{type}\right),$$

where $N_V$ is the number of stacks in the cylinder, $N_H$ is the number of elements in each ring, $$\frac{\rho}{\lambda}$$

is the radius of the cylinder in terms of the wavelength of the transmitted wavefront, $$\frac{d_V}{\lambda}$$

is the distance between successive rings in the cylinder in terms of the wavelength of the transmitted wavefront and E is the number of antenna orientations/polarizations in each position. type is the field that mentions the type of cylindrical array used. Depending on the place where they are mounted, the type of cylindrical arrays used may vary. Wall mounted cylindrical arrays are only half-cylindrical in shape while cylindrical arrays at corners of walls could only have a quarter of the cylindrical shape. The type field may thus be useful to obtain this knowledge at the receiver.

Thus, the 3D-antenna array of a transmitter may comprise at least one of a cylindrical 3D-antenna array, a conical 3D-antenna array, a combination of a planar antenna array and a cylindrical 3D-antenna array, a combination of a planar antenna array and a conical 3D-antenna array and a combination of a planar antenna array, a cylindrical 3D-antenna array and a conical 3D-antenna array and/or any combinations thereof.

An antenna port is a logical abstraction in LTE; different symbols transmitted via a single antenna port experience the same channel conditions. Moreover, the estimation of channel conditions experienced by symbols transmitted via a particular antenna port are performed by measuring the reference signals associated with the antenna port [5]. Essentially an antenna port can be associated with a specific reference signal of its own whose measurement provides the channel conditions the symbols transmitted from the antenna port experience. The channel state information reference signals (CSI-RS) are used by antenna ports in FD-MIMO in the downlink for the user equipment (UE) to measure and feedback the channel quality index (CQI) to the base station. Depending on the number of CSI-RS antenna ports in the base station, the array configuration of the UPA used and the oversampling factor of the codebook may change [1][2]. Giving way for such a possibility in the case of 3D arrays as well, one more parameter is added to the proposed codebook table hierarchies in FIG. 8, FIGS. 9 and/or 10 along with the RIs and PM's: number of CSI-RS ports. For a given number of CSI-RS ports to be used in the base station, separate codebook tables as shown in FIG. 8, FIGS. 9 and/or 10 have to be maintained for every array configuration supported for the given number of CSI-RS ports.

Conical arrays can be visualized as a special case of cylindrical arrays where each stack in the array consists of UCAs with different radii and number of elements as shown in FIG. 7. The i-th stack in the conical array is a circular array of radius $\rho_i$ consisting of $N_{H,i}$ elements. Hence the total number of elements in the array is $M=\Sigma_{i=1}^{N_V}N_{H,i}$. The distance between successive rings in the conical stack is maintained uniformly at $d_V$. Therefore, the antenna structure is parametrized by the following variables: Number of stacks in the array: $N_V$; Number of antenna elements in each stack $N_{H,i}$, i=1, 2, . . . , N; Normalized radius of each stack, $$\frac{\rho_i}{\lambda},$$

i=1, 2, . . . , $N_V$, where λ denotes the wavelength; Normalized distance between successive rings in the stack, $$\frac{d_V}{\lambda},$$

where λ denotes the wavelength; Number of antenna orientations in each position, E.

The codebook structure similar to that of the cylindrical array from FIG. 8 can be followed for the conical array as well. The Kronecker product model extension for the codebook, however, cannot be used for the conical array due to the non-uniformity of the radii of the rings.

Due to the asymmetric structure and the difference in the number of elements across the vertical and horizontal dimensions of the conical array, power-loading for different antenna elements can be performed as part of the precoding process (shown in (30)) and can be included in the codebook as provided in FIG. 9.

The power-loading matrix is possibly a degree of freedom that may be used while beamforming in the case of conical arrays due to the asymmetric nature of the array. The array may also consist of antenna elements with varying radiation patterns in each stack to tackle the asymmetric array geometry. It should also be noted that the element-selection matrices discussed previously could also be used for power-allocation. The use of multiple codebook tables for various subarrays in the array along with power-allocating element-selection matrices for the conical arrays would allow for flexibility and enhanced degrees of freedom in terms of angular space sectorization, beam patterns formed and sub-array partitioning.

In a further embodiment, the shape of the antenna shall be extended to allow combinations of cylindrical, conical with M-MIMO UPAs and/or standard single- or dual-polarized antennas. Examples are shown in FIG. 8 below. This antenna realization allows a flexible adaptation of M-MIMO antennas to particular deployment constraints, e.g. existing monopoles or lamp poles, as well as leveraging the 3D component of the antenna cylinder/cone, to enhance interference detection in existing UPA deployments (FIG. 8—left configuration). Finally, configurations like these allow interference detection and user localization in neighboring sectors. This information can be utilized while calculating beamforming weights for the UPA.

The codebook matrices for the combinations of different 3D geometries, ideally, would be a concatenation of the individual codebook matrices. However, a combination of multiple 3D geometries results in power-allocation designs, subarray configurations and angular space sectors being different from the ones in the individual components of the combined 3D array configuration, hence resulting in completely different codebook sets. All these tasks have to be dealt on a case-by-case basis depending on the combinations of arrays involved.

Figure 14:
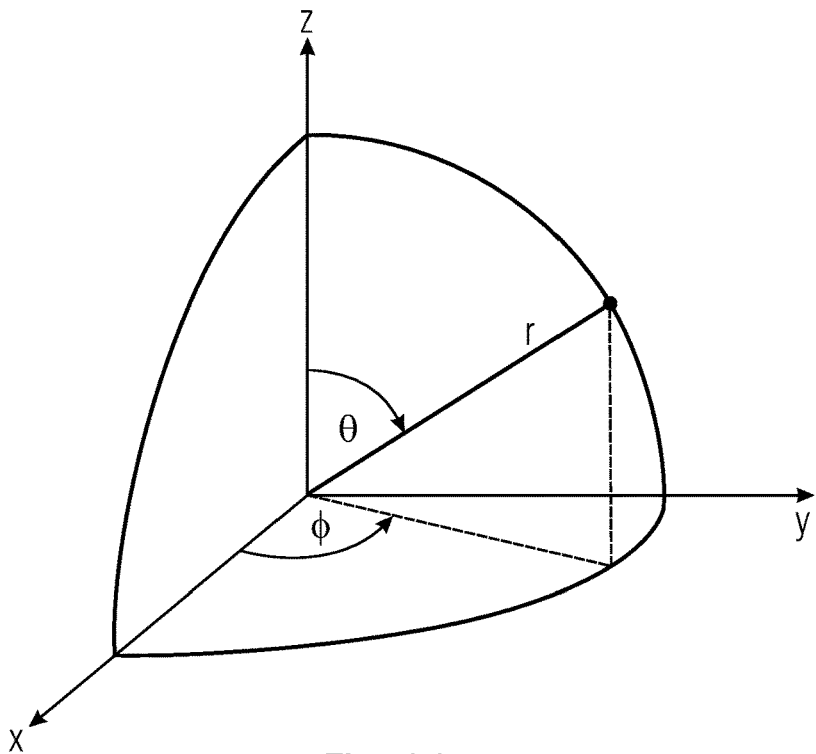
FIG. 14 shows a schematic perspective view of a spherical coordinate system that may be used to describe embodiments described herein.

FIG. 14 shows a schematic perspective view of a spherical coordinate system that may be used to describe embodiments described herein.

All the mathematical expressions in the report are based on the spherical coordinate system specified in the ISO 31-11 standard with $\theta \in [0°, 180°]$ being the inclination angle measured from the positive z-axis and $\varphi \in [-180°, 180°]$ being the azimuth angle measured from the positive x-axis.

The basis vectors $e_r$, $e_\theta$, and $e_\varphi$ form an orthonormal right-handed coordinate system and are defined as follows:

$$e_r(\varphi, \theta) = \begin{bmatrix} \sin\theta \cdot \cos\varphi \\ \sin\theta \cdot \sin\varphi \\ \cos\theta \end{bmatrix}; e_\theta(\varphi, \theta) = \begin{bmatrix} \cos\theta \cdot \cos\varphi \\ \cos\theta \cdot \sin\varphi \\ -\sin\theta \end{bmatrix}; e_\varphi(\varphi, \theta) = \begin{bmatrix} -\sin\varphi \\ \cos\varphi \\ 0 \end{bmatrix}$$

Figure 15:
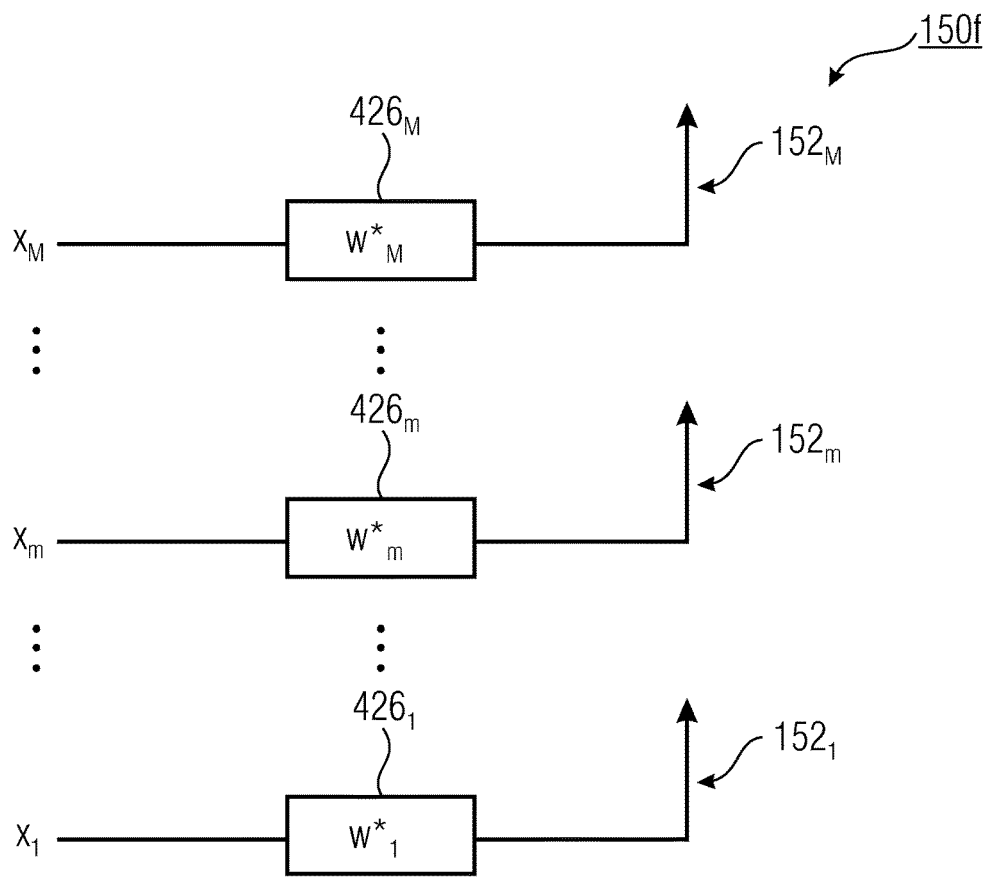
FIG. 15 shows a schematic diagram of a 3D-antenna array according to an embodiment that is schematically illustrated by a number of M antenna elements in a linear configuration.

FIG. 15 shows a schematic diagram of a 3D-antenna array 150*f* that is schematically illustrated by a number of M antenna elements 152 in a linear configuration. Each of the antenna elements 152 is connected with a weight block 426 indicating a variable weight or gain applied to the vector $X_1, \ldots, X_m, \ldots, X_M$.

The beamformed signal $p(t) \in C$ is obtained from a M element array antenna using the beamforming weight vector $w \in C^{M \times 1}$ and the signal vector $x(t) \in C^{M \times 1}$ from the M antenna feeds as: $p(t) = w^H \cdot x(t) = \sum_{m=1}^{M} w_m^* \cdot x_m$. As observed, the term beamforming weights' is reserved for the weight coefficients that produce the beamformed signal.

Figure 16A:
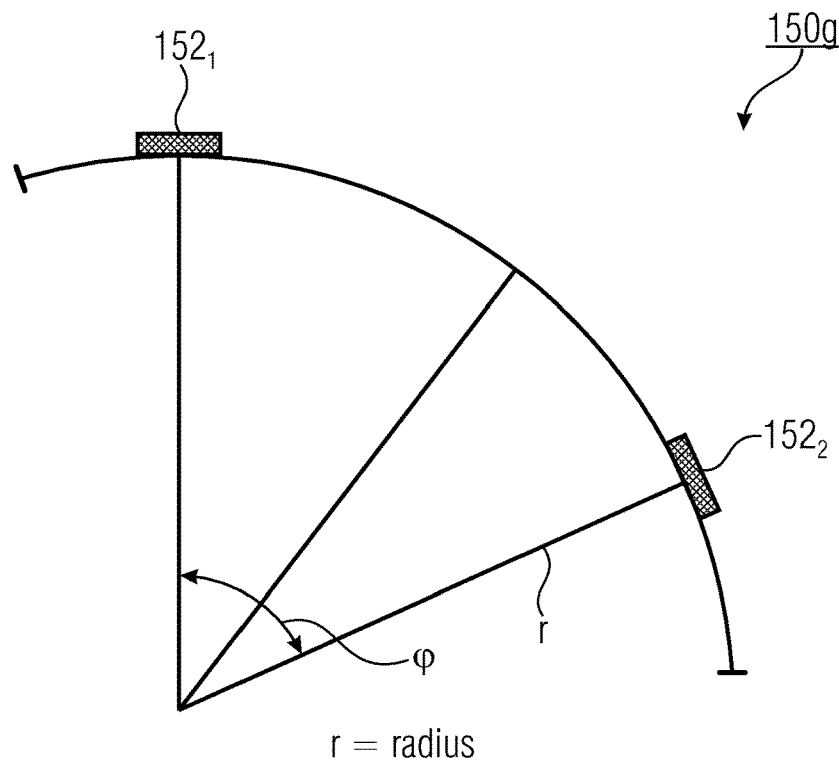
FIG. 16a shows a schematic diagram of an example 3D-antenna array according to an embodiment, comprising a plurality of antenna elements arranged on a spherical surface.

FIG. 16*a* shows a schematic diagram of an example 3D-antenna array 150*g* comprising a plurality of antenna elements 152 arranged on a spherical surface at a radius r and being spaced by an angle $\phi$ on the spherical surface.

Figure 16B:
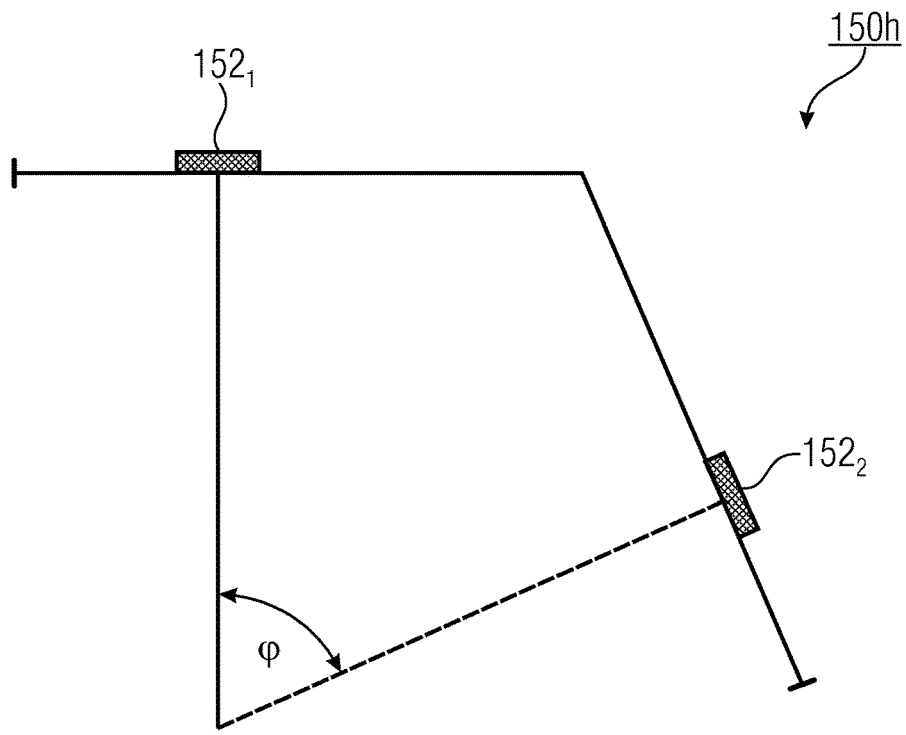
FIG. 16b shows a schematic diagram of an example 3D-antenna array according to an embodiment, in which the antenna elements and are arranged on a polygon-formed surface.

FIG. 16*b* shows a schematic diagram of an example 3D-antenna array in which the antenna elements $152_1$ and $152_2$ are arranged on a polygon-formed surface when compared to the 3D-antenna array 150*g*.

Figure 16C:
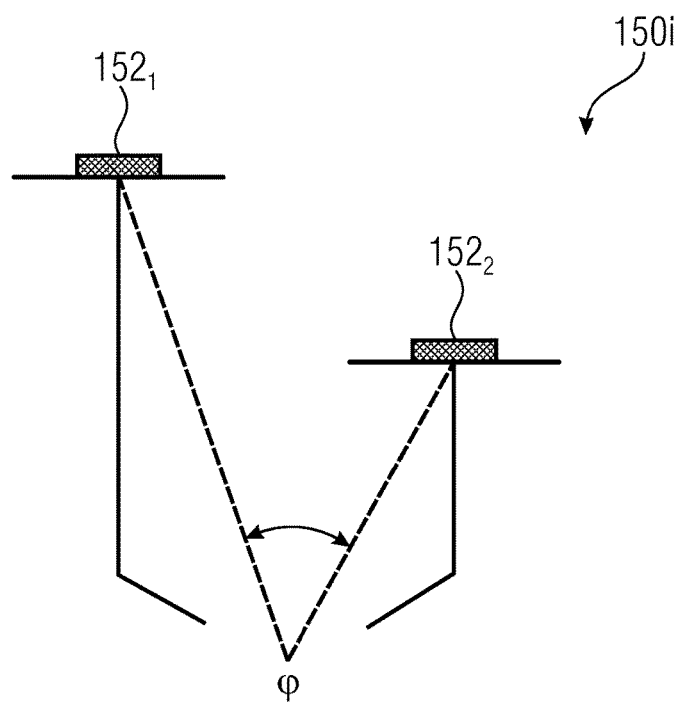
FIG. 16c shows a schematic diagram of an example 3D-antenna array according to an embodiment, in which the antenna elements are arranged on a step-wise formed surface.

FIG. 16*c* shows a schematic diagram of an example 3D-antenna array 150*i* in which the antenna elements 152 are arranged on a step-wise formed surface.

Figure 16D:
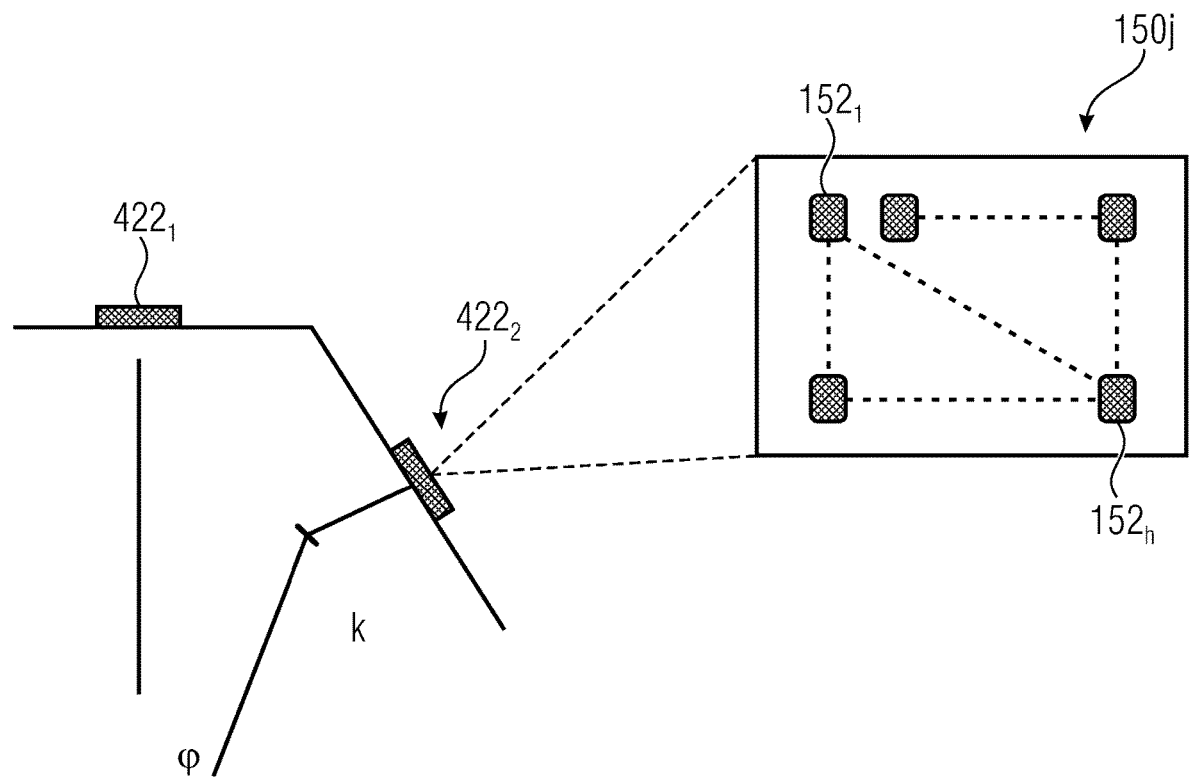
FIG. 16d shows a schematic diagram of an example 3D-antenna array according to an embodiment, comprising a plurality of subsets of antenna elements.

FIG. 16*d* shows a schematic diagram of an example 3D-antenna array 150*j* comprising a plurality of subsets 422, wherein each subset 422 comprises a number of k antenna elements 152. The subsets 422 may be shifted with respect to each other by the angle $\phi$ so as to allow to transmit the beams into the respective region or direction.

The 3D-antenna arrays may be configured such that each antenna element 152, each subset 422 directs its output into a direction that at least partially or even completely is disjoint from a direction being covered by a different antenna element or subset.

Figure 17:
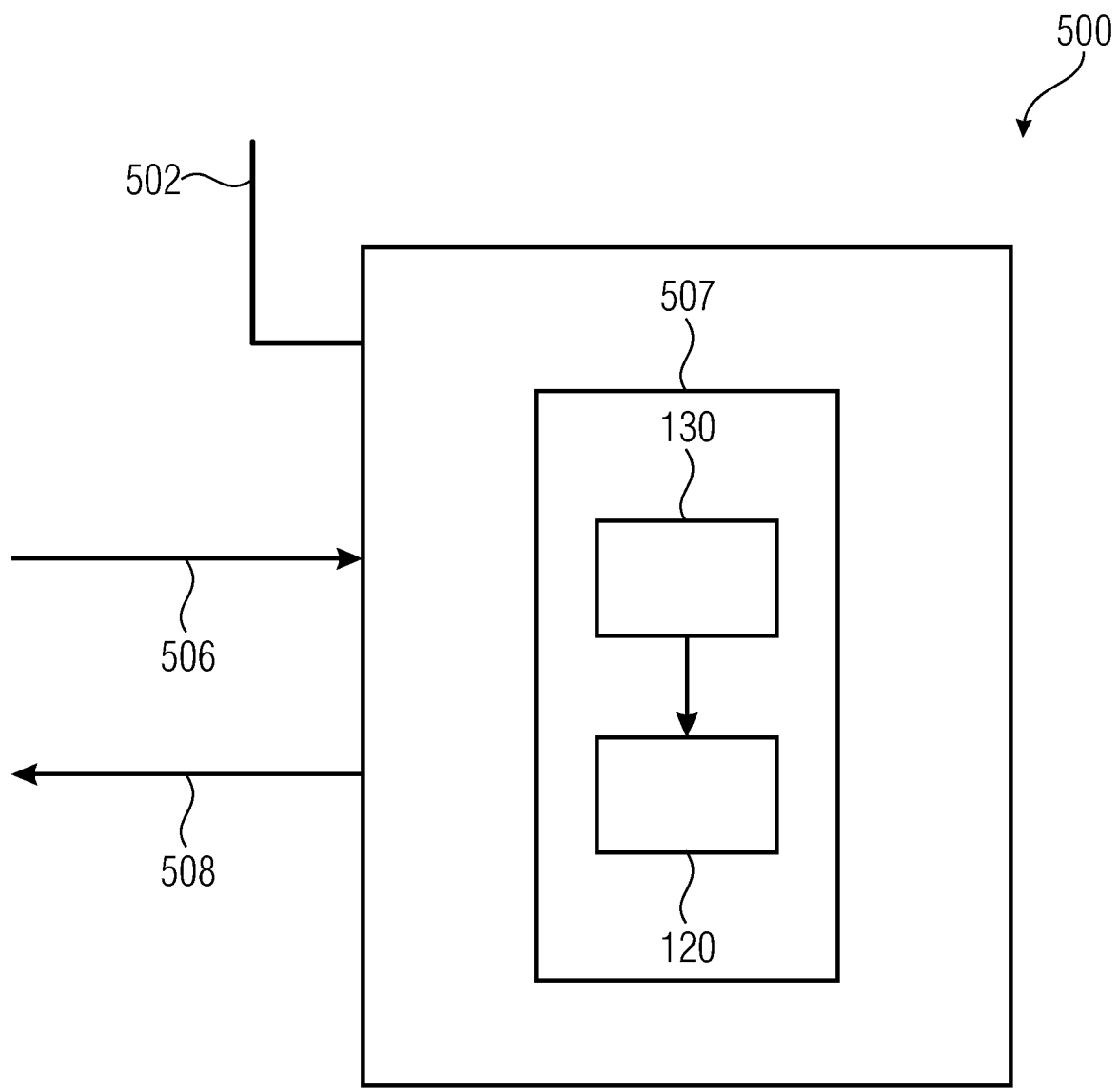
FIG. 17 shows a schematic block diagram of a user equipment according to an embodiment.

FIG. 17 shows a schematic block diagram of a user equipment 500 according to an embodiment, for example, able to be operated as a user equipment illustrated in FIG. 3. The user equipment 500 comprises a wireless interface 502, e.g., an antenna, and is configured to receive a signal 506. The user equipment comprises a signal processor 507 that is configured to receive and process the signal 506. The signal 506 comprises information relating to a layout of a 3D-antenna array of a transmitter. The signal 506 may be received from the respective transmitter or from a different node that indicates or broadcasts the layout of the antenna array. The layout of the antenna array may include one or more of a number of layers in a cylindrical or conical configuration of antennas (UPA/UCA), a number of antenna elements in one or more or even each of the layers, a distance between the layers, a polarization of antenna elements, a geometry of the 3D-antenna array, a radius or other relevant information with respect to an arrangement of antenna elements with respect to each other, thus a number of spatial layers in a cylindrical or conical arrangement of antennas of a 3D-antenna array, a center frequency of the 3D-antenna array, a distance, e.g., with respect to the center frequency and wavelength or in mm/cm/inches or the like between antenna elements used in the 3D-antenna array, a distance, e.g., with respect to the center frequency and wavelength or in mm/cm/inches between subarrays or segments used in the 3D-antenna array, a geometry of the 3D-antenna array, e.g., as 3D mesh grid with marked positions of antenna elements or models (A/B/C) of a fixed set of model, the model selected from a catalog or database or the like and/or a transmit power used by the base station in a given subarray or segment of the 3D-antenna array and/or a broad side of selected antenna subsets. This may include an over-the-top information with respect to an antenna type of the transmitter or a 2D/3D model. For example, this may be transmitted by using a URL which links to a specification of the 3D-antenna array which can be downloaded by the user equipment. Alternatively or in addition, the information relating to the layout may relate to a divisibility of the antenna elements into subsets of antenna elements, i.e., information to the subsets, to information indicating a downtilt of the antenna array with respect to a reference plane and/or to information indicating an orientation of the 3D-antenna array in space.

The user equipment 500 is configured to construct a codebook, i.e., the codebook matrix 120 and/or the codebook table 130. For example, the codebook table 130 and/or the codebook matrix 120/Ω may be constructed such that the codebook includes a plurality of sets of beamforming weights for a plurality of directions using information relating to the layout of the 3D-antenna array of the transmitter. In simple terms, the user equipment may mirror the codebook of the transmitter.

The user equipment 500 may be configured to transmit, for example, to one of the transmitters according to a present embodiment, a request signal 508 indicating that the transmitter is requested to transmit the signal 506. The transmitter to which the request signal is transmitted may therefore be operated as a receiver and forms the other end of the communication chain used by the user equipment. For example, when entering a region being provided by the respective transmitter, the user equipment 500 may indicate that specific information relating to the layout of the 3D-antenna array of the transmitter may be used so as to build up the codebook by transmitting the signal 508. Alternatively or in addition, the signal 508 may contain information indicating a beam to be formed by the transmitter. Thus, information relating to the layout of the 3D-antenna array is used for the requested beam and this may be done with varying configurations of a 3D-antenna array.

Alternatively or in addition, the signal 508 may comprise information relating to a subset of antenna elements to be used by the serving base station to transmit a signal to the user equipment and/or information indicating a specific power allocation matrix to be used by the serving base station to transmit a signal to the user equipment. Thus, the transmitter 100, may be a serving base station. This may allow to reproduce the behavior of the serving base station at the user equipment and to instruct the serving base station on how to advantageously transmit data to the user equipment 500, even if the layout of the 3D-antenna array was previously unknown.

The user equipment may be configured to transmit the signal 508 in regular intervals, for example, so as to update its codebook in a fading environment that varies over time. Alternatively, or in addition, the user equipment 500 may be configured to transmit the signal 508 responsive to a request received from the serving base station, for example, contained in the signal 506.

Embodiments described herein therefore relate to a user equipment being configured for a wireless communication with a transmitter according to embodiments described herein and being configured to construct a codebook including a plurality of subsets of beamforming weights for a plurality of directions.

Further embodiments relate to a network comprising at least one example transmitter and one or more example user equipment. The transmitter of the network may be at least a part of a base station serving a user equipment or may be at least a part of a user equipment served by a base station. Especially for user equipment that is capable of beamforming, the description made herein relating to the transmitter may also refer to the user equipment.

A method for operating a transmitter comprising a 3D-antenna array may be an embodiment. The 3D-antenna array comprises a plurality of antenna elements, each antenna element having a radiation pattern, wherein radiation patterns overlap with respect to each other, wherein the 3D-antenna array comprises a first and a second and a third antenna element spanning a 2-dimensional antenna plane, and comprises a fourth antenna element being arranged outside the 2-dimensional antenna plane; or wherein the 3D-antenna array comprises a first antenna element being configured to direct a transmitted signal into a first direction, and comprising a second antenna element being configured to direct a transmitted signal into a second direction and not into the first direction. The method comprises a step of coherently controlling the plurality of antenna elements for a wireless communication in a wireless communication system and applying a set of beamforming weights to the 3D-antenna array (150; 150a-j) to form one or more transmit beams and/or receive beams with the 3D-antenna array, the beams pointing in directions of interest using a precoder matrix that is based on a beam-set matrix and a selection matrix and a power allocation matrix comprising power values that indicate a power to be allocated to the antenna elements of the 3D-antenna array, the power allocation matrix adapted to selectively adjust an antenna gain of the antenna elements.

A method for operating a transmitter comprising a 3D-antenna array comprising a plurality of antenna elements for a wireless communication with at least one receiver, wherein the antenna elements are arranged according to a cylindrical or a conical configuration, comprises transmitting, to a receiver, a signal comprising information relating to a layout of the 3D-antenna array; transmitting, to a receiver, a signal indicating a number of layers in the cylindrical or conical antenna array, a number of antenna elements in each of the layers, a distance between the layers, a polarization of the antenna elements and a geometry of the antenna array.

A method for operating a receiver comprises wirelessly communicating with a transmitter; and receiving and processing a radio signal received a radio channel, the signal comprising information relating to a layout of a 3D-antenna array such as a layout of the array or a segment thereof used by the transmitter. The method further comprises constructing a codebook for said array or part thereof such that the codebook includes a plurality of sets of beamforming weights for a plurality of directions, using information relating to the layout of the 3D-antenna array, i.e., the receiver may emulate the codebook of the transmitter so as to avoid transmitting the codebook to the receiver.

A method for obtaining a codebook matrix comprising array steering vectors for a precoder connected to a 3D-antenna array, each steering vector indicating a set of beamforming weights to be applied to a 3D-antenna array to form one or more transmit/receive beams with the 3D-antenna array, the beams pointing in directions of interest, may be adapted such that the method comprises: selecting the steering vectors for the directions of interest (with respect to the transmitter) by sampling a response vector function of the 3D-antenna array at a plurality of values of azimuth ($\Phi$) and elevation ($\Theta$) angles contained in the exponents of the complex exponentials of the response vector function; or selecting the steering vectors for directions of interest by sampling the response vector function of the 3D-antenna array at a plurality of values of trigonometric functions of the azimuth ($\Phi$) and elevation ($\Theta$) angles contained in the exponents of the complex exponentials in the response vector function.

The method may be adapted such that the directions of interest are selected such that, when plotted in a two-dimensional graph is spanned by the plurality of values of azimuth ($\Phi$) and elevation ($\Theta$) angles contained in the exponents of the complex exponentials of the response vector function; or such that, when plotted in a two-dimensional graph is spanned by the plurality of values of trigonometric functions of the azimuth ($\Phi$) and elevation ($\Theta$) angles contained in the exponents of the complex exponentials in the response vector function.

Aspects described herein relate to a receiver such as a user equipment that requests information from the transmitter or base station that empowers to reconstruct the codebook of the probably unknown configuration of the 3D-antenna array. The transmitter may transmit a determination rule or information related hereto such that the receiver or user equipment may construct the codebook.

Increasing dimensions of antenna arrays lead to increasing sizes of codebooks that are constructed based on predetermined determination rules. Thereby, embodiments described herein allow for preventing a transmission of the large amount of data that may be used for transmitting a codebook by empowering the nodes to construct the codebooks used at the transmitter on their own and to use them e.g., for signaling to the transmitter, without having them transmitted. Alternatively or in addition, a sampling rule may be transmitted that allows to select the directions of interest from the complete codebook and to form the set Ω in the codebook matrix. During operation, the user equipment may perform a channel estimation and decides a precoder that would be advantageous or at least good enough for the user equipment, i.e., the receiver may emulate the codebook of the transmitter and may decide an advantageous precoder or steering vector, i.e., set of beamforming weights, using its own measurements (channel estimates) and may then signalize to the transmitter the advantageous precoder. This may be associated with an entry in the codebook, which may be signalized. The base station (transmitter) may use the signalized entry.

When comparing the aspects relating to the power allocation matrix $F_P$ and to the element-selection matrices $T_d$, the selection of antenna elements and power allocation may be done by those two aspects. From the perspective of application of the matrix components to each other, the waves can be seen as follows: The selection of antenna elements and power allocation is done in two different ways by $F_P$ and $T_d$. From the perspective of application of the matrix components to each other, the two ways can be seen as follows: The element-selection matrices perform selection/power-loading separately for every steering vector.

The matrices $T_d$ are applied to individual beams and the columns of $F_2$ combine the beam steering vectors that have been power-loaded and element-selected. The application of the element-selection matrices can be represented only as it is done in equation (32) and this process cannot be split into a separate matrix as in equation (30) with the power-allocation matrix.

The power allocation matrices $F_P$ may perform selection/power-loading at the element-level instead of the steering-vector-level. They are applied to antenna elements after the formation of combined beams by $F_1$ and $F_2$.

The two methods to perform power allocation provide different choices when it comes to beam pattern designs giving two varying degrees and levels of freedom. Technically, it is possible to obtain every beam pattern that the structure in (30) has to offer using the structure in (32) by choosing appropriate element selection and other component matrices.

The 3D array configuration-related propositions can be used both at the base station and the UE (We don't want to restrict the invention to just a mobile communication system with a base station and a mobile user equipment. We would like to use the terms 'transmitter' and 'receiver' so that the invention is generic, for e.g., extendable to vehicular communications)

The described power-loading codebook structure—FIG. 9, and the subarray selection using element-selection matrices describe, amongst other things, embodiments of the disclosure presented herein.

The precoder matrix that is applied to the antenna array can be digitally realized by processing the signal fed to the array accordingly or can be realized in an analog way using phase shifters and power amplifiers.

Embodiments describe codebook designs for 3D array antenna configurations along with proposals for new 3D antenna configurations which combine UPAs with antenna shapes from cylindrical and/or conical shaped array antennas. UPAs, like as the ones used in FD-MIMO [1], may be enhanced by a number of "antenna rings" to enhance precision of user localization and/or beamforming, especially to resolve ambiguities which typically occur on the sidelobes of UPAs. Some embodiments focus on the design of the 'Codebook' for non-precoded CSI-RS transmission scheme (legacy CSI-RS from LTE) for 3D arrays with the example of the cylindrical array or the stacked uniform circular array discussed in detail.

Embodiments comprise two parts. Part I: Codebook design for 3D array antennas. This part of the report discusses the codebook design for non-CSI-RS based transmissions for arbitrary 3D array geometries/configurations, while discussing cylindrical arrays in specific detail. Part II: Antenna configuration/geometry proposals. In this part, propositions for new 3D array configurations/geometries are made to address certain limitations found in 2D arrays.

In the following, additional embodiments and aspects of the invention will be described which can be used individually or in combination with any of the features and functionalities and details described herein.

1. A transmitter, comprising:
   a 3D-antenna array (150; 150*a-j*) comprising a plurality of antenna elements (152; 152$_N$) with each antenna element (152; 152$_N$) having a radiation pattern, wherein the radiation patterns overlap with respect to each other, wherein the plurality of antenna elements (152; 152$_N$) is adapted for a coherent wireless communication in a wireless communication system;
   wherein the 3D-antenna array (150; 150*a-j*) comprises a first and a second and a third antenna element (152; 152$_N$) spanning a two-dimensional antenna plane (162; 162$_N$), and comprises a fourth antenna element (152; 152$_N$) being arranged outside the two-dimensional antenna plane (162; 162$_N$); or
   wherein the 3D-antenna array (150; 150*a-j*) comprises a first antenna element (152; 152$_N$) being configured to direct a transmitted signal into a first direction, and comprising a second antenna element (152; 152$_N$) being configured to direct a transmitted signal into a second direction and not into the first direction;
   the transmitter further comprising a precoder (112) connected to the 3D-antenna array (150; 150*a-j*), the precoder (112) configured to apply a set of beamforming weights to the 3D-antenna array (150; 150*a-j*), to form one or more transmit beams (154) and/or receive beams with the 3D-antenna array (150; 150*a-j*), the beams (154) pointing in directions of interest (156);
   wherein the precoder (112) comprises a precoder matrix (F) that is based on a beam-set matrix ($F_1$) and a selection matrix ($F_2$) and a power allocation matrix ($F_P$) comprising power values that indicate a power to be allocated to the antenna elements (152; 152$_N$) of the 3D-antenna array (150; 150*a-j*), the power allocation matrix ($F_P$) adapted to selectively adjust an antenna gain of the antenna elements (152; 152$_N$).

2. The transmitter according to aspect 1, wherein the beam-set matrix ($F_1$) is based on a combination of component beam-set matrices ($X_V$, $X_H$) associated with different segments of antenna elements within the 3D-antenna array (150; 150*a-j*), each segment containing at least one antenna element (152; 152$_N$).

3. The transmitter according to aspect 1 or 2, wherein the beam-set matrix ($F_1$) is further based on element-selection matrices ($T_d$) for selecting at least one antenna element (152; 152$_N$) to remain unused for beamforming into a direction associated with the used steering vectors of the beam-set matrix ($F_1$);

wherein the transmitter is configured to select columns of the beam-set matrix ($F_1$) in the precoder (112) from a codebook matrix ($\Omega$) that comprises a plurality of array steering vectors corresponding to a plurality of directions of interest (156) along which the 3D-antenna array (150; 150a-j) is configured to form one or more transmit beams (154) and/or receive beams.

4. The transmitter of one of previous aspects, wherein the power allocation matrix ($F_P$) comprises gain values to determine the power to be fed to each antenna element (152; $152_N$) of the 3D-antenna array (150; 150a-j).

5. The transmitter of one of previous aspects, wherein a codebook containing a plurality of precoder matrices comprises at least one power allocation matrix ($F_P$) per transmission rank.

6. The transmitter of one of previous aspects, wherein each set of beamforming weights forms a steering vector of the 3D-antenna array (150; 150a-j), wherein the beam-set matrix ($F_1$) comprises a plurality of steering vectors, wherein for each steering vector an associated element-selection matrix ($T_d$) is contained in the beam-set matrix ($F_1$), comprising information for each antenna element (152; $152_N$) of the 3D-antenna array (150; 150a-j), the information indicating if the antenna element (152; $152_N$) is used or unused for the associated steering vector or plurality of steering vectors.

7. The transmitter of aspect 6, wherein the 3D-antenna array (150; 150a-j) comprises a plurality of subsets (422) of antenna elements (152; $152_N$), wherein the element-selection matrices ($T_d$) subset-wise indicate whether to use or not to use a specific subset (422) of antenna elements (152; $152_N$) for beamforming in a particular direction.

8. The transmitter of aspect 7, wherein a first and a second subset (422) of the plurality of subsets (422) of antenna elements (152; $152_N$) in the 3D-antenna array (150; 150a-j) are disjoint or contain common antenna elements (152; $152_N$).

9. The transmitter of aspect 7 or 8, wherein each subset (422) of antenna elements (152; $152_N$) of the plurality of subsets (422) is configured to form the beams (154) into a particular direction (424) along an elevation ($\Theta$) direction and/or an azimuth ($\Phi$) direction from the 3D-antenna array (150; 150a-j) perspective, wherein the element-selection matrices ($T_d$) are adapted to form the beam (154) using the subset (422) of antenna elements (152; $152_N$) associated with that specific direction ($424_{1-3}$) while not using the subset (422) of antenna elements (152; $152_N$) associated with at least one other direction ($424_{1-3}$).

10. The transmitter of one of aspects 7 to 9, wherein a value of an element-selection matrix ($T_d$) comprises one of at least three values, having a minimum value, a maximum value and at least one value in between, the value indicating an amount of power provided to the antenna element (152).

11. The transmitter of aspect 10, wherein at least a first and a second element-selection matrix ($T_1$, $T_2$) are associated to a beam steering vector, the first and the second element-selection matrix ($T_1$, $T_2$) comprising different values indicating different amounts of power to be provided to the antenna elements (152; $152_N$), wherein the transmitter is configured for selecting the first element-selection matrix ($T_1$) or for selecting the second element-selection matrix ($T_2$) to be combined with the associated steering vector.

12. The transmitter according to aspect 11, wherein the transmitter is configured for a time-variant adaptation of the element-selection matrices ($T_d$) based on a fading channel condition.

13. The transmitter according to aspect 11 or 12, wherein the transmitter is configured for a time-variant adaptation of the element-selection matrices ($T_d$) responsive to a feedback signal (508) received from a receiver (500), the feedback signal (508) containing information relating to a channel state information associated with the channel between the transmitter and the receiver.

14. The transmitter according to one of previous aspects, wherein the transmitter is configured to
select the steering vectors for the directions of interest (156) by sampling a response vector function of the 3D-antenna array (150; 150a-j) at a plurality of values of azimuth ($\Phi$) and elevation ($\Theta$) angles contained in the exponents of the complex exponentials of the response vector function; or to
select the steering vectors for directions of interest (156) by sampling the response vector function of the 3D-antenna array (150; 150a-j) at various values of trigonometric functions of the azimuth ($\Phi$) and elevation ($\Theta$) angles contained in the exponents of the complex exponentials in the response vector function.

15. The transmitter according to aspect 14, wherein the directions of interest (156) are associated with the steering vectors in a codebook matrix ($\omega$) and form a grid pattern in a 2D scatter plot, the grid pattern having parallel rows (402) and parallel columns (404).

16. The transmitter of any of the preceding aspects, wherein the 3D-antenna array (150; 150a-j) comprises at least a rotational symmetry, wherein the beam-set matrix ($F_1$) is based on a combination of component beam-set matrices ($X_V$, $X_H$), wherein first component beam-set matrices ($X_V$, $X_H$) are associated with a first segment of the 3D-antenna array (150; 150a-j), wherein second component beam-set matrices ($X_V$, $X_H$) are associated with a second segment of the 3D-antenna array (150; 150a-j), wherein the beam-set matrix ($F_1$) comprises a Kronecker product structure of the combination, wherein the first component beam-set matrices ($X_V$, $X_H$) are related to a first dimension of the 3D-antenna array (150; 150a-j) and the second component beam-set matrices ($X_V$, $X_H$) are related to a second dimension of the 3D-antenna array (150; 150a-j).

17. The transmitter of any of the preceding aspects, wherein the beam-set matrix (F1) is based on a combination of component beam-set matrices ($X_V$, $X_H$), wherein the 3D-antenna array (150; 150a-j) comprises a plurality of planar antenna configurations (162) arranged parallel to a first and a second direction (x, y), the plurality of planar antenna configurations (162) stacked according to a linear antenna configuration along a third direction (z) perpendicular to the first and second direction (x, y);
wherein the precoder matrix (F) is based on a combination of a beam-set matrix ($F_1$) comprising steering vectors for the 3D-antenna array (150; 150a-j) and a selection matrix ($F_2$) for selecting at least one steering vector from the beam-set matrix ($F_1$) to be applied to the 3D-antenna array (150; 150a-j),
wherein the Kronecker product structure is based on a first component of the steering vectors relating to the planar antenna configurations (162) and a second component relating to the linear antenna configuration of the 3D-antenna array (150; 150a-j), wherein the first components and the second components are decoupled from each other.

18. The transmitter of aspect 16 or 17, wherein the transmitter is configured to adapt the beamforming weights by changing either the first component beam-set matrix ($X_H$) or the second component beam-set matrix ($X_V$), which define the beam-set matrix ($F_1$).

19. The transmitter of any of the preceding aspects, wherein the transmitter is configured to adapt the beamforming weights responsive to a received feedback signal (508), wherein the feedback signal (508) comprises information relating to either component beam-set matrix ($X_V$) or component beam-set matrix ($X_H$) or both component beam-set matrices.

20. The transmitter of one of previous aspects, wherein the transmitter comprises a plurality of codebooks, wherein each codebook is associated to a specific subset (422) of antenna elements (152; $152_N$), each codebook containing a set of steering vectors for the 3D-antenna array (150; 150a-j).

21. The transmitter of one of previous aspects, wherein the precoder (112) comprises at least two elements of:
the precoder (112) comprising the precoder matrix (F) that is based on the beam-set matrix ($F_1$) and the selection matrix ($F_2$) and the power allocation matrix ($F_P$) adapted to selectively adjust antenna gain of the antenna elements (152; $152_N$); and
the precoder (112) comprising the precoder matrix (F) that is based on the beam-set matrix ($F_1$) and the selection matrix ($F_2$), wherein the beam-set matrix ($F_1$) is based on a combination of component beam-set matrices ($X_V$, $X_H$) associated with different segments of antenna elements of the 3D-antenna array (150; 150a-j); and
the precoder (112) comprising the precoder matrix (F) that is based on the beam-set matrix ($F_1$) and the selection matrix ($F_2$), wherein the beam-set matrix ($F_1$) is based on the element-selection matrices ($T_d$) for selecting at least one antenna element (152; $152_N$) to remain unused for beamforming into a direction associated with the used steering vectors of the beam-set matrix ($F_1$).

22. The transmitter of one of previous aspects, wherein the 3D-antenna array (150; 150a-j) comprises at least one of
a cylindrical 3D-antenna array (150; 150a-j);
a conical 3D-antenna array (150; 150a-j);
a combination of a planar antenna array (UPA/UCA) and a cylindrical 3D-antenna array (150; 150a-j);
a combination of a planar antenna array (UPA/UCA) and a conical 3D-antenna array (150; 150a-j); and
a combination of a planar antenna array (UPA/UCA), a cylindrical 3D-antenna array (150; 150a-j) and a conical 3D-antenna array (150; 150a-j).

23. The transmitter of one of previous aspects, wherein the antenna elements (152; $152_N$) of the 3D-antenna array (150; 150a-j) are arranged according to at least a first and a second polarization, wherein the beam-set matrix ($F_1$) is a block diagonal matrix comprising a first block ($X_1$) being a first submatrix associated to the first polarization and comprising a second block ($X_2$) being a second submatrix associated to the second polarization.

24. The transmitter of one of previous aspects, wherein the 3D-antenna array (150; 150a-j) comprises a plurality of planar antenna configurations (162) arranged parallel to a first and a second direction (x, y), the plurality of planar antenna configurations (162) stacked according to a linear antenna configuration along a third direction (z) perpendicular to the first and second direction (x, y).

25. The transmitter of one of previous aspects, wherein the transmitter is configured to transmit, to a receiver, a signal (506) indicating a layout of the 3D-antenna array (150; 150a-j).

26. A transmitter, comprising:
a 3D-antenna array (150; 150a-j) comprising a plurality of antenna elements (152; $152_N$) for a wireless communication with at least one receiver; and
a precoder (112) connected to the antenna array, the precoder (112) configured to apply a set of beamforming weights to the 3D-antenna array (150; 150a-j) using a precoder matrix (F), the beamforming weights selected from a codebook table (130) associated with the 3D-antenna array (150; 150a-j), the transmitter configured to form one or more transmit/receive beams (154) pointing in directions of interest (156) using the codebook table (130);
wherein the codebook table (130) is a table that comprises the candidates for each of the directions, wherein the codebook table (130) comprises a structure being based on a combination of a plurality of component matrices of the precoder (112), wherein the precoder (112) is configured to select single components of the component matrices so as to select the beamforming weights, wherein the specific components comprise at least one of a subset (422) of antenna elements of the 3D-antenna array (150; 150a-j) elements and a power allocation to the antenna elements (152; $152_N$) by use of at least one of a precoder matrix index (PMIP, PMI1; PMI2, ESMI) and a rank index (RI),
wherein the precoder matrix (F) of the precoder (112) is based on a beam-set matrix ($F_1$) containing the array steering vectors and a selection matrix ($F_2$) and a power allocation matrix ($F_P$) adapted to selectively adjust the power allocated to the antenna elements (152; $152_N$); or
wherein the precoder (112) comprises a precoder matrix (F) that is based on a beam-set matrix ($F_1$) and a selection matrix ($F_2$), wherein the beam-set matrix ($F_1$) is based on a combination of component beam-set matrices ($X_V$, $X_H$) associated with different segments of antenna elements of the 3D-antenna array; or
wherein the precoder (112) comprises a precoder matrix (F) that is based on a beam-set matrix ($F_1$) and a selection matrix ($F_2$), wherein the beam-set matrix ($F_1$) is based on element-selection matrices ($T_d$) for selecting at least one antenna element (152; $152_N$) to remain unused for beamforming into a direction associated with the used steering vectors of the beam-set matrix ($F_1$).

27. A transmitter, comprising:
a 3D-antenna array (150; 150a-j) comprising a plurality of antenna elements (152; $152_N$) for a wireless communication with at least one receiver, wherein the antenna elements (152; $152_N$) are arranged according to a cylindrical or a conical configuration;
wherein the transmitter is configured to transmit, to a receiver, a signal indicating a layout of the 3D-antenna array (150; 150a-j).

28. The transmitter of aspect 27, wherein the 3D-antenna array (150; 150a-j) comprises a first subset ($422_1$) of antenna elements of the 3D-antenna array (150; 150a-j) and a second subset ($422_2$) of antenna elements of the 3D-antenna array (150; 150a-j), wherein the first subset ($422_1$) comprises a cylindrical configuration and the second subset ($422_2$) comprises a conical configuration; or wherein the first and second subset ($422_1$, $422_2$) comprise a same configuration and differ in view of a diameter of a UPA layer of the subset or a number of antenna elements (152; 152$_N$) within a UPA layer.

29. The transmitter of aspect 27 or 28, wherein the transmitter comprises a precoder (112) connected to the 3D-antenna array (150; 150a-j), the precoder (112) configured to apply a set of beamforming weights to the 3D-antenna array (150; 150a-j) to form one or more transmit beams (154) and/or receive beams with the 3D-antenna array (150; 150a-j) using the steering vectors of the 3D-antenna array, the beams (154) pointing in directions of interest (156), the set of beamforming weights selected from a codebook table (130);

wherein the precoder (112) comprises a precoder matrix (F) that is based on a beam-set matrix (F$_1$) and a selection matrix (F$_2$) and a power allocation matrix (F$_P$) adapted to selectively adjust antenna gain of the antenna elements (152; 152$_N$); or wherein the precoder (112) comprises a precoder matrix (F) that is based on a beam-set matrix (F$_1$) and a selection matrix (F$_2$), wherein the beam-set matrix (F$_1$) is based on a combination of component beam-set matrices (X$_{V,1}$, X$_{H,1}$, X$_{V,2}$, X$_{H,2}$) associated with different segments of antenna elements of the 3D-antenna array (150; 150a-j) wherein the different segments are related to different dimensions of the 3D-antenna array (150; 150a-j); or wherein the precoder (112) comprises a precoder matrix (F) that is based on a beam-set matrix (F$_1$) and a selection matrix (F$_2$), wherein the beam-set matrix (F$_1$) is based on element-selection matrices (T$_d$) for selecting at least one antenna element (152; 152$_N$) to remain unused for beamforming into a direction associated with the used steering vectors of the beam-set matrix (F$_1$); or wherein the beam-set matrix (F$_1$) in the precoder (112) is connected to a codebook matrix (Ω) comprising a plurality of array steering vectors, the codebook matrix (Ω) including a plurality of sets of beamforming weights for a plurality of directions of interest (156); and wherein the transmitter is configured to select the steering vectors for the directions of interest (156) by sampling a response vector function of the 3D-antenna array (150; 150a-j) at a plurality of values of azimuth (Φ) and elevation (Θ) angles contained in the exponents of the complex exponentials of the response vector function; or wherein the transmitter is configured to select the steering vectors for directions of interest (156) by sampling the response vector function of the 3D-antenna array (150; 150a-j) at various values of trigonometric functions of the azimuth (Φ) and elevation (Θ) angles contained in the exponents of the complex exponentials in the response vector function.

30. A user equipment, comprising:
an antenna for a wireless communication with a transmitter; and
a signal processor to receive and process a radio signal (508) received at the antenna via a radio channel, the radio signal (508) comprising information relating to a layout of the 3D-antenna array (150; 150a-j);
wherein the user equipment is configured to construct a codebook table (130) including a plurality of sets of beamforming weights for a plurality of directions using the information relating to a layout of the 3D-antenna array (150; 150a-j).

31. The user equipment of aspect 30, wherein the user equipment is configured to transmit, to a transmitter, a request signal indicating that the transmitter is requested to transmit a radio signal (508) comprising information relating to the layout of the 3D-antenna array (150; 150a-j).

32. The user equipment of aspect 30 or 31, wherein the user equipment is configured to transmit a radio signal (508) indicating a beam to be formed using the information relating to the layout of the 3D-antenna array (150; 150a-j).

33. A user equipment configured to operate in a wireless communication network, wherein the user equipment is configured to transmit a request signal (508) comprising information that indicates a request to transmit, to the user equipment, a radio signal (506) comprising information relating to a layout of the 3D-antenna array (150; 150a-j) of the transmitter.

34. The user equipment of aspect 33, wherein the user equipment is configured to determine and to transmit, to the serving base station, at least one of
a segment (422) of antenna elements (152; 152$_N$) to be used by the serving base station to transmit a signal to the user equipment; and
information indicating a specific power allocation matrix (F$_P$) to be used by the serving base station to transmit a signal to the user equipment.

35. The user equipment according to aspect 33 or 34, wherein the user equipment is configured to transmit the determined information in regular intervals.

36. The user equipment according to one of aspects 33 to 35, wherein the user equipment is configured to transmit the determined information responsive to a request received from the serving base station.

37. The user equipment of aspect 30 to 36, wherein the user equipment is configured for a wireless communication with a transmitter of one of aspects 1 to 29;
wherein the user equipment is configured to construct a codebook table (130) including a plurality of sets of beamforming weights for a plurality of directions.

38. A wireless communication network comprising:
a transmitter of one of aspects 1 to 29; and
one or more user equipment of one of aspects 30 to 37.

39. The wireless communication network of aspect 38, wherein
the transmitter is a base station serving a user equipment or is a user equipment served by a base station.

40. Method for operating a transmitter comprising a 3D-antenna array (150; 150a-j) comprising a plurality of antenna elements (152; 152$_N$) each antenna having a radiation pattern, wherein the radiation patterns overlap with respect to each other, wherein the 3D-antenna array (150; 150a-j) comprises a first and a second and a third antenna element (152; 152$_N$) spanning a two-dimensional antenna plane (162; 162$_N$), and comprises a fourth antenna element (152; 152$_N$) being arranged outside the two-dimensional antenna plane (162; 162$_N$); or wherein the 3D-antenna array (150; 150a-j) comprises a first antenna element (152; 152$_N$) being configured to direct a transmitted signal into a first direction, and comprising a second antenna element (152; 152$_N$) being configured to direct a transmitted signal into a second direction and not into the first direction, the method comprising:
coherently controlling the plurality of antenna elements (152; 152$_N$) for a coherent wireless communication in a wireless communication system.
applying a set of beamforming weights to the 3D-antenna array (150; 150a-j) to form one or more transmit beams (154) and/or receive beams with the 3D-antenna array (150; 150a-j), the beams (154) pointing in directions of interest (156) using a precoder matrix (F) that is based on a beam-set matrix ($F_1$) and a selection matrix ($F_2$) and a power allocation matrix ($F_P$) comprising power values that indicate a power to be allocated to the antenna elements (152; $152_N$) of the 3D-antenna array (150; 150a-j), the power allocation matrix ($F_P$) adapted to selectively adjust an antenna gain of the antenna elements (152; $152_N$).

41. Method for operating a transmitter comprising a 3D-antenna array (150; 150a-j) comprising a plurality of antenna elements (152; $152_N$) for a wireless communication with at least one receiver, wherein the antenna elements (152; $152_N$) are arranged according to a cylindrical or a conical configuration, the method comprising:
    transmitting, to a receiver, a signal comprising information relating to a layout of the 3D-antenna array (150; 150a-j);
    transmitting, to a receiver, a signal indicating a number of layers in the cylindrical or conical antenna array, a number of antenna elements (152; $152_N$) in each of the layers, a distance between the layers, a polarization of the antenna elements (152; $152_N$) and a geometry of the antenna array.

42. Method for operating a receiver, the method comprising:
    wirelessly communicating with a transmitter; and
    receiving and processing a radio signal received a radio channel, the signal comprising information relating to a layout of a 3D-antenna array (150; 150a-j);
    constructing a codebook table (130) such that the codebook table (130) includes a plurality of sets of beamforming weights for a plurality of directions, using information relating to the layout of the 3D-antenna array (150; 150a-j).

43. Method for obtaining a codebook matrix ($\Omega$) comprising array steering vectors for a precoder (112) connected to a 3D-antenna array (150; 150a-j), each steering vector indicating a set of beamforming weights to be applied to a 3D-antenna array (150; 150a-j) to form one or more transmit/receive beams (154) with the 3D-antenna array (150; 150a-j), the beams (154) pointing in directions of interest (156), the method comprising:
    selecting the steering vectors for the directions of interest (156) by sampling a response vector function of the 3D-antenna array (150; 150a-j) at a plurality of values of azimuth ($\Phi$) and elevation ($\Theta$) angles contained in the exponents of the complex exponentials of the response vector function; or
    selecting the steering vectors for directions of interest (156) by sampling the response vector function of the 3D-antenna array (150; 150a-j) at a plurality of values of trigonometric functions of the azimuth ($\Phi$) and elevation ($\Theta$) angles contained in the exponents of the complex exponentials in the response vector function.

44. The method of aspect 43, wherein the directions of interest (156) are selected such that, when plotted in a two-dimensional graph is spanned by the plurality of values of azimuth ($\Phi$) and elevation ($\Theta$) angles contained in the exponents of the complex exponentials of the response vector function; or such that, when plotted in a two-dimensional graph is spanned by the plurality of values of trigonometric functions of the azimuth ($\Phi$) and elevation ($\Theta$) angles contained in the exponents of the complex exponentials in the response vector function.

45. A non-transitory computer program product comprising a computer readable medium storing instructions which, when executed on a computer, perform the method of aspect 40 to 44.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 36.897 V13.0.0, "3rd Generation Partnership Project; Technical Specification Group Radio Access Network; Study on elevation beamforming/Full-Dimension (FD) Multiple Input Multiple Output (MIMO) for LTE (Release 13)," June 2015.
[2] Hyoungju Ji, Younsun Kim, Juho Lee, Eko Onggosanusi, Younghan Nam, Jianzhong Zhang, Byungju Lee, Byonghyo Shim, "Overview of Full-Dimension MIMO in LTE-Advanced Pro," https://arxiv.org/abs/1601.00019, August 2016.
[3] C. Liu, Z. Ding, and X. Liu, "2-D Pattern Synthesis for Cylindrical Arrays," Progress In Electromagnetics Research Symposium Proceedings, Suzhou, China, Sep. 12-16, 2011.
[4] Marcus Grossmann, Venkatesh Ramireddy, Jonas Konig, Markus Landmann, Florian Römer, Giovanni Del Galdo and Rainer Perthold, "Antenna Array Optimization Strategies for Robust Direction Finding," 10th European Conference on Antennas and Propagation (EuCAP), April 2016.
[5] Erik Dahlman, Stefan Parkvall and Johan Skold, "4G: LTE/LTE-Advanced for Mobile Broadband, Second Edition," Academic Press, October 2013. ISBN: 9780124199972
[6] R1-155018, "WF on precoder and PMI construction for R13 FD-MIMO," Samsung, LGE, CATT, Qualcomm, NTT DOCOMO, ZTE, Ericsson, ALU, ASB, AT&T, CMCC, KT, 3GPP TSG-RAN WG1#82 Beijing, China, Aug. 24-28, 2015.

The invention claimed is:

1. A user equipment, comprising:
an antenna for a wireless communication with a transmitter; and
a signal processor to receive and process a radio signal received at the antenna via a radio channel, the radio signal comprising information relating to a layout of a 3D-antenna array;
wherein the user equipment is configured to construct a codebook table comprising a plurality of sets of beamforming weights for a plurality of directions using the information relating to a layout of the 3D-antenna array;
wherein the user equipment is configured for constructing the codebook table to comprise a codebook matrix comprising array steering vectors for a precoder connected to a 3D-antenna array, each steering vector indicating a set of beamforming weights to be applied to a 3D-antenna array to form one or more transmit/receive beams with the 3D-antenna array, the beams pointing in directions of interest, wherein the user equipment is to:
select the steering vectors for the directions of interest by sampling a response vector function of the 3D-antenna array at a plurality of values of azimuth and elevation angles comprised by the exponents of the complex exponentials of the response vector function; or
select the steering vectors for directions of interest by sampling the response vector function of the 3D-antenna array at a plurality of values of trigonometric functions of the azimuth and elevation angles comprised by the exponents of the complex exponentials in the response vector function.

2. The user equipment of claim 1, wherein the layout of the 3D-antenna array comprises one or more of:
a number of layers in a cylindrical or conical configuration of antennas;
a number of antenna elements in one or more or even each of the layers;
a distance between the layers;
a polarization of antenna elements;
a geometry of the 3D-antenna array;
a radius;
an arrangement of antenna elements with respect to each other;
a number of spatial layers in a cylindrical or conical arrangement of antennas of a 3D-antenna array;
a center frequency of the 3D-antenna array;
a distance between antenna elements used in the 3D-antenna array;
a distance between subarrays or segments used in the 3D-antenna array,
a transmit power used by the base station in a given subarray or segment of the 3D-antenna array;
a broad side of selected antenna subsets;
an over-the-top information with respect to an antenna type of the transmitter or a 2D/3D model;
a divisibility of the antenna elements into subsets of antenna elements;
information indicating a downtilt of the antenna array with respect to a reference plane; and/or
information indicating an orientation of the 3D-antenna array in space.

3. The user equipment of claim 1, wherein the user equipment is configured to transmit, to a transmitter, a request signal indicating that the transmitter is requested to transmit a radio signal comprising information relating to the layout of the 3D-antenna array.

4. The user equipment of claim 1, wherein the user equipment is configured to transmit a radio signal indicating a beam to be formed using the information relating to the layout of the 3D-antenna array.

5. The user equipment of claim 1, wherein the user equipment is configured for a wireless communication with a transmitter comprising:
a 3D-antenna array comprising a plurality of antenna elements with each antenna element comprising a radiation pattern, wherein the radiation patterns overlap with respect to each other, wherein the plurality of antenna elements is adapted for a coherent wireless communication in a wireless communication system;
wherein the 3D-antenna array comprises a first and a second and a third antenna element spanning a two-dimensional antenna plane, and comprising a fourth antenna element being arranged outside the two-dimensional antenna plane; or
wherein the 3D-antenna array comprises a first antenna element being configured to direct a transmitted signal into a first direction, and comprising a second antenna element being configured to direct a transmitted signal into a second direction and not into the first direction;
the transmitter further comprising a precoder connected to the 3D-antenna array, the precoder configured to apply a set of beamforming weights to the 3D-antenna array, to form one or more transmit beams and/or receive beams with the 3D-antenna array, the beams pointing in directions of interest;

wherein the precoder comprises a precoder matrix that is based on a beam-set matrix and a selection matrix and a power allocation matrix comprising power values that indicate a power to be allocated to the antenna elements of the 3D-antenna array, the power allocation matrix adapted to selectively adjust an antenna gain of the antenna elements;

wherein the user equipment is configured to construct a codebook table comprising a plurality of sets of beamforming weights for a plurality of directions.

6. The receiver of claim 1, wherein the receiver decides for a precoder associated with an entry of the codebook and reports the decided precoder to the transmitter.

7. A method for operating a receiver, the method comprising:

wirelessly communicating with a transmitter; and receiving and processing a radio signal received via a radio channel, the signal comprising information relating to a layout of a 3D-antenna array;

constructing a codebook matrix comprising array steering vectors for a precoder connected to a 3D-antenna array, each steering vector indicating a set of beamforminq weights to be applied to a 3D-antenna array to form one or more transmit/receive beams with the 3D-antenna array, the beams pointing in directions of interest, constructing the codebook matrix comprising:

selecting the steering vectors for the directions of interest by sampling a response vector function of the 3D-antenna array at a plurality of values of azimuth and elevation angles comprised by the exponents of the complex exponentials of the response vector function; or selecting the steering vectors for directions of interest by sampling the response vector function of the 3D-antenna array at a plurality of values of trigonometric functions of the azimuth and elevation angles comprised by the exponents of the complex exponentials in the response vector function; the method further comprising constructing a codebook table comprising the codebook matrix such that the codebook table comprises a plurality of sets of beamforming weights for a plurality of directions, using information relating to the layout of the 3D-antenna array.

8. Method for acquiring a codebook matrix comprising array steering vectors for a precoder connected to a 3D-antenna array, each steering vector indicating a set of beamforming weights to be applied to a 3D-antenna array to form one or more transmit/receive beams with the 3D-antenna array, the beams pointing in directions of interest, the method comprising:

selecting the steering vectors for the directions of interest by sampling a response vector function of the 3D-antenna array at a plurality of values of azimuth and elevation angles comprised by the exponents of the complex exponentials of the response vector function; or selecting the steering vectors for directions of interest by sampling the response vector function of the 3D-antenna array at a plurality of values of trigonometric functions of the azimuth and elevation angles comprised by the exponents of the complex exponentials in the response vector function.

9. The method of claim 8, wherein the directions of interest are selected such that, when plotted in a two-dimensional graph is spanned by the plurality of values of azimuth and elevation angles comprised by the exponents of the complex exponentials of the response vector function; or such that, when plotted in a two-dimensional graph is spanned by the plurality of values of trigonometric functions of the azimuth and elevation angles comprised by the exponents of the complex exponentials in the response vector function.

10. A non-transitory computer program product comprising a computer readable medium storing instructions which, when executed on a computer, perform the method of claim 7 or claim 8.

* * * * *